US010776708B2

(12) United States Patent
Lospinoso et al.

(10) Patent No.: US 10,776,708 B2
(45) Date of Patent: Sep. 15, 2020

(54) ANALYZING BEHAVIOR IN LIGHT OF SOCIAL TIME

(71) Applicant: RedOwl Analytics, Inc., Baltimore, MD (US)

(72) Inventors: Josh Lospinoso, San Antonio, TX (US); Guy Louis Filippelli, Sparks Glencoe, MD (US)

(73) Assignee: Forcepoint, LLC, Austin, TX (US)

( * ) Notice: Subject to any disclaimer, the term of this patent is extended or adjusted under 35 U.S.C. 154(b) by 855 days.

(21) Appl. No.: 15/399,147

(22) Filed: Jan. 5, 2017

(65) Prior Publication Data

US 2017/0116541 A1    Apr. 27, 2017

Related U.S. Application Data

(63) Continuation of application No. 14/148,346, filed on Jan. 6, 2014, now Pat. No. 9,542,650.

(60) Provisional application No. 61/771,625, filed on Mar. 1, 2013, provisional application No. 61/803,876, filed on Mar. 21, 2013, provisional application No.
(Continued)

(51) Int. Cl.
*G06N 5/04* (2006.01)
*G06N 7/00* (2006.01)
*G06N 20/00* (2019.01)
*G06Q 30/02* (2012.01)
*G06N 5/02* (2006.01)

(52) U.S. Cl.
CPC .......... *G06N 7/005* (2013.01); *G06N 5/022* (2013.01); *G06N 5/048* (2013.01); *G06N 20/00* (2019.01); *G06Q 30/0201* (2013.01); *G06N 5/04* (2013.01)

(58) Field of Classification Search
None
See application file for complete search history.

(56) References Cited

U.S. PATENT DOCUMENTS 6,072,875 A    6/2000 Tsudik
7,694,150 B1   4/2010 Kirby
(Continued)

FOREIGN PATENT DOCUMENTS

WO    WO2019153581 A1    8/2019

OTHER PUBLICATIONS

Mesaros, et al., Latent Semantic Analysis in Sound Event Detection, 19th European Signal Processing Conference (EUSIPCO 2011) pp. 1307-1311 (Year: 2011).*

(Continued)

*Primary Examiner* — Wilbert L Starks
(74) *Attorney, Agent, or Firm* — Terrile, Cannatti & Chambers; Stephen A. Terrile

(57) ABSTRACT

A relational event history is determined based on a data set, the relational event history including a set of relational events that occurred in time among a set of actors. Data is populated in a probability model based on the relational event history, where the probability model is formulated as a series of conditional probabilities that correspond to a set of sequential decisions by an actor for each relational event, where the probability model includes one or more statistical parameters and corresponding statistics. A baseline communications behavior for the relational event history is determined based on the populated probability model, and departures within the relational event history from the baseline communications behavior are determined.

15 Claims, 37 Drawing Sheets

Related U.S. Application Data

61/771,611, filed on Mar. 1, 2013, provisional application No. 61/772,878, filed on Mar. 5, 2013, provisional application No. 61/820,090, filed on May 6, 2013.

(56) References Cited

U.S. PATENT DOCUMENTS

| | | | |
|---|---|---|---|
| 7,725,565 | B2 | 5/2010 | Li |
| 7,933,960 | B2 | 4/2011 | Chen |
| 8,181,253 | B1 | 5/2012 | Zaitsev et al. |
| 8,312,064 | B1 | 11/2012 | Gauvin |
| 8,424,061 | B2 | 4/2013 | Rosenoer |
| 8,484,066 | B2 | 7/2013 | Miller et al. |
| 8,490,163 | B1 | 7/2013 | Harsell et al. |
| 8,826,443 | B1 | 9/2014 | Raman et al. |
| 8,892,690 | B2 | 11/2014 | Liu et al. |
| 9,043,905 | B1 | 5/2015 | Allen et al. |
| 9,137,318 | B2 | 9/2015 | Hong |
| 9,166,999 | B1 | 10/2015 | Kulkarni et al. |
| 9,246,941 | B1 | 1/2016 | Gibson et al. |
| 9,262,722 | B1 | 2/2016 | Daniel |
| 9,342,553 | B1 | 5/2016 | Fuller |
| 9,485,266 | B2 | 11/2016 | Baxley et al. |
| 9,542,650 | B2 * | 1/2017 | Lospinoso ............ G06N 5/048 |
| 9,596,146 | B2 | 3/2017 | Coates et al. |
| 9,665,854 | B1 | 5/2017 | Burger et al. |
| 9,755,913 | B2 | 9/2017 | Bhide et al. |
| 9,762,582 | B1 | 9/2017 | Hockings et al. |
| 9,798,883 | B1 | 10/2017 | Gil et al. |
| 9,935,891 | B1 | 4/2018 | Stamos |
| 9,977,824 | B2 | 5/2018 | Agarwal et al. |
| 10,096,065 | B2 | 10/2018 | Little |
| 10,187,369 | B2 | 1/2019 | Caldera et al. |
| 10,237,298 | B1 | 3/2019 | Nguyen et al. |
| 10,275,671 | B1 | 4/2019 | Newman |
| 10,282,702 | B2 | 5/2019 | Paltenghe et al. |
| 10,284,601 | B1 | 5/2019 | Bar-Menachem et al. |
| 10,320,813 | B1 | 6/2019 | Ahmed et al. |
| 10,341,391 | B1 | 7/2019 | Pandey et al. |
| 10,417,454 | B1 | 9/2019 | Marom et al. |
| 10,417,653 | B2 | 9/2019 | Milton et al. |
| 10,419,428 | B2 | 9/2019 | Tunnell et al. |
| 10,432,669 | B1 | 10/2019 | Badhwar et al. |
| 10,579,281 | B2 | 3/2020 | Cherubini et al. |
| 2002/0112015 | A1 | 4/2002 | Haynes |
| 2004/0034582 | A1 | 2/2004 | Gilliam et al. |
| 2004/0044613 | A1 | 3/2004 | Murakami et al. |
| 2005/0198099 | A1 | 9/2005 | Motsinger et al. |
| 2006/0048209 | A1 | 3/2006 | Shelest et al. |
| 2006/0053476 | A1 | 3/2006 | Bezilla et al. |
| 2006/0112111 | A1 | 5/2006 | Tseng et al. |
| 2006/0117172 | A1 | 6/2006 | Zhang et al. |
| 2006/0129382 | A1 | 6/2006 | Anand et al. |
| 2006/0195905 | A1 | 8/2006 | Fudge |
| 2006/0225124 | A1 | 10/2006 | Kolawa et al. |
| 2007/0043703 | A1 | 2/2007 | Bhattacharya et al. |
| 2007/0121522 | A1 | 5/2007 | Carter |
| 2007/0225995 | A1 | 9/2007 | Moore |
| 2007/0234409 | A1 | 10/2007 | Eisen |
| 2008/0168002 | A1 | 7/2008 | Kagarlis et al. |
| 2008/0168135 | A1 | 7/2008 | Redlich et al. |
| 2008/0168453 | A1 | 7/2008 | Hutson et al. |
| 2008/0198453 | A1 | 8/2008 | LaFontaine et al. |
| 2008/0244741 | A1 | 10/2008 | Gustafson et al. |
| 2009/0182872 | A1 | 7/2009 | Hong |
| 2009/0228474 | A1 | 9/2009 | Chiu et al. |
| 2009/0300712 | A1 | 12/2009 | Kaufmann et al. |
| 2010/0057662 | A1 | 3/2010 | Collier |
| 2010/0058016 | A1 | 3/2010 | Nikara et al. |
| 2010/0094767 | A1 | 4/2010 | Miltonberger |
| 2010/0094818 | A1 | 4/2010 | Farrell et al. |
| 2010/0107255 | A1 | 4/2010 | Elland et al. |
| 2010/0146622 | A1 | 6/2010 | Nordstrom et al. |
| 2010/0275263 | A1 | 10/2010 | Bennett et al. |
| 2011/0167105 | A1 | 7/2011 | Ramakrishnan et al. |
| 2011/0307957 | A1 | 12/2011 | Barcelo et al. |
| 2012/0046989 | A1 | 2/2012 | Baikalov et al. |
| 2012/0047575 | A1 | 2/2012 | Baikalov et al. |
| 2012/0079107 | A1 | 3/2012 | Williams et al. |
| 2012/0110087 | A1 | 5/2012 | Culver |
| 2012/0137367 | A1 | 5/2012 | Dupont et al. |
| 2012/0210158 | A1 | 8/2012 | Akiyama et al. |
| 2012/0259807 | A1 | 10/2012 | Dymetman |
| 2013/0013550 | A1 | 1/2013 | Kerby |
| 2013/0054433 | A1 | 2/2013 | Giard et al. |
| 2013/0081141 | A1 | 3/2013 | Anurag |
| 2013/0097662 | A1 | 4/2013 | Pearcy et al. |
| 2013/0102283 | A1 | 4/2013 | Lau et al. |
| 2013/0132551 | A1 | 5/2013 | Bose et al. |
| 2013/0174259 | A1 | 7/2013 | Pearcy et al. |
| 2013/0238422 | A1 | 9/2013 | Saldanha |
| 2013/0305358 | A1 | 11/2013 | Gathala et al. |
| 2013/0317808 | A1 | 11/2013 | Kruel |
| 2013/0320212 | A1 | 12/2013 | Valentino et al. |
| 2013/0340035 | A1 | 12/2013 | Uziel et al. |
| 2014/0075004 | A1 | 3/2014 | Van Dusen et al. |
| 2014/0096215 | A1 | 4/2014 | Hessler |
| 2014/0199663 | A1 | 7/2014 | Sadeh-Koniecpol et al. |
| 2014/0205099 | A1 | 7/2014 | Christodorescu et al. |
| 2014/0325634 | A1 | 10/2014 | Iekel-Johnson et al. |
| 2015/0082430 | A1 | 3/2015 | Sridhara et al. |
| 2015/0113646 | A1 | 4/2015 | Lee et al. |
| 2015/0154263 | A1 | 6/2015 | Boddhu et al. |
| 2015/0161386 | A1 | 6/2015 | Gupta et al. |
| 2015/0199511 | A1 | 7/2015 | Faile, Jr. et al. |
| 2015/0199629 | A1 | 7/2015 | Faile, Jr. et al. |
| 2015/0205954 | A1 | 7/2015 | Jou et al. |
| 2015/0220625 | A1 | 8/2015 | Cartmell et al. |
| 2015/0256550 | A1 | 9/2015 | Taylor et al. |
| 2015/0269383 | A1 | 9/2015 | Lang et al. |
| 2015/0288709 | A1 | 10/2015 | Singhal et al. |
| 2015/0324559 | A1 | 11/2015 | Boss et al. |
| 2015/0324563 | A1 | 11/2015 | Deutschmann et al. |
| 2015/0350902 | A1 | 12/2015 | Baxley et al. |
| 2016/0021117 | A1 | 1/2016 | Harmon et al. |
| 2016/0036844 | A1 | 2/2016 | Kopp et al. |
| 2016/0078362 | A1 | 3/2016 | Christodorescu et al. |
| 2016/0092774 | A1 | 3/2016 | Wang et al. |
| 2016/0164922 | A1 | 6/2016 | Boss et al. |
| 2016/0226914 | A1 | 8/2016 | Doddy et al. |
| 2016/0232353 | A1 | 8/2016 | Gupta et al. |
| 2016/0261621 | A1 | 9/2016 | Srivastava et al. |
| 2016/0277360 | A1 | 9/2016 | Dwyier et al. |
| 2016/0277435 | A1 | 9/2016 | Salajegheh et al. |
| 2016/0286244 | A1 | 9/2016 | Chang et al. |
| 2016/0300049 | A1 | 10/2016 | Guedalia et al. |
| 2016/0308890 | A1 | 10/2016 | Weilbacher |
| 2016/0330219 | A1 | 11/2016 | Hasan |
| 2016/0335865 | A1 | 11/2016 | Sayavong et al. |
| 2016/0371489 | A1 | 12/2016 | Puri et al. |
| 2017/0032274 | A1 | 2/2017 | Yu et al. |
| 2017/0053280 | A1 | 2/2017 | Lishok et al. |
| 2017/0063888 | A1 | 3/2017 | Muddu et al. |
| 2017/0070521 | A1 | 3/2017 | Bailey et al. |
| 2017/0104790 | A1 | 4/2017 | Meyers et al. |
| 2017/0116054 | A1 | 4/2017 | Boddhu et al. |
| 2017/0155669 | A1 | 6/2017 | Sudo et al. |
| 2017/0230418 | A1 | 8/2017 | Amar et al. |
| 2017/0255938 | A1 | 9/2017 | Biegun et al. |
| 2017/0279616 | A1 | 9/2017 | Loeb et al. |
| 2017/0286671 | A1 | 10/2017 | Chari et al. |
| 2017/0331828 | A1 | 11/2017 | Caldera et al. |
| 2018/0004948 | A1 | 1/2018 | Martin et al. |
| 2018/0018456 | A1 | 1/2018 | Chen et al. |
| 2018/0024901 | A1 | 1/2018 | Tankersley et al. |
| 2018/0025273 | A1 | 1/2018 | Jordan et al. |
| 2018/0082307 | A1 | 3/2018 | Ochs et al. |
| 2018/0091520 | A1 | 3/2018 | Camenisch et al. |
| 2018/0121514 | A1 | 5/2018 | Reisz et al. |
| 2018/0145995 | A1 | 5/2018 | Roeh et al. |
| 2018/0191745 | A1 | 7/2018 | Moradi et al. |
| 2018/0191857 | A1 | 7/2018 | Schooler et al. |
| 2018/0248863 | A1 | 8/2018 | Kao et al. |

(56) References Cited

U.S. PATENT DOCUMENTS

| | | |
|---|---|---|
| 2018/0285363 A1 | 10/2018 | Dennis et al. |
| 2018/0288063 A1 | 10/2018 | Koottayi et al. |
| 2018/0295141 A1 | 10/2018 | Solotorevsky |
| 2018/0336353 A1 | 11/2018 | Manadhata et al. |
| 2018/0341758 A1 | 11/2018 | Park et al. |
| 2018/0341889 A1 | 11/2018 | Psalmonds et al. |
| 2018/0349684 A1 | 12/2018 | Bapat et al. |
| 2019/0014153 A1 | 1/2019 | Lang et al. |
| 2019/0052660 A1 | 2/2019 | Cassidy et al. |
| 2019/0392419 A1 | 12/2019 | Deluca et al. |
| 2020/0034462 A1 | 1/2020 | Narayanaswamy et al. |
| 2020/0089692 A1 | 3/2020 | Tripathi et al. |

OTHER PUBLICATIONS

Crandall et al., Inferring Social Ties From Geographic Coincidences, PNAS, vol. 107, No. 52, 2010, pp. 22436-22441 (Year: 2010).*

Ross, et al., Bully Prevention in Positive Behavior Support, Journal of Applied Behavior Analysis, 2009, 42(4), pp. 747-759 (Year: 2009).*

Ghahramani, "Bayesian nonparametrics and the probabilistic approach to modelling", Philosophical Transactions A of the Royal Society, vol. 371 Issue: 1984, Published Dec. 31, 2012, pp. 1-20.

Judea Pearl, The Causal Foundations of Structural Equation Modeling, Technical Report R-370, Computer Science Department, University of California, Los Angeles, also Chapter 5, R. H. Hoyle (Ed.), Handbook of Structural Equation Modeling, New York, Guilford Press, 2012, pp. 68-91.

Lafuerza et al., "Exact Solution of a Stochastic Protein Dynamics Model with Delayed Degradation", Phys. Rev. E 84, 051121, Nov. 18, 2011, pp. 1-8.

Notice of Allowance issued in U.S. Appl. No. 14/148,346, dated Jul. 25, 2016, 13 pages.

Notification of Transmittal of the International Search Report and the Written Opinion of the International Searching Authority, or the Declaration issued in PCT/US2014/020043 dated Aug. 11, 2014, 18 pages.

Office Action issued in U.S. Appl. No. 14/148,164 dated Oct. 4, 2016.

Office Action issued in U.S. Appl. No. 14/148,167 dated Jun. 3, 2016, 22 pages.

Office Action issued in U.S. Appl. No. 14/148,167 dated Oct. 6, 2015, 27 pages.

Office Action issued in U.S. Appl. No. 14/148,181 dated Jul. 1, 2016, 35 pages.

Office Action issued in U.S. Appl. No. 14/148,181 dated Oct. 9, 2015, 26 pages.

Office Action issued in U.S. Appl. No. 14/148,208 dated Dec. 1, 2015, 97 pages.

Office action issued in U.S. Appl. No. 14/148,208 dated Jun. 15, 2016, 103 pages.

Office Action issued in U.S. Appl. No. 14/148,262 dated Jun. 29, 2016, 41 pages.

Office Action issued in U.S. Appl. No. 14/148,262 dated Oct. 15, 2015, 33 pages.

Office Action issued in U.S. Appl. No. 14/148,346 dated Oct. 22, 2015, 10 pages.

Varun Chandola, Arindam Banerjee, and Vipin Kumar, "Anomaly Detection: A Survey", ACM Computing Surveys, vol. 41, No. 3, Article 15, Jul. 2009, pp. 15.1-58.1.

Zheleva et al., "Higher-order Graphical Models for Classification in Social and Affiliation Networks", NIPS 2010 Workshop on Networks Across Disciplines: Theory and Applications, Whistler BC, Canada, 2010, pp. 1-7.

L. F. Lafuerza et al., Exact Solution of a Stochastic Protein Dynamics Model with Delayed Degradation, Phys. Rev. E 84, 051121, Nov. 18, 2011, pp. 1-8.

Zoubin Ghahramani, Bayesian nonparametrics and the probabilistic approach to modelling, Philosophical Transactions A of the Royal Society, vol. 371 Issue: 1984, Published Dec. 31, 2012, pp. 1-20.

Elena Zheleva et al., Higher-order Graphical Models for Classification in Social and Affiliation Networks, NIPS 2010 Workshop on Networks Across Disciplines: Theory and Applications, Whistler BC, Canada, 2010, pp. 1-7.

Wikipedia, One-Hot, edited May 22, 2018, https://en.wikipedia.org/wiki/One-hot.

Wikipedia, Categorical Distribution, edited Jul. 28, 2018, https://en.wikipedia.org/wiki/Categorical_distribution.

Yueh-Hsuan Chiang, Towards Large-Scale Temporal Entity Matching, Dissertation Abstract, University of Wisconsin-Madison, 2013.

Furong Li, Linking Temporal Records for Profiling Entities, 2015, SIGMOD '15 Proceedings of the 2015 ACM SIGMOD International Conference on Management of Data, pp. 593-605, https://users.soe.ucsc.edu/~tan/papers/2015/modf445-li.pdf.

Peter Christen et al., Adaptive Temporal Entity Resolution on Dynamic Databases, Apr. 2013, http://users.cecs.anu.edu.au/~Peter.Christen/publications/christen2013pakdd-slides.pdf.

Marinescu, Dan C., Cloud Computing and Computer Clouds, University of Central Florida, 2012, pp. 1-246.

Sean Barnum, Standardized Cyber Threat Intelligence Information with the Structured Threat Information eXpression (STIX) Whitepaper v1.1 (Feb. 20, 2014).

Xiang Sun et al., Event Detection in Social Media Data Streams, IEEE International Conference on Computer and Information Technology; Ubiquitous Computing and Communications; Dependable, Automatic and Secure Computing; Persuasive Intelligence and Computing, pp. 1711-1717, Dec. 2015.

Mesaros et al., Latent Semantic Analysis in Sound Event Detection, 19th European Signal Processing Conference (EUSIPCO 2011), pp. 1307-1311, 2011.

Crandall et al., Inferring Social Ties from Geographic Coincidences, PNAS, vol. 107, No. 52, 2010, pp. 22436-22441, 2010.

Ross et al., Bully Prevention in Positive Behavior Support, Journal of Applied Behavior Analysis, 42(4), pp. 747-759, 2009.

Matt Klein, How to Erase Your iOS Device After Too Many Failed Passcode Attempts, https://www.howtogeek.com/264369/ how-to-erase-your-ios-device-after-too-many-failed-passcode-attempts/, Jul. 28, 2016.

Sithub, The Z3 Theorem Prover, retrieved from internet May 19, 2020, https://github.com/Z3Prover/z3.

John Backes et al., Semantic-based Automated Reasoning for AWS Access Policies using SMT, 2018 Formal Methods in Computer Aided Design (FMCAD), Oct. 30-Nov. 2, 2018 https://d1.awsstatic.com/Security/pdfs/Semantic_Based_Automated_Reasoning_for_AWS_Access_Policies_Using_SMT.pdf.

* cited by examiner

BEHAVIORAL DRIVERS IN HYPOTHESIS

☒ ACTIVITY ⓘ
HIGH, INCREASING, ANY  ✎ EDIT CRITERIA                                                                    ⊗

☒ RESPONSE SHIFT ⓘ
ANY, ANY, ANY  ✎ EDIT CRITERIA                                                                            ⊗
✓ANY   ✓ANY   ✓ANY
         HIGH      INCREASING   EXPLODING
         NORMAL    CONSTANT     STABILIZING
         LOW       DECREASING

802

UNUSED BEHAVIORAL DRIVERS

ACTOR WILL CONTACT SAME ⓘ                                                                                 ⊕

HABIT SHIFT ⓘ                                                                                             ⊕

TRIADIC CLOSURE MINIMUM ⓘ                                                                                 ⊕

INDEGREE POPULARITY SHIFT ⓘ                                                                               ⊕

ALL QUESTIONS ▶ BUSINESS QUESTION 3 ▶ HYPOTHESIS 5                                       EXPORT  DATA  EDIT

EFFECTIVE LEADERS ADAPT THEIR COMMUNICATION OVER TIME AND INCREASE THEIR ABILITY
COMMUNICATE WITH A DIVERSE SET OF EMPLOYEES (INCREASING FEMALE COVARIATE,
INCREASING MAJOR (O4) COVARIATE, AND DECREASING HABIT).

803

☑ MAJOR (O4) COVARIATE   ☑ DEMALE COVARIATE   ☑ HABIT

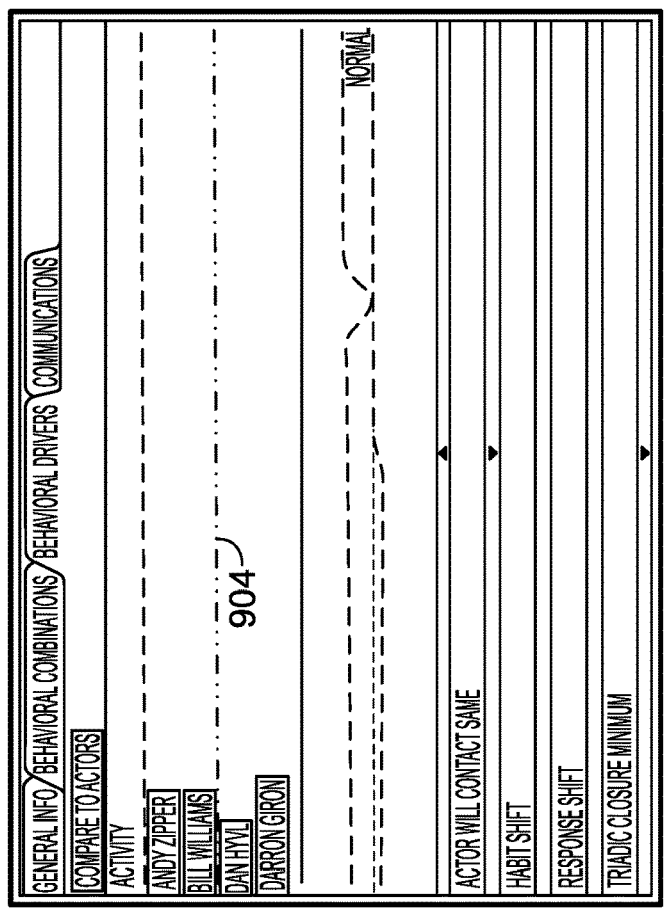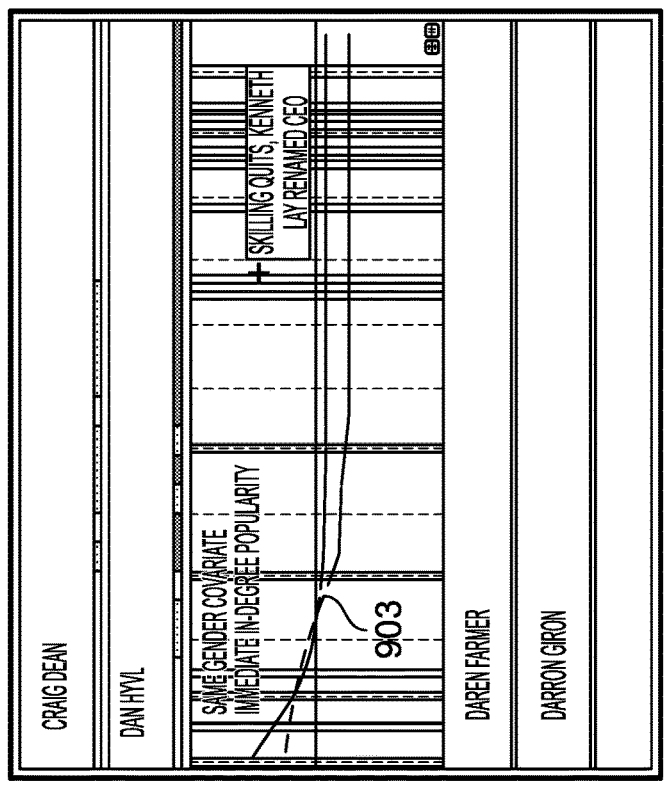
FIG. 9

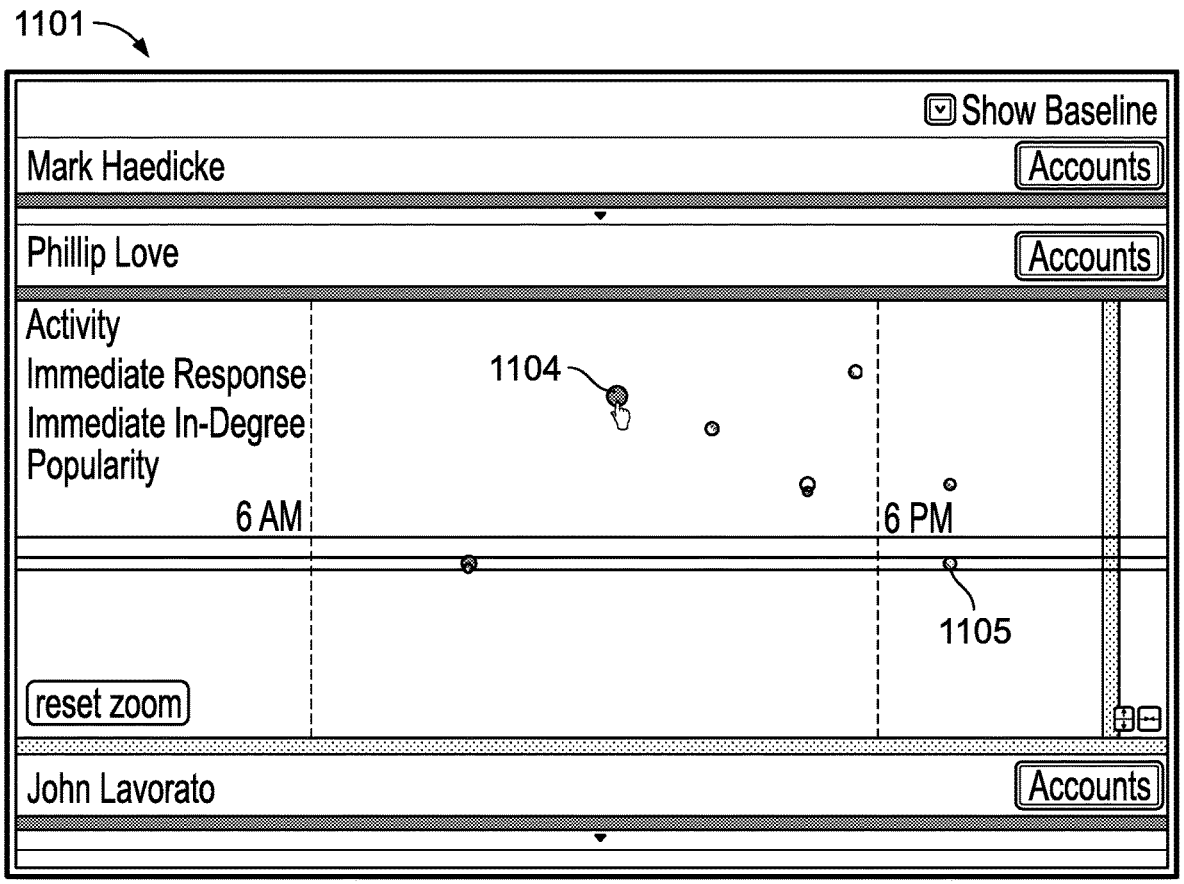
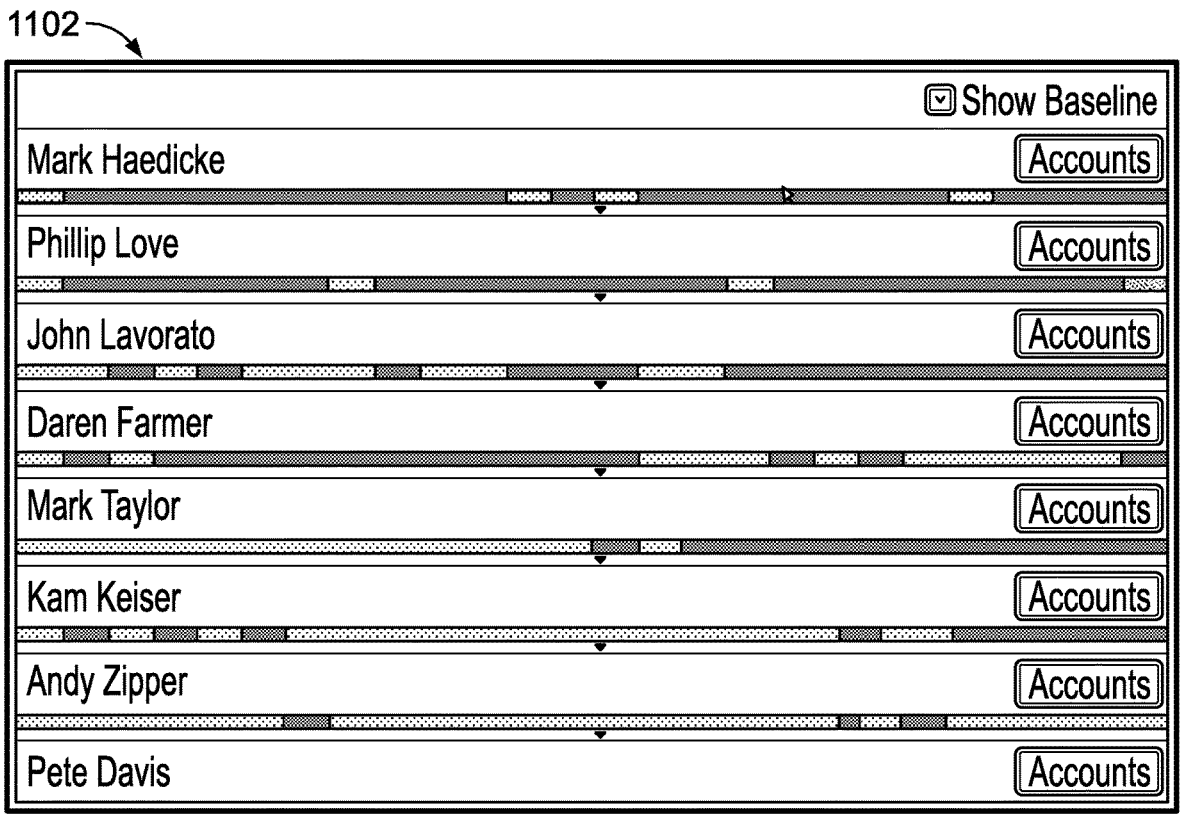
FIG. 11

REDOWL   les@redowlanalytics.com  Sign Out

EMPLOYEES ▶ RAJ RAJARATNAM ▶ HYPOTHESES

Raj Rajaratnam
No Longer Affiliated 0.15 ──○────

General Info / Hypotheses / Communications

INFORMATION ON JUNE 29, 2008

Raj Rajaratnam
Senior Partner (☺ 3)

▼ COMMUNICATIONS

EDIT

☺ 3

Comments

Let's look further into Raj's relationship with Anil Kumar.

Also notice how his personal phone usage increases with the work email while the work phone is flat.

Tags

Add Tags [+]

Bad Employee × | Senior Partner ×

○ WORK EMAIL  ○ PERSONAL PHONE  ● WORK PHONE  ○ PERSONAL EMAIL  ⊙ OTHER

▼ GENERAL INFORMATION

FIG. 13

▼ GENERAL INFORMATION

Male - 52 - Columbo, Sri Lanka

Brooklyn, NY
Current Residence

Employee for 12 years, 3 months
Since June 2, 1997

No Longer Affiliated rajaratnam@galleongrp.com (work)
r.rajaratnam@yahoo.com (personal)

(439) 324-9210 (work)
(439) 219-0092 (personal)

▼ RELATIONSHIPS

| STRONGEST RELATIONSHIPS | |
|---|---|
| Ari Ajalingam | Gary Rosenbach |
| Krishen Sud | Danielle Chiesi |
| Roomy Khan | Adam Smith |
| Michael Cardile | David Slaine |
| Rick Shutte | Rajiv Goel |
| Ali Far | Deep Shah |
| Zvi Gotter | Michael Kimelman |
| Rajat Gupta | |

COMMUNICATIONS

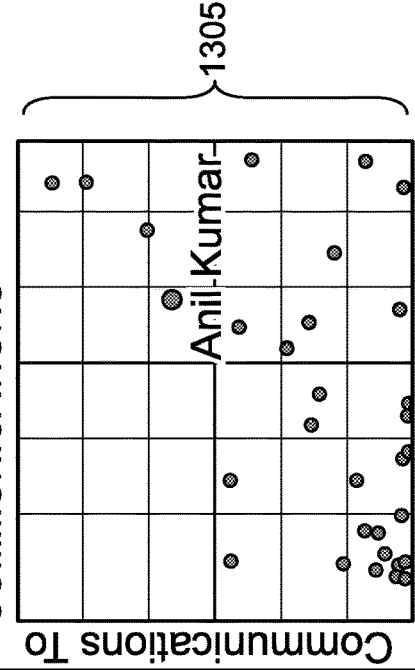

| Time | Event |
|---|---|
| 10:47 AM | Open Q1.IntraDay.721.xlsx |
| 11:01 AM | Phone call from 508-241-2254 |
| 11:31 AM | Bloomberg Chat e.stephens@thp.com |
| 11:47 AM | Bloomberg Chat b.abelson@thp.com |
| 12:19 PM | Call 508-241-2254 Ends |
| 12:24 PM | Email from p.******@thp.com |
| 12:26 PM | Printer 232YXD4 Minutes.docx |
| 12:31 AM | Logged out of Computer |
| 1:16 PM | Charge at Lucky Dragon Sushi |
| 1:22 PM | Door Swipe at office |
| 1:26 PM | Logged on to Network |
| 1:34 PM | Phone Call to 555-129-2134 |
| 1:38 PM | Call 508-241-2254 Ends |
| 1:45 PM | Outlook Event Briefing Wayne, Q1 earnings projection |
| 2:30 PM | Phone Call to 508-246-9735 |
| 2:41 PM | Call 508-241-2254 Ends |
| 2:53 PM | 25000 shares AAPL purchased |
| 2:59 PM | Opens VAR.Q1.TECH.xlsx |
| 3:12 PM | 50750 shares SNE purchased |
| 3:14 PM | 100250 shares HPQ Sold |
| 3:31 PM | Bloomberg chat r.davies@thp.com |
| 3:45 PM | Outlook Event MidCap Roundtable |
| 4:30 PM | Email from a.hobert@thp.com |
| 4:30 PM | Opens roundtable_minutes.docx |
| 4:35 PM | Email from MarketWatch@bloomberg.com |
| 4:35 PM | call to 591-332-9821 |
| 4:37 PM | end call |
| 5:00 PM | Outlook Event Sync with Rohak D., west coast |
| 5:02 PM | call to 212-349-6529 |
| 5:23 PM | end call |
| 5:32 PM | Printer 232YXD4 BankWestMilestones.docx |
| 5:32 PM | Logged out of Computer |
| 6:47 PM | Email from zmoss78@gmail.com |
| 6:53 PM | Logged on to network |
| 7:00 PM | bought 20000 shares of BSMA |
| 7:05 PM | Logged off network |

| PHILIP ZAMUDIO | 84 |
| ADAM HOLMES | 10 |
| LAURA STAHL | 7 |
| NICHOLAS PELLEGRINO | 4 |
| WALTER BRANTLEY | 3 |
| GEORGE MAY | 2 |
| ALOE JONES | 2 |

THE GIRLS → ARE GOING → SOUTH → NEXT QUARTER.
MY MONDAYS
IS THE ONE BASED IN → CHARLESTON
I THINK I'M GOING TO BE → *UNEXPECTEDLY* → ON FRIDAY 1.
THE BOYS ARE → HEADED → TOMORROW.
I THINK I'M GOING TO BE → CAROLINA → THE INLAWS THIS WEEKEND.
THE GIRLS WON'T GO → TO SEE → THE NEW OFFICE TOMORROW.

1901

( FILTER )

☒ LAURA STAHL ▸ ZMOSS78@HOTMAIL.COM
FUN RUN THIS WEEKEND - JUST WANTED TO CHECK BACK WITH YOU ABOUT SATURDAY....

☒ WALTER BRANTLEY ▸ Q.HARRIS@HOTMAIL.COM
COMPANY BARBECUE - ANYONE NEED A RIDE? WE'LL BE HEADING OUT FROM THE NEW....

─── MARCH 27, 2011 ───

☒ NICHOLAS PELLEGRINO  Q.HARRIS@HOTMAIL.COM
RE: GS - I HEARD YESTERDAY FROM SOMEONE ON THE BOARD, THAT THEY ARE GONNA....

☒ ZMOSS78@GMAIL.COM ▸ PHILIP ZAMUDIO
RE: TRAVEL PLANS - P, WHEN I WAS IN LA I HEARD THAT THE GIRLS ARE GOING SOUTH....

MARCH 27, 2011 6:47PM
FR: ZMOSS78@GMAIL.COM
RE:TRAVEL PLANS

P,
WHEN I WAS IN LA I HEARD THAT THE GIRLS ARE GOING SOUTH UNEXPECTEDLY ON FRIDAY. SORRY IT TOOK SO LONG TO GET BACK TO YOU, BUT HOPEFULLY YOU CAN STILL DO SOMETHING ABOUT IT TOMORROW.

CHEERS,
ZM

☒ PHILIP ZAMUDIO ▸ LAURA STAHL
RE: COMPANY BARBECUE - WE WERE GOING HEAD SOUTH TO GO STRAIGHT AFTER WORK.

☒ PHILIP ZAMUDIO ▸ ADAM HOLMES
FUN RUN THIS WEEKEND - JUST WANTED TO CHECK BACK WITH YOU ABOUT SATURDAY....

☒ JZAMUDIO@AOL.COM ▸ PHILIP ZAMUDIO
RE: COMPANY BARBECUE - WE WERE GOING TO GO STRAIGHT AFTER WORK.

REDOWL

EMPLOYEES ▸ RAJ RAJARATNAM ▸ HYPOTHESES
Charles Farnsworth
No Longer Affiliated

Relationships | Hypotheses | Behavioral Drivers | Communications

COMMUNICATIONS

BIGGEST SENDERS

| | |
|---|---|
| Ethan Martin | 3102 |
| Sam Lewis | 2934 |
| Deep White | 2012 |
| Henrietta Webb | 1013 |
| James Fisher | 605 |
| Ahmed Martin | 309 |
| Samantha Lu | 286 |
| Tony Hill | 230 |
| Rohan Webb | 203 |
| Pierre Miller | 190 |
| William Jones | 150 |
| Henrietta Scott | 143 |
| Kevin Saliabury | 122 |
| Neil Farnsworth | 86 |
| George Jacobson | 65 |
| Rebecca Kuykendall | 52 |
| Zachary Fisher | 47 |
| Nikhil Marshall | 39 |

BIGGEST RECEIVERS

| | |
|---|---|
| Henrietta Carmine | 12094 |
| George Harris | 6102 |
| Sue Marshall | 2934 |
| Victor Lu | 2012 |
| Kevin Taylor | 1013 |
| Sue Taylor | 605 |
| Edgar White | 286 |
| Robert Lee | 264 |
| Neil Albers | 230 |
| Alisha Rodriguez | 190 |
| William Taylor | 182 |
| Joe Johnson | 150 |
| Ahmed Martin | 143 |
| Anisha Wong | 122 |
| Diego Kuykendall | 65 |
| Eric Carmine | 52 |
| Deep Lewis | 48 |
| Anthony Tucker | 39 |

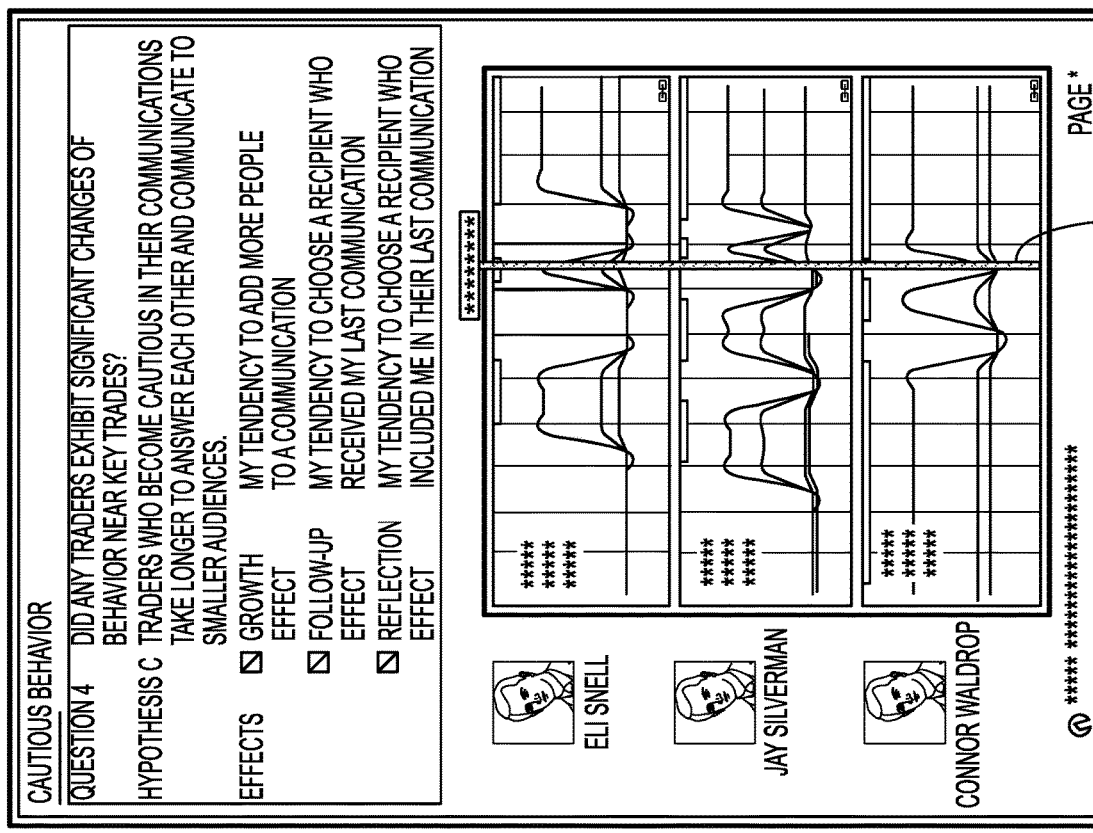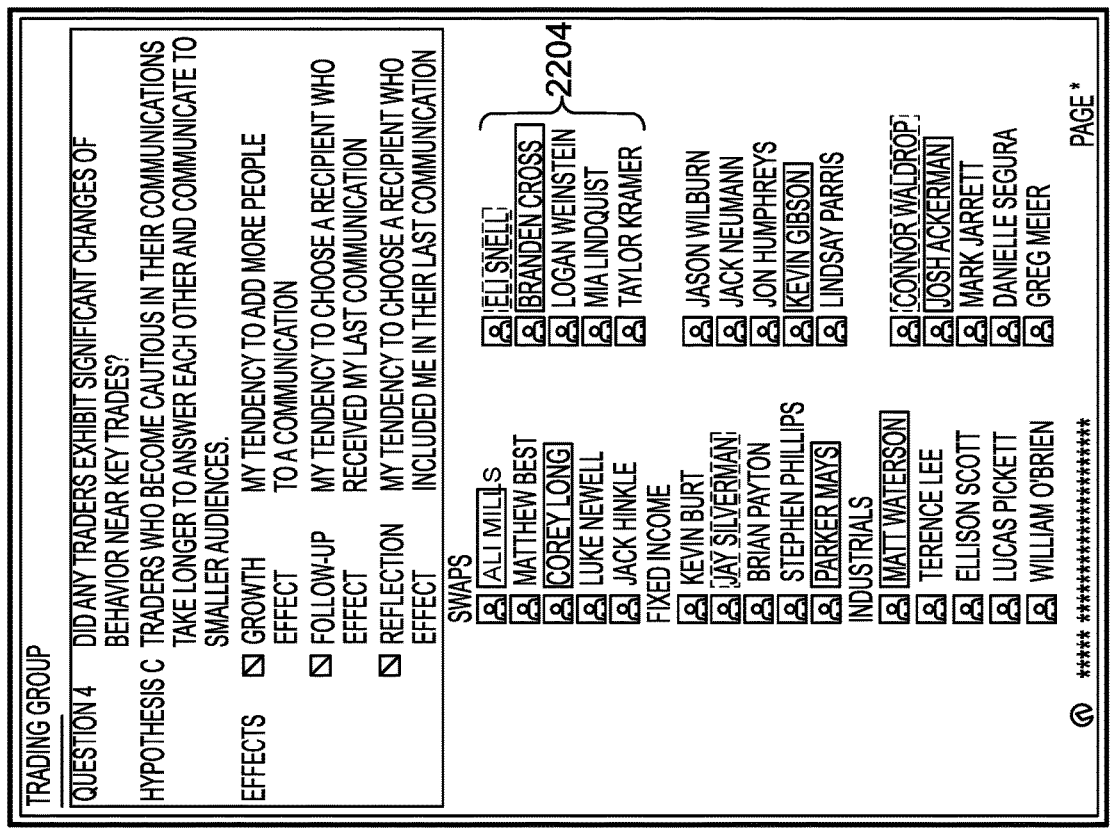
FIG. 22

ANALYZING BEHAVIOR IN LIGHT OF SOCIAL TIME

CROSS-REFERENCE TO RELATED APPLICATIONS

This application is a continuation of U.S. application Ser. No. 14/148,346, filed Jan. 6, 2014, which claims the benefit of U.S. Provisional Application No. 61/771,611, filed Mar. 1, 2013, U.S. Provisional Application No. 61/771,625, filed Mar. 1, 2013, U.S. Provisional Application No. 61/772,878, filed Mar. 5, 2013, U.S. Provisional Application No. 61/803,876, filed Mar. 21, 2013, and U.S. Provisional Application No. 61/820,090, filed May 6, 2013. All of these prior applications are incorporated by reference in their entirety.

FIELD

The present application relates to statistically modeling social behavior.

BACKGROUND

Descriptive statistics may be used to quantitatively describe a collection of data gathered from several sources, in order summarize features of the data, and electronic communications generate data trails that can be used to formulate statistics. Email records, for example, may be parsed to identify a sender of an email, a topic or subject of the email, and one or more recipients of the email. Similarly, phone records provide information that may be used to identify a caller and a recipient of a phone call.

Descriptive statistics are not developed on the basis of probability theory and, as such, are not used to draw conclusions from data arising from systems affected by random variation. Inferential statistics, on the other hand, are based on probability theory and are used to draw conclusions from data that is subject to random variation.

Social behavior, such as communications behavior, may involve uncertainty. In this case, inferential statistics, either alone or in combination with descriptive statistics, may therefore be applied to data reflecting the social behavior to draw inferences about such behavior.

SUMMARY

According to one general implementation, a relational event history is determined based on a data set, the relational event history including a set of relational events that occurred in time among a set of actors. Data is populated in a probability model based on the relational event history, where the probability model is formulated as a series of conditional probabilities that correspond to a set of sequential decisions by an actor for each relational event, and where the probability model includes one or more statistical parameters and one or more corresponding statistics. A baseline communications behavior for the relational event history is determined based on the populated probability model, the baseline including a first set of values for the one or more statistical parameters. Departures within the relational event history from the baseline communications behavior are then determined.

In one aspect, the one or more corresponding statistics relate to one or more of senders of relational events, modes of relational events, topics of relational events, or recipients of relational events.

In another aspect, determining departures from the baseline communications behavior within the relational event history includes determining a second set of values for the statistical parameters based on one or more subsets of the relational events included in the relational event history, and comparing the second set of values for the statistical parameters to the first set of values. In some examples, comparing the second set of values for the statistical parameters to the first set of values includes determining a hypothesis regarding communications behavior within the relational event history and testing the hypothesis using the second set of values. In some examples, testing the hypothesis using the second set of values includes computing a value of a test statistic based on the second set of values and using the test statistic to determine the departures from the baseline communications behavior. In some examples, determining the hypothesis regarding communications behavior within the relational event history includes selecting a set of predictions regarding differences in communications behavior with respect to one or more of the statistical parameters over a period of time.

In a further aspect, determining the relational event history includes extracting data from the data set, transforming the extracted data, loading the transformed data, and enriching the loaded data.

In another aspect, determining the relational event history includes determining a subset of actors included in the set of actors, where at least one decision included in the set of sequential decisions comprises selecting a recipient of the relational event from the subset of actors. In some examples, determining the relational event history includes, receiving one or more user inputs, outputting a graphical analysis of the baseline communications behavior based on the user inputs, and outputting one or more graphical analyses of the departures from the baseline communications behavior based on the user inputs.

Other implementations of these aspects include corresponding systems, apparatus, and computer programs, configured to perform the described techniques, encoded on computer storage devices.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

FIGS. 8-23 provide examples of user interfaces and of data visualizations that may be output to user.

Like reference symbols in the various drawings indicate like elements.

DETAILED DESCRIPTION

Figure 1:
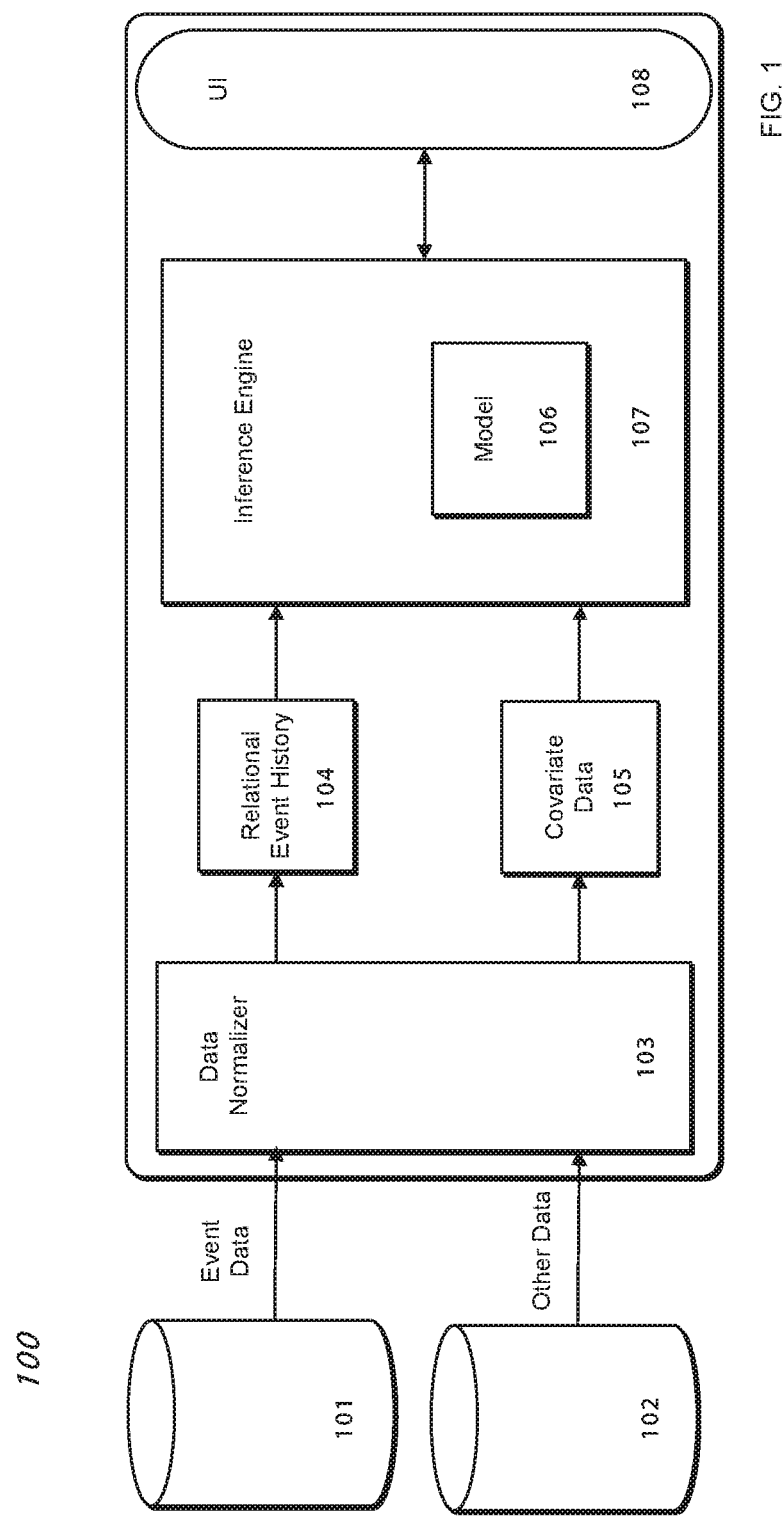
FIG. 1 is a diagram of an example of a system that analyzes a relational event history.

Because communications behavior is complex, and because the decisions involved in one actor sending a communication to another are typically not predictable in advance, the drawing of intelligent inferences from a set of communications-related data can benefit from the development and fitting of a probability model (a mathematical model that is probabilistic in nature). Once a model is developed and fit to a data set, statistical methods can be used to detect patterns, changes, and anomalies in communications behavior, and to test related hypotheses.

One way to approach modeling of communications between actors is to formulate a probability density function as a series of conditional probabilities that can be represented by decisions made sequentially. More specifically, for each relational event (e.g., a communications event occurring at a moment in time among a finite set of actors) in a set of relational events, the probability of the event's occurrence can be decomposed such that it is the product of the probabilities of each of at least four sequential decisions made by the event's initiating actor: (1) a decision to send a communication at a point in time; (2) a decision as to a mode or channel of the communication; (3) a decision as to a topic or content of the communication; and (4) one or more decisions as to one or more recipients of the communication. Although other sequences are possible (e.g., omitting consideration of the topic of the communication, or considering the recipient in advance of the mode), the sequence of sender, mode, topic, and recipient(s) can be useful, in appropriate cases, from a computational standpoint.

Due to the heterogeneity of time-related aspects of communications modeling (e.g., communication patterns differ between work days and weekends), modeling time directly may be difficult. As such, a proportional hazards model, similar to the Cox model, may be employed, so that the "risk" of a specific relational event occurring is relative to other possible relational events, which allows for the prediction of which events are most likely to occur next, but not specifically when. Within the model, the decisions of an actor to send a communication, and as to the mode, topic, and recipient(s) of the communication, may depend on any relational event that occurred prior to the communication, as well as on covariates that can take exogenous information (e.g., data other than communications data) into account. As such, for each sequential decision related to an event, a multinomial logit distribution may be used to model the probabilities of the discrete choice problem presented by the decision, where the primary factors affecting the probability of an event's occurrence are a set of statistics (also referred to as effects) that describe the event in question.

An arbitrary number of statistics can be included in the model, and the types of statistics included may form the basis for the kinds of inferences that can be drawn from the model. The statistics may be based in social network theory, and may relate to one or more of senders, modes, topics, or recipients of relational events. A "trigger" effect, for example, relates to the tendency of an actor to communicate based on the recency of a received communication, while a "broken record" effect relates to an overall tendency to communicate about a topic. The statistics (or effects) may be a scalar value. In some cases, a coefficient (referred to as a statistical parameter or effect value) is multiplied by these statistic values within the model. The statistical parameter may therefore indicate the statistic's effect on event probabilities.

Once the statistics to include in the model have been chosen, the model can be populated based on a relational event history that is determined from a data set. Using the populated model, a baselining process may be employed to determine communications behavior that is "normal" for a given relational event history. This baseline includes a set of effect values (statistical parameters) that correspond to the statistics included in the model. This baseline and the populated model can be used to determine departures from the normal communications behavior.

In this way, a probability model fitted to a relational event history derived from event and other data may be used to identify patterns, changes, and anomalies within the relational event history, and to draw sophisticated inferences regarding a variety of communications behaviors.

FIG. 1 is a diagram of an example of a system that analyzes a relational event history. The system 100 includes data sources 101 and 102, data normalizer 103, inference engine 107, and user interface ("UI") 108. The data normalizer 103 may be used to determine relational event history 104 and covariate data 105, and the inference engine 107 may be used to determine model 106, and to draw inferences from the model. Data sources 101 and 102 may be connected to data normalizer 103 through a network, and normalizer 103, inference engine 107, and UI 108 may interface with other computers through the network. The data sources 101 and 102 may be implemented using a single computer, or may instead be implemented using two or more computers that interface through the network. Similarly, normalizer 103, inference engine 107, and UI 108 may implemented using a single computer, or may instead be implemented using two or more computers that interface through the network.

Inference engine 107 may, for example, be implemented on a distributing computing platform in which various processes involved in drawing inferences from a relational event history and a set of covariates are distributed to a plurality of computers. In such an implementation, one or more computers associated with the inference engine 107 may access a relational event history, a set of covariates that have been formatted by normalizer 103, and a set of focal actors whose communications behavior will be the subject of analysis. Each of the computers may use the accessed data to perform a portion of the computations involved in populating the model 106, determining a baseline, and/or determining departures from the baseline.

For example, in some implementations, the model may include a set of event statistics, or effects, that impact the probability of events. In this case, to populate the model, each of the computers may perform a portion of the computations involved in determining these event statistics, as well as determining the probabilities of the events. Also, for example, in some implementations determining a baseline may involve determining a set of effect values, which are coefficients that are multiplied by the event statistics in the model 106, and accordingly describe the impact of each effect on event probabilities. The process of determining the effect values may involve a maximum likelihood estimation in which each of the computers perform a portion of the computations involved.

Data source 101 may contain data that relates to communications events. The data may have originated from one or more sources, may relate to one or more modes of communication, and may be stored in one or more formats. Data source 101 may, for example, store email records, phone logs, chat logs, and/or server logs. Data source 101 may be, for example, a digital archive of electronic communications that is maintained by an organization, the archive containing data related to communications involving actors associated with the organization.

Data source 102 may contain additional data that, although not directly related to communications events, may nevertheless prove valuable in drawing inferences from a relational event history. Data source 102 may, for example, store information relating to an organization and its personnel, such as organizational charts, staff directories, profit and loss records, and/or employment records. Data source 102 may be, for example, a digital archive that is maintained by an organization, the archive containing data relating to the operations of the organization.

Data normalizer 103 may be used to load, extract, parse, filter, enrich, adapt, and/or publish event data and other data accessed through one or more data sources, such as data sources 101 and 102. Specifically, event data that is received from data source 101 may be normalized to determine a relational event history 104, the normalization process resulting in clean, parsed relational data with disambiguated actors that maps to the categories of decisions included in a probability model 106. An email, for example, may be parsed to reveal the sender, topic, mode, recipient(s), and timestamp of the email, and that data may be used to generate a relational event that corresponds to the email in relational event history 104.

Normalization of the data accessed from data source 101 may involve processing the data so as to produce a relational event history 104 in which, to the extent possible, each event is described using a uniform set of characteristics, regardless of the mode of communication involved in the event and the format in which the event data is stored in data source 101. Each event in the event history may be include a "sender" (otherwise referred to as an ego below), which is the actor responsible for initiating the event, a "recipient(s)" (otherwise referred to as an alter below), which is the actor(s) that received the event, a mode identifying the mode of the event, and a timestamp indicating the time that the occurred. For example, a phone record may result in a relational event that includes the actor responsible for initiating the call (sender), the actor that received the call (recipient), the mode identifying the event as a phone call, and a timestamp indicating the time that the call was made. Other characteristics used to describe an event in relational event history 104 may include, for example, a unique identifier for the event, a duration indicating a length of the event, a type indicating the manner in which data relating to the event was formatted in data source 101, a unique identifier for a digital archive from which the event was accessed, and one or more fields related to enrichment attributes (e.g., additional data describing an actors involved in the event, such as job titles).

Data that is received from data source 102 may be normalized by data normalizer 103 in order to produce covariate data 105. Covariates are exogenous variables that may be involved in effects and that may be included in probability model 106. A public company using a probability model to analyze communication patterns might, for example, include the company's daily stock price as a covariate in the model, in order to shed light on the relationship between the price and communications between employees and outsiders. An individual covariate may be a global variable that occurred at or during a particular time for all actors in a relational event history (e.g., relating to an audit), may instead be a dyadic variable that occurred at or during a particular time for a pair of actors in the model (e.g., a supervisor-staff member relationship that existed between two employees), or may be an actor variable that occurred at or during a particular time for a specific actor (e.g., a salary).

As explained above, the inference engine 107 populates probability model 106 based on relational event history 104 and covariate data 105, the model having been formulated as a series of conditional probabilities that correspond to sequential decisions by actors, and including one or more statistical parameters and corresponding statistics that may relate to one or more of senders, modes, topics, or recipients of relational events.

Inference engine 107 may also determine a baseline communications behavior for the model 106, based on the populated model Inference engine 107 may, for example, determine a set of effect values through a maximum likelihood process, the determined values indicating the impact of the effects on event probabilities. The inference engine 107 may also determine departures from the baseline by determining a second set of values for the effects based on one or more subsets of the relational events included in relational event history 104, and comparing the second set of effect values to the first set of values.

UI 108 may be used to receive inputs from a user of system 100, and may be used to output data to the user. A user of the system may, for example, specify data sources to be used by normalizer 103 in determining relational history 104 and covariate data 105. The user may also provide inputs indicating which actors, modes, topics, covariates, and/or effects to include in model 106, as well as which subsets of the relational event history should be analyzed in determining departures from the baseline. UI 108 may provide the user with outputs indicating a formulation of model 106, a determined baseline for the model 106, and one or more determinations as to whether and how the subsets of relational event history being analyzed differ from the baseline. UI 108 may also provide the user with additional views and analyses of data so as to allow the user to draw additional inferences from the model 106.

In more detail, UI 108 may provide to the user, based on probability model 106, a determined baseline, and/or one or more determined departures from the baseline, textual and/or graphical analyses of data that uncover patterns, trends, anomalies, and change in the data. UI 108 may, for example, enable a user to form a hypothesis regarding the data by selecting one or more effects, covariates, and/or sets of focal actors, and curves may be displayed based on the user's hypothesis, where the curves indicate periods of time in which communications behavior is normal, as well as periods of time in which communications behavior is abnormal. Other visualizations of the data, such as summations of communications behavior involving particular actors, modes, and/or topics, may be provided by UI 108

Curves displayed to the user through UI 108 may correspond to an actor, to a subset of actors, and/or to all actors in the relational event history. Color coding may be used to indicate periods of time in which communications behavior is normal, and periods of time in which communications behavior is abnormal. A user may be able to select between varying levels of sensitivity through which normality and abnormality are determined, and UI 108 may dynamically update as selection of sensitivity occurs.

Multiple curves, each representing different effects or covariates, may be displayed by UI 108 in an overlapping fashion, and the curves may be normalized and smoothed.

The curves may be displayed in two dimensions, where the x axis is associated with time, and where the y axis is associated with properties of effects and/or covariates. UI 108 may display icons and/or labels to indicate effects, covariates, or actors to which curves correspond. UI 108 may further display labels within the two dimensional field in which the curves are plotted, the labels indicating exogenous events or providing other information.

UI 108 may also enable a user to zoom in to the displayed curves in order to view a display of events at a more granular level, with information pertaining to the displayed events being presented through icons that may be color-coded according to mode, and that may be sized to indicate, for example, a word count or length of conversation. UI 108 may also provide access to individual communications related to events. UI 108 may, for example, display an individual email in response to a user selection or zoom.

In response to a user selection, UI 108 may also display, for a particular actor, behavioral activity over time. The behavioral activity may be displayed, for example, in a polar coordinate system, where the radial coordinates of points in the plane correspond to days, and where angular coordinates correspond to time slices within a particular day.

In more detail, each point plotted in the plane may correspond to a particular communications event, and may be color coded to indicate a mode of communication or other information. Points plotted in the plane may be located on one of several concentric circles displayed on the graph, and the circle on which a point is located may indicate a day on which the communication took place, while the position of the point on the circle may indicate a time slice (e.g., the hour) in which the communication took place. A user may be able to select a communication event that is plotted on the graph to obtain content. For example, a user may click or hover over a point that indicates an SMS message in order to retrieve the text of the SMS message.

In some implementations of UI 108, a polar graph indicating behavioral activity over time may be animated, enabling a user to "fly through" a visual representation of behavioral activity over particular periods of time, where the circles and events presented for a particular period of time correspond to the days within that period, and where the period displayed dynamically shifts in response to user input.

Figure 2:
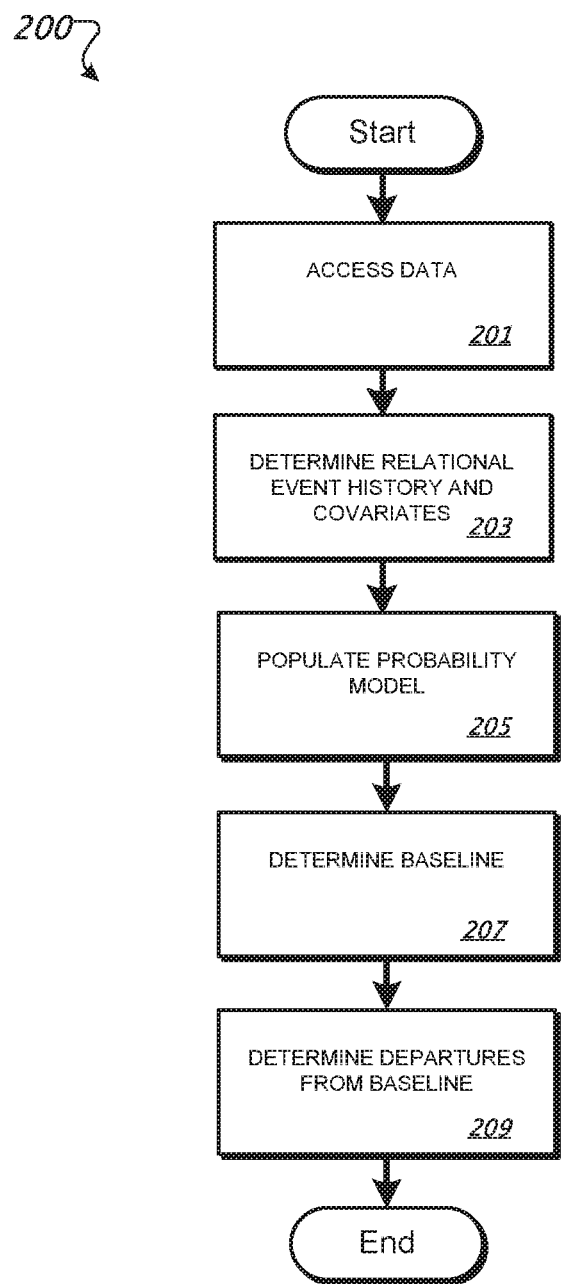
FIG. 2 is a flowchart of an example of a process for analyzing a relational event history.

FIG. 2 is a flowchart of an example of a process 200 for analyzing a relational event history. The process 200 may be implemented, for example, using system 100, although other systems or configurations may be used. In such an implementation, one or more parts of the process may be executed by data normalizer 103 or inference engine 107, which may interface with other computers through a network. Data normalizer 103 may retrieve data involved in the process, such as data used in determining a relational event history or covariates, from one or more local or remote data sources, such as data sources 101 and 102.

Process 200 begins when data normalizer 103 accesses event and/or other data from data sources 101 and 102 (201). After accessing the event and/or other data, the data normalizer 103 normalizes the accessed data, determining a relational event history 104 and covariate data 105 (203).

The process of normalizing event and other data and determining a relational event history and covariates may involve, among other things, extracting event data from accessed data, transforming the extracted data to a state suitable for populating the probability model 106, and enriching the transformed data with additional information gathered from other data sources. The accessed event data may, for example, include an email sent by one actor to two others, the email relating to a topic specified in the probability model 106. The data normalizer 103 may parse the email to extract a time stamp, a sender, a topic, and recipients. Extracted data may then be transformed by data normalizer 103, resulting in relational data with disambiguated actors that maps to the categories of decisions included in a probability model 106. The data normalizer 103 may then enrich the transformed data by, for example, scraping one or more websites to obtain additional data relating to the sender or recipients. The enriched data representing a relational event corresponding to the email may then be added to relational event history 104. The data normalizer 103 may perform similar operations in the process of producing covariate data 105.

A probability model 106 may be populated by inference engine 107 based on the relational event history 104 and covariate data 105 (205). In some implementations, the probability model 106 is formulated as a series of conditional probabilities that correspond to a set of sequential decisions by an actor. For each event, the set of sequential decisions includes a decision to send a communication, a decision as to a mode of the communication, a decision as to a topic of the communication, and one or more decisions as to recipients of the communication. A multinomial logit distribution can be used to model the probabilities of the discrete choice problem presented by each decision, with the primary factors affecting the probability of an event occurring are a set of event statistics (also referred to as effects), which are based in social network theory. For example, a woman's probability of emailing her boss may be different if she has received 4 emails from clients within the past 24 hours than if she has received none. Likewise, a man may be more or less likely to make a phone call depending on the number of people who have called him recently.

The model's multinomial logit distribution may include a coefficient that is multiplied by these event statistic values and therefore describes the statistic's effect on event probabilities. This coefficient may be referred to as an effect value or a statistical parameter. Effects may be formulated using backward looking statistics, such as time-decayed sums of recent events of certain types, or the last event that was received by the ego (sender) in question, which may be referred to as participation shifts.

In more detail, a relational event history $\mathcal{N}$, such as relational event history 104, may include relational events that occur at moments in time among a finite set of actors. The composition of this set of actors may depend on time t, and is denoted $\mathcal{N}(t)$. Any ordered pair of actors is called a dyad, and relational events are denoted as tuples, where:

the sender of the event, also called the ego, is represented by $i \in \mathcal{N}(t)$,
the mode of the event is represented by $m \in \mathcal{M}$,
the topic of the event is represented by $b \in \mathcal{B}$,
the recipients of the event, also called the alters, are represented by the set of $j \in \mathcal{J} \subset \mathcal{N}(t)$, and
the timestamp of the event is represented by $t \in [0, \infty)$.

For notational convenience, a number of functions are defined for an event e:
m(e) refers to the mode of event, e,|
b(e) refers to the topic of event e,
$\mathcal{J}$(e) refers to the alters of event e, and
$\tau$(e) refers to the timestamp of event e.
i(e) refers to the ego of event e, A strictly ordered set of these relational events constitutes a relational event history, which may be represented through use of the shorthand notation:

$$\varepsilon_t = \{e \in \varepsilon . \tau(e) < t\},$$

The event history is an endogenous variable Other, exogenous variables (i.e., covariates) may also be included in the probability model, and these covariates may be partitioned into three types:

1. global covariates that hlave the same value for all actors relationships. The global covariates are denoted by the set $\mathcal{W}$. A covariate $W_a \in \mathcal{W}$ is a function that maps a timestamp t to a real value $W_a(t)$.
2. actor covariates that are permitted different values for each actor. The actor covariates are denoted by the set $\mathcal{X}$. A covariate $X_a \in \mathcal{X}$ is a function that maps a timestamp/actor pair (i, t) to a real value $X_a(i, t)$.
3. dyadic covariates that are permitted different values for each dyad. The dyadic covariates are denoted by the set $\mathcal{Y}$. A covariate $Y_a \in \mathcal{Y}$ is a function that maps a timestamp/dyad pair (i, j, t) to a real value $Y_a(i, j, t)$.

Typically, covariates will have a time domain equal to the relational event history. The combination of the relational event history and the covariates constitutes a dataset that may be denoted:

$$\mathcal{Z} = (\varepsilon, \mathcal{W}, \mathcal{X}, \mathcal{Y})$$

A probability density representing the probability of the occurrence of each relational event in the relational event history and based on the dataset may be denoted:

$$f(\varepsilon | \mathcal{W}, \mathcal{Y}, \mathcal{X}, \mathcal{Z}_0, \theta)$$

where $\mathcal{Z}_0$ denotes all information before t=0 and θ its a statistical parameter The probabilities may be conditioned on all prior events and information, including an initial state t=0, such that the probability density may be rewritten:

$$f(\varepsilon | \mathcal{W}, \mathcal{X}, \mathcal{Y}, \mathcal{Z}_0, \theta) = \prod_{e \in \varepsilon} f(e | \varepsilon_{\tau(e)}, \mathcal{W}, \mathcal{X}, \mathcal{Y}, \mathcal{Z}_0, \theta)$$

For practical reasons, it may be beneficial to restrict the conditional densities such that only covariate information known at time t can influence the probabilities of event occurrence. Accordingly, the probability density can be simplified by requiring that:

$$f(e | \varepsilon_{\tau(e)}, \mathcal{W}, \mathcal{X}, \mathcal{Y}, \mathcal{Z}_0, \theta) = f(e | \mathcal{Z}_{\tau(e)}, \theta)$$

The probability density may be decomposed into a series of conditional probabilities that correspond to a set of sequential decisions by an actor:

$$f(e | \mathcal{Z}_{\tau(e)}, \theta) = f(i(e), \tau(e), | \mathcal{Z}_{\tau(e)}, \theta) \times f(m(e) | i(e), \tau(e), \mathcal{Z}_{\tau(e)}, \theta) \times f(b(e) | i(e), \tau(e), m(e), \mathcal{Z}_{\tau(e)}, \theta) \times f(\mathcal{J}(e) | i(e), \tau(e), m(e), b(e), \mathcal{Z}_{\tau(e)}, \theta)$$

The conditional probabilities included in this version of the model consist of:
the joint ego/interarrival density $f(i(e), \tau(e)| \ldots )$, which describes the process by which the ego (i.e., sender) of an event waits some time and then decides to send an email,
the mode density $f(m(e)| \ldots )$, which describe the process of the ego choosing to communicate (e.g. by email or by phone),
the topic density $f(b(e)| \ldots )$, which describes the process of ego deciding to communicate about one of some finite set of topics,
and the alter density $f(\mathcal{J}(e)| \ldots )$ which describes the process of the ego deciding to communicate with some set of alters (i.e. recipients).

The ego/interarrival density, which describes a process by which an ego chooses to initiate an event following a most-recent event, can be modeled using a semi-parametric approach in the spirit of the Cox proportional hazards model:

Suppose that $t_*$ is the time of the most recent event to occur, or 0 if none yet occurred. We assume that, for all egos $i \in \mathcal{N}(t)$ and for all interarrival times $t \in (0, \infty)$ until the next event, that $$f(i, t | \mathcal{Z}_{t_*+t}, \theta) = \lambda_0(t) \times \exp \phi_I(i | \mathcal{Z}_{t_*}, \theta).$$

Notably, the function $\phi_I$, which models the probability density that the next event to occur after $t_*$ entails ego i sending an event after a holding time of t, does not depend on the interarrival time t, and therefore cannot incorporate information accumulated since the last event. Moreover, the baseline hazard rate $\lambda_0(t)$ depends on neither ego i nor the interarrival time t. As such, the hazards between all candidate egos are proportional:

$$\frac{f(i_a, t | \mathcal{Z}_{t_*+t}, \theta)}{f(i_b, t | \mathcal{Z}_{t_*+t}, \theta)} = \frac{\exp \phi_I(i_a | \mathcal{Z}_{t_*}, \theta)}{\exp \phi_I(i_b | \mathcal{Z}_{t_*}, \theta)}$$

For convenience, a linear form for $\phi_I$ may be used:

$$\phi_I(i | \mathcal{Z}_{t_*}, \theta) = \alpha^T s_I(i, \mathcal{Z}_{t_*})$$

where $s_I(i, \mathcal{Z}_{t_*})$ is a statistic and $\alpha \subset \theta$.

This form allows the baseline hazard rate to be ignored in modeling, as estimation entails only a partial likelihood. Thus, the optimal parameter θ can be found by maximizing, over the relational event history, the probability density that the ego for each event would send an event, as opposed to the other actors:

$$P(i(e) = i^* | \mathcal{Z}_{\tau(e)}, \theta) = \frac{\exp \phi_I(i^* | \mathcal{Z}_{\tau(e)}, \theta)}{\sum_{i \in \mathcal{N}(\tau(e))} \exp \phi_I(i | \mathcal{Z}_{\tau(e)}, \theta)}$$

The fact that the function $\phi_I$ does not depend on the interarrival time t, and therefore cannot incorporate information accumulated since the last event, necessitates a further assumption regarding covariate values. Namely, that changes to covariate values occur only at moments when events occur. More formally:
given an event history ε, a covariate ζ, and two time points t and t+dt≥t, if there exists no e ∈ ε such that $\tau(e) \in (t, t+dt]$, then $\zeta(t) = \zeta(t+dt)$.

The incorporation of the passage of time into the impact of an event on future events may modeled through a decay function using the following general form:

$$s(t, \ldots ) = \sum_{\{e \in \varepsilon : \Psi_I(e, \ldots)\}} \delta(t, \tau(e))$$

where $\Psi_I(e, \ldots )$ is called a predicate, and describes criteria by which a subset of events is selected Effects that evaluate an actor's decision to initiate a communication may be referred to as "ego effects." It possible to develop effects that depend on either or both of the relational event history and covariates. Ego effects that depend on the relational event history may include the activity ego selection effect and the popularity ego selection effect, both of which quantify the amount of communications that have recently been sent to (popularity) or sent by (activity) the candidate ego i*, where recency is determined by specifying the effects through predicates:

the activity ego selection effect $$\Psi_I(e,i^*)=\{i^*=i(e)\}$$

the popularity ego selection effect $$\Psi_I(e,i^*)=\{i^* \in \mathcal{I}(e)\}$$

Ego effects that depend on covariates may include the actor covariate ego selection effect and the indegree dyadic covariate ego selection effect:

the actor covariate ego selection effect for actor covariate $x_a$ $$s_I(i^*, \mathcal{Z}_t) = x_a(i^*),$$

and the indegree dyadic covariate ego selection effect for dyadic covariate $y_a$ $$s_I(i^*, \mathcal{Z}_t) = \sum_{j \in Nt} y_a(j, i^*).$$

The mode density, which describes the process of the ego choosing one of a finite set of modes, can be represented through a conditional distribution:

$$f(m(e)|i(e), \tau(e), \mathcal{Z}_{\tau(e)}, \theta)$$

A model for the selection of a mode by the ego is the multinomial logit, or discrete choice distribution:

$$f(m(e) = m^* | \ldots) = \frac{\exp \phi_M(m^*, \ldots)}{\sum_{m \in M} \exp \phi_M(m, \ldots)}$$

For convenience, a linear form for $\phi_M$ may be used:

$$\phi_M(m^*, \ldots) = \beta^T s_M(m^*, \ldots)$$

where $s_M(m^*, \ldots)$ is a statistic and $\beta \subset \theta$

Effects that evaluate the ego's decision as to the method of communication may be referred to as "mode effects." Mode effects may include the relay mode selection effect, which quantifies a selected ego i's tendency to contact other actors through a candidate mode m* that was recently used by other actors to contact i, and the habit mode selection effect, which quantifies a selected ego i's tendency to contact other actors through a candidate mode m* that i recently used to contact other actors:

the relay mode selection effect $$\Psi_M(e,m^*,i)=\{m^*=m(e), i \in \mathcal{I}(e)\}$$

the habit mode selection effect $$\Psi_M(e,m^*,i)=\{m^*=m(e), i=i(e)\}.$$

The topic density, which describes the process of the ego choosing one of a finite set of topics, given a previous choice of mode, can be represented through a conditional distribution:

$$f(t(e)|m(e), i(e), \tau(e), \mathcal{Z}_{\tau(e)}, \theta)$$

As with selection of a mode, the selection of a topic by the ego can be modeled using a multinomial logit, or discrete choice distribution, the selected mode being introduced into the topic distribution as a covariate:

$$f(b(e) = b^* | \ldots) = \frac{\exp \phi_B(b^*, \ldots)}{\sum_{b \in \mathcal{B}_{(\tau(e))}} \exp \phi_B(b, \ldots)}$$

For convenience, a linear form for $\phi_B$ may be used:

$$\phi_B(b, \ldots) = \gamma^T s_B(b, \ldots)$$

where $s_B(b, \ldots)$ is a statistic and $\gamma \subset \theta$

Effects that evaluate the ego's decision as to the topic of communication may be referred to as "topic effects." Topic effects may include the relay topic selection effect, which quantifies a selected ego i's tendency to communicate with other actors about a candidate topic b* that recently appeared in communications sent to i by other actors, and the habit mode selection effect, which quantifies a selected ego i's tendency to communicate with other actors about a candidate topic b* that recently appeared in communications sent by i to other actors:

the relay topic selection effect $$\Psi_B(e,b^*, \ldots)=\{b^*=b(e), m=m(e), i=j(e)\}$$

the habit topic selection effect $$\Psi_B(e,b^*, \ldots)=\{b^*=b(e), m=m(e), i=i(e)\}$$

The alter density, which describes the process of the ego choosing to communicate with a set of alters, given previous choices of mode and topic, can be represented through a conditional distribution:

$$f(\mathcal{J}(e)|b(e), m(e), i(e), \tau(e), \mathcal{Z}_{\tau(e)}, \theta)$$

Notably, the size of the outcome space of possible alter sets $\mathcal{J}(e)$ can be enormous, even for a small $\mathcal{N}$. The size of this set $|\mathcal{J}(e)|$ is stochastic and lies on the interval [1, $\mathcal{N}_{\tau(e)}$). For each size $|\mathcal{J}(e)|$ on this interval, we have:

$$\binom{|\mathcal{N}_{\tau(e)}| - 1}{|\mathcal{J}(e)|}$$

As such, the dimensionality of the outcome space is:

$$\sum_{a=1}^{\mathcal{N}_{\tau(e)}-1} \binom{|\mathcal{N}_{\tau(e)}| - 1}{a}$$

To avoid practical problems associated with the enormity of the outcome space of possible alter sets, $\mathcal{J}$ may be modeled as an ordered set, such that the ego adds actors into the alter set alter-by-alter:

$$\mathcal{J}(e) = \{j_1, j_2, \ldots, j_{|\mathcal{J}(e)|}\}$$

$$\mathcal{J}_*(a) = \begin{cases} \emptyset & a = 1 \\ \{j_1, j_2, \ldots, j_{a-1}\} & a > 1 \end{cases}$$

Modeled in this way, the density may be decomposed:

$$f(\mathcal{J}(e) | \ldots ) = \prod_{a=1}^{|\mathcal{J}(e)|} f(j_a | \mathcal{J}_*(a), \ldots )$$

Each element in the decomposition of the density may be modeled using a multinomial logit, or discrete choice distribution:

$$f(j^* | \mathcal{J}_*(a), \ldots ) = \frac{\exp\phi_J(j^*, \mathcal{J}_*(a), \ldots )}{\sum_{j \in \mathcal{R}(i(e), \mathcal{J}_*(a))} \exp\phi_J(j, \mathcal{J}_*(a), \ldots )}$$

In the modeling of the elements, the alter risk set $\mathcal{R}(a)$ defines the choices of alter available to an ego for the alter selection decision at hand. One way of characterizing the alter risk set is:

$$\mathcal{R}(i, \mathcal{J}_*(a)) = \begin{cases} \mathcal{N}_{\tau(e)} \setminus i & \mathcal{J}_*(a) = \emptyset \\ \mathcal{N}_{\tau(e)} \setminus \mathcal{J}_*(a) & \text{else} \end{cases}$$

where we denote the choice of $j^*=i(e)$ as the choice to not add any more alters into the set $\mathcal{J}(e)$.

Decomposing the model for alter selection in this way makes it possible to specify $\phi_J$ in a linear form:

$$\phi_J(j, \mathcal{J}_*(a), \ldots ) = \eta^T s_J(j, \mathcal{J}_*(a), \ldots )$$

where $s_J(j, \mathcal{J}_*(a), \ldots )$ is a statistic and $\eta \subset \theta$ Effects that evaluate the ego's decision(s) as to the recipient(s) of a communication may be referred to as "alter effects." It possible to develop alter effects that depend on either or both of the relational event history and covariates. Alter effects that depend on the relational event history may include the fellowship alter effect and the repetition alter effect:

the Fellowship Alter Effect $$\Psi_J(e, j^*, \mathcal{J}_*(a), \ldots ) = \{i \cup j^* \cup \mathcal{J}_*(a) \subseteq i(e) \cup \mathcal{J}(e)\}$$

and the Repetition Alter Effect $$\Psi_J(e, j^*, \mathcal{J}_*(a), \ldots ) = \{i = i(e), j^* \in \mathcal{J}(e)\}.$$

Alter effects that do not depend on the relational event history may include the activity alter effect and the actor covariate alter effect:

the Activity Alter Effect $$s_J(j^*, \mathcal{J}_*(a), \ldots ) = 1 - \Pi\{i(e) = j^*\}$$

where $\Pi\{i(e) = j^*\}$ is the indicator function, and the Actor Covariate Alter Effect $$s_J(j^*, \mathcal{J}_*(a), \ldots ) = 1 - \Pi\{i(e) = j^*\} X\{j^*, \tau(e)\}$$

where $X\{j^*, \tau(e)\}$ is the value of the actor covariate X for actor $j^*$ at time $\tau(e)$.

In some situations, it may be advantageous to restrict the model to a set of focal actors $\mathcal{F}(t)$, a subset of actors in the relational event history:

$$\varepsilon_F = \{e \in \varepsilon : i(e) \in \mathcal{F}(\tau(e))\}$$

These situations can arise, for example, when there is a need for analysis of communications involving only a subset of actors in the relational event history, or when the relational event history includes complete data for one subset of actors but not for another. In these situations, instead of drawing inference using the joint probability of the entire event history, the joint probability of all events sent by the focal actors may be modeled. The joint probability density of all events sent by focal actors may be written:

$$f(\varepsilon_F | \varepsilon \setminus \varepsilon_F, \mathcal{W}, \mathcal{X}, \mathcal{Y}, \mathcal{Z}_0, \theta) = \prod_{e \in \mathcal{F}(\tau(e))} f(e | \varepsilon_{\tau(e)}, \mathcal{W}, \mathcal{X}, \mathcal{Y}, \mathcal{Z}_0, \theta)$$

In this distribution, all events that are initiated by non-focal actors are regarded as exogenous.

Following the population of the probability model 106 based on the relational event history 104 and covariate data 105, a baseline of communications behavior is determined (207). For example, in a situation in which the model described with respect to operation 205 is used, a baseline may be determined by estimating the effect values (statistical parameters). The estimated effect values represent the baseline communications behavior because they indicate the impact of the corresponding effect (statistic) on the event probabilities.

The effect values may be estimated, for instance, through maximum likelihood methods. The Newton-Raphson algorithm, for example, may be used. The Newton-Raphson algorithm is a method of determining a maximum likelihood through iterative optimization of parameter values that, given a current set of estimates, uses the first and second derivatives of the log likelihood function about these estimates to intelligently select the next, more likely set of estimates. Through the Newton-Raphson method, which may be performed, for example, using a distributed computing platform, a converged estimate of each effect value included in the probability model may be obtained.

Departures from the baseline of communications behavior may be determined (209). For instance, the baseline can be considered normal communications behavior, and deviations from the baseline can be considered abnormal, or anomalous behaviors. In models in which the baseline is represented by effect values estimated based on the relational event history, anomalous behaviors may be detected by comparing effect values for subsets (also referred to as pivots) of the relational event history to the baseline values in order to determine whether, when, or where behavior deviates from the norm.

A pivot may, for example, include only events involving a specific actor during a specific time period, only events involving a specific set of topics, or only events involving a specific subset of actors. If, for example, the baseline reveals that actors in the relational event history typically do not communicate between midnight and 6:00 AM, a particular actor initiating 30 events during those hours over a particular period of time might be considered anomalous. As another example, if one subset of actors typically communicates by email, but the majority of communications between actors in the subset during a specific time frame are phone calls, the switch in mode might be considered anomalous.

Effect values may be determined for a pivot using the same methods employed in determining the baseline, for example, through use of the Newton-Raphson method. Pivot-specific effect values may be referred to as "fixed effects."

Comparison of the fixed effects to the baseline may allow for estimation of the degree to which the communications behavior described by a particular pivot departs from normality. Other, more involved inferences may also be drawn. For example, it is possible to determine whether a fixed effect has high or low values, is increasing or decreasing, or is accelerating or decelerating. Further, it is possible to determine whether or how these features hang together between multiple fixed effects. Analyses of this nature may be performed through a hypothesis-testing framework that, for example, employs a score test to compare an alternative hypothesis for one or more effect values to a null hypothesis (i.e., the baseline).

Figure 3:
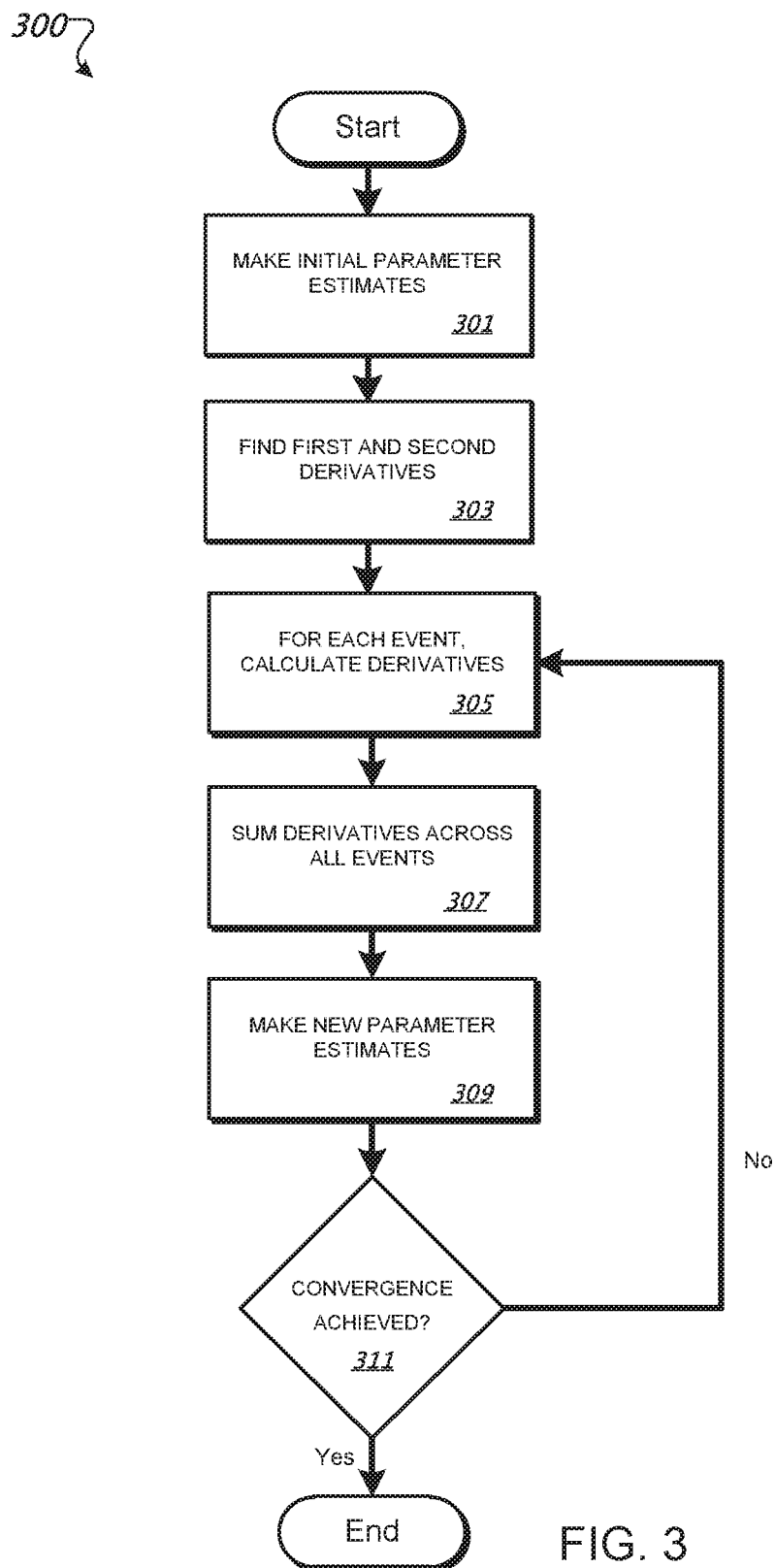
FIG. 3 is a flowchart of an example of a process for determining a baseline communications behavior for a relational event history.

FIG. 3 is a flowchart of an example of a process for determining a baseline communications behavior for a relational event history. The process 300 may be implemented, for example, using system 100. In such an implementation, one or more parts of the process may be executed by inference engine 107, which may interface with other computers through a network. Inference engine 107 may, for example, send or receive data involved in the process to and from one or more local or remote computers.

Assuming that the relational event history 104 and covariate data 105 contain enough information to compute probabilities of all events in the dataset, estimation of the baseline may be performed using a maximum likelihood method.

In more detail, it is possible to estimate effect values through maximum likelihood methods such as the Newton-Raphson method. Newton-Raphson is a method of iterative optimization of parameter values that, given a current set of estimates, uses the first and second derivatives of the log likelihood function about these estimates to intelligently select the next, more likely set of estimates. When applied in determining a baseline for the probability model 106, the Newton-Raphson method may use the first and second derivatives of the log likelihood function about a set of estimated effect values in order to select the next, more likely set of estimated effect values, with the goal of maximizing the "agreement" of the probability model 106 with the relational event history 104 and covariate data 105 on which the model 106 is based. Convergence of a set of effect values may be considered to have occurred when a summation across all events of the first derivative of the log likelihood function about the currently estimated effect values is approximately zero, and when the summation across all events of the second derivative of the log likelihood function about the currently estimated effect values meets or exceeds a threshold of negativity.

The joint probability of the relational event history ε may be adapted into a log likelihood that can be maximized numerically via Newton-Raphson:

$$L(\theta \mid \mathcal{Z}) = \sum_{e \in \varepsilon} \log f(e \mid \mathcal{Z}_{\tau(e)}, \theta)$$

The method begins with an initial parameter estimate $\hat{\theta}_O$ (301). First and second derivatives of the log likelihood with respect to θ may be derived (303):

$$V(\theta \mid \mathcal{Z}) = \frac{\partial L(\theta \mid \mathcal{Z})}{\partial \theta}$$

$$\mathcal{I}(\theta \mid \mathcal{Z}) = -\frac{\partial^2 L(\theta \mid \mathcal{Z})}{\partial \theta^2}$$

The initial parameter estimate $\hat{\theta}_O$ may be refined iteratively through update steps, in which first and second derivatives are evaluated at $\hat{\theta}_i$ for each event (305) and then summed across all events (307) in order to arrive at a new parameter estimate $\hat{\theta}_{i+1}$ (309):

$$\hat{\theta}_{i+1} = \hat{\theta}_i + V_{\hat{\theta}_i}{}^T(\theta \mid \mathcal{Z})\mathcal{I}_{\hat{\theta}_i}{}^{-1}(\theta \mid \mathcal{Z})|$$

Update steps may continue until optimization converges on a value (311). The converged value is the maximum likelihood estimate $\hat{\theta}$, which has an estimated covariance matrix that is the inverse of the second derivative matrix evaluated at $\hat{\theta}_O$:

$$\hat{\Sigma}_{\hat{\theta}} = \mathcal{I}_{\hat{\theta}}{}^{-1}(\theta \mid \mathcal{Z})$$

In a system 100 in which inference engine 107 is implemented on a distributed computing platform, the process of determining a baseline may involve distribution of the model 106 to a plurality of computers associated with inference engine 107, each of which is involved in computing the maximum likelihood estimate $\hat{\theta}$ through the Newton-Raphson algorithm. Different computers may, for example, evaluate first and second derivative values for different events, with those evaluated derivatives then being summed. In such an implementation, an individual computer to which the model is distributed may evaluate first and second derivatives for a single event (305) during each update of Newton-Raphson, and may report the evaluations to a central computer that sums the first and second derivatives across all events (307), and that forms a new parameter estimate based on the result of summing the first and second derivatives (309).

As explained above, each of the conditional distributions in the probability model 106 may be formulated as a multinomial logit. For purposes of deriving first and second derivatives that may be used in determining a baseline through the Newton-Raphson method, the following multinomial distribution, featuring a random variable X with an outcome space $\mathcal{X}$ and an arbitrary statistic s(x), may be considered:

$$f(X = x \mid \theta) = \frac{\exp \theta^T s(x)}{\sum_{x_a \in \mathcal{X}} \exp \theta^T s(x_a)}$$

The log likelihood of this distribution may be denoted:

$$g(X = x \mid \theta) = \log f(X = x \mid \theta)$$
$$= \theta^T s(x) - \log \sum_{x_a \in \mathcal{X}} \exp \theta^T s(x_a)$$

The first derivative of g is:

$$g'(X = x \mid \theta) = \frac{\partial g(X = x \mid \theta)}{\partial \theta}$$
$$= \frac{\partial}{\partial \theta} \theta^T s(x) - \frac{\partial}{\partial \theta} \log \sum_{x_a \in \mathcal{X}} \exp \theta^T s(x_a)$$
$$= s(x) - \frac{\sum_{x_a \in \mathcal{X}} s(x_a) \exp \theta^T s(x_a)}{\sum_{x_a \in \mathcal{X}} \exp \theta^T s(x_a)}$$
$$= s(x) - E_\theta\{s(X)\}$$

where $E_\theta\{s(X)\}$ is the expectation of the statistic s(X) with respect to the random variable X given the parameter θ.

Note that the expectation of a random variable y with domain Y and probability density p(y) is calculated by:

$$\sum_{y \in Y} y p(y)$$

In deriving the first derivative of g, note that $y=s(x_a)$ and p(y) is the multinomial distribution $f(X=x|\theta)$, which allows for the final simplification.

The second derivative of g is:

$$g''(X = x \mid \theta) = \frac{\partial^2 g(X = x \mid \theta)^T}{\partial \theta^2}$$
$$= \frac{\partial}{\partial \theta}(s(x) - E_\theta\{s(X)\})^T$$
$$= -\frac{\partial}{\partial \theta} E_\theta\{s(X)\}^T$$
$$= -\sum_{X \in \mathcal{X}} \frac{\partial}{\partial \theta} f(X = x \mid \theta) s(X)^T$$

Note the relationship between f and the first derivative of g:

$$g'(X = x \mid \theta) = \frac{\partial \log f(X = x \mid \theta)}{\partial \theta}$$
$$= \frac{1}{f(X = x \mid \theta)} \frac{\partial f(X = x \mid \theta)}{\partial \theta}$$

so that $$\frac{\partial}{\partial \theta} f(X = x \mid \theta) = f(X = x \mid \theta) g'(X = x \mid \theta)$$

Incorporating this relationship allows for further derivation:

$$g''(X = x \mid \theta) = -\sum_{X \in \mathcal{X}} f(X = x \mid \theta) g'(X = x \mid \theta) s(X)^T$$
$$= -E_\theta \mid \{g'(X = x \mid \theta) s(X)^T\}$$
$$= -E_\theta \{(s(X) - E_\theta\{s(X)\}) s(X)^T\}$$
$$= -E_\theta \{s(X) s(X)^T\} - E_\theta \{[E_\theta\{s(X)\}] s(X)^T\}$$
$$= -E_\theta \{s(X) s(X)^T\} - E_\theta \{s(X)\} E_\theta\{s(X)\}^T$$
$$= -\text{Cov}_\theta \{s(X)\}$$

where $\text{Cov}_\theta\{s(X)\}$ is the covariance matrix of given $\theta$

It can be observed that:

$$\text{Cov}_\theta \{g'(X = x \mid \theta)\} = \text{Cov}_\theta \{s(X) - E_\theta\{s(X)\}\}$$
$$= E_\theta \{(s(X) - E_\theta\{s(X)\})(s(X) - E_\theta\{s(X)\})^T\}$$
$$= E_\theta \{s(X) s(X)^T - 2E_\theta\{s(X)\} s(X)^T +$$
$$E_\theta\{s(X)\} E_\theta\{s(X)\}^T\}$$
$$= E_\theta \{s(X) s(X)^T\} - E_\theta\{s(X)\} E_\theta\{s(X)\}^T$$
$$= \text{Cov}_\theta \{s(X)\}$$

Giving:

$$g''(X = x \mid \theta) = -\text{Cov}_\theta \{s(X)\}$$
$$= -\text{Cov}_\theta \{g'(X = x \mid \theta)\}$$

Because each of the ego, mode, topic, and alter distributions are multinomial logits, these results can be applied when determining the baseline using the Newton-Raphson method.

Figure 4:
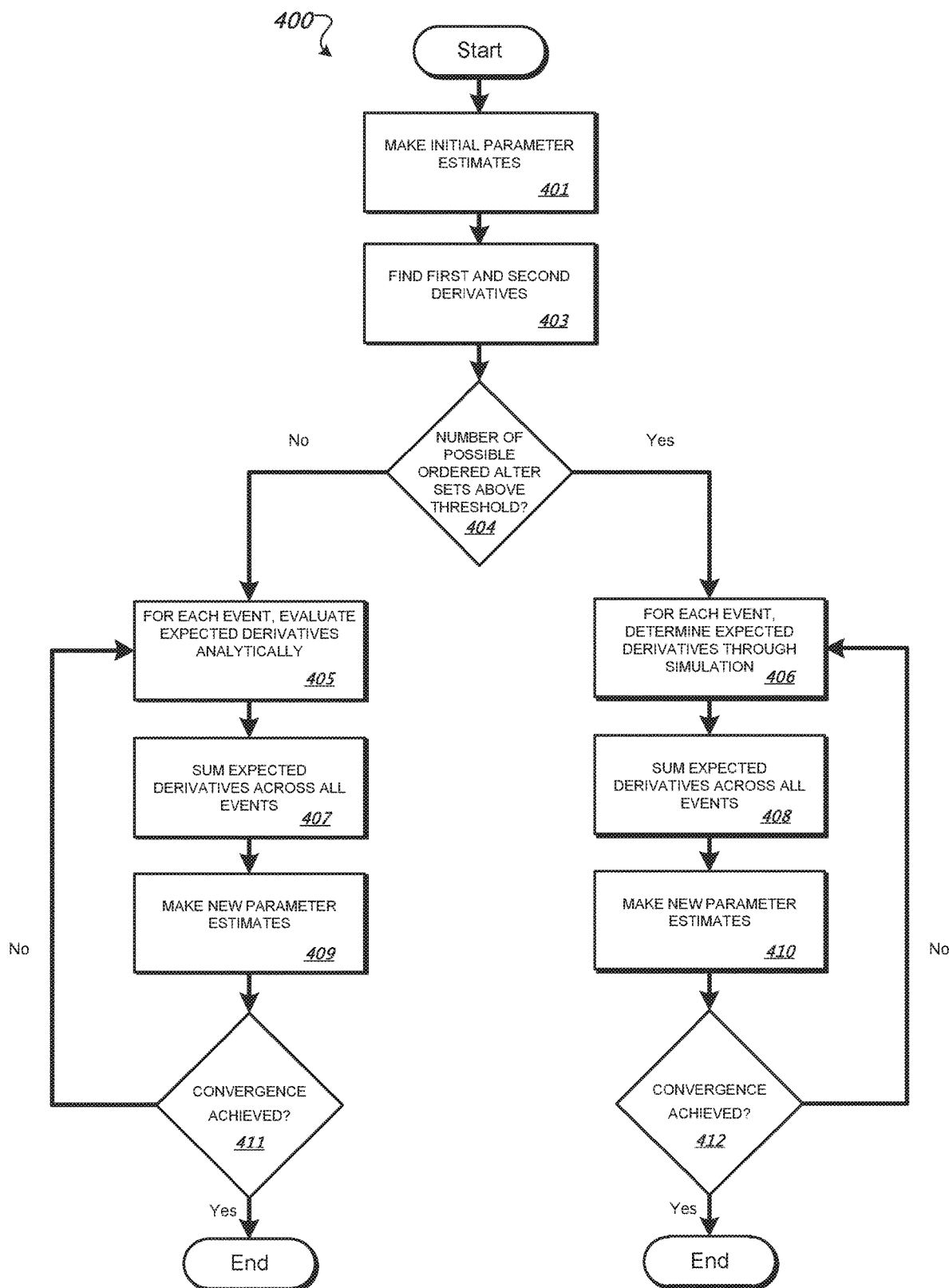
FIG. 4 is a flowchart of another example of a process for determining a baseline communications behavior for a relational event history.

FIG. 4 is a flowchart of another example of a process 400 for determining a baseline communications behavior for a relational event history. The process 400 may be implemented, for example, using system 100. In such an implementation, one or more parts of the process may be executed by inference engine 107, which may interface with other computers through a network. Inference engine 107 may, for example, send or receive data involved in the process to and from one or more local or remote computers.

The process 400 may be used when the order in which recipients are selected by the sender is unknown. As indicated above, in the situation in which the sender of a communication may select multiple recipients for the communication, the sender's choice of which recipients to include may be best modeled as a set of sequential decisions involving an order in which recipients are added by the sender to the communication, rather than a single decision. A single email, for example, may be addressed to multiple recipients, and the sender of the email may add each recipient in sequence.

As a result, a model, such as the one described with respect to operation 205 above, may model the choice of recipients as a sequential set of decisions. In this case, the model may be used without issue when the order of the selection of the recipients is known. However, in some cases, the recipients may be known, but not the order, which may present a missing data problem if the model is to be employed.

More formally, when attempting to determine a baseline, it may be the case that, for each event e, an unordered set of chosen alters $\mathcal{A}$ (e) is known, but $\mathcal{J}$ (e), denoting an ordered set of alters representing the sequence in which alters were chosen, is not known. In such a case, $\mathfrak{J}$ (e), denoting the set of all possible ordered sets $\mathcal{J}$ (e) satisfying the requirement that the sequence of alter selections in $\mathcal{J}$ (e) could have yielded the observed $\mathcal{A}$ (e) is also not known, which presents a missing data problem.

To estimate $\hat{\theta}$ in such a situation, the expectation maximization (EM) algorithm may be employed. The algorithm consists of two steps that may be executed iteratively until $\hat{\theta}$ converges. Performing EM using probability model 106 involves calculation of expectations of quantities that depend on the missing sequences of alter choices. In general, evaluation of the expectation of a function $h(\mathcal{J}(e), \mathcal{Z}_{\tau(e)}, \theta)$ may be performed using:

$$E_\theta\{h(\mathcal{J}(e), \mathcal{Z}_{\tau(e)}, \theta)\} = \sum_{\mathcal{J}(e) \in \mathfrak{J}(e)} f(\mathcal{J}(e) \mathcal{A}(e), \mathcal{Z}_{\tau(e)}, \theta) h(\mathcal{J}(e) \mathcal{Z}_{\tau(e)}, \mid \theta)$$

where density| $f(\mathcal{J}(e) \mid \mathcal{A}(e), \mathcal{Z}_{\tau(e)}, \theta)$ is the probability of the alter selection sequence $\mathcal{J}$ (e) given that the set $\mathcal{A}$ (e) is ultimately chosen.

During a maximization step, a single update of the Newton-Raphson algorithm is conducted by summing the expected first and second derivatives across all events:

$$\hat{\theta}_{i+1} = \hat{\theta}_i + E_{\hat{\theta}_i}\{V^T(\theta|\mathcal{Z})\}[E_{\hat{\theta}_i}\{\mathcal{I}(\theta|\mathcal{Z})\}]^{-1}$$

New parameter estimates can be formed based on the result of summing the first and second derivatives, and the EM process may be repeated until convergence of $\hat{\theta}_i$ is achieved.

The most practically difficult part of the EM process is computing expectations of the form:

$$E_\theta\{h(\mathcal{J}(e), \mathcal{Z}_{\tau(e)}, \theta)\} = \sum_{\mathcal{J}(e) \in \mathfrak{J}(e)} f(\mathcal{J}(e), \mathcal{A}(e), \mathcal{Z}_{\tau(e)}, \theta) h(\mathcal{J}(e), \mathcal{Z}_{\tau(e)} | \theta)$$

Two approaches may be taken, depending on the size of $\mathfrak{J}(e)$, which is given by:

$$|\mathfrak{J}(e)| = |\mathcal{A}(e)|!$$

When the number of actors in the unordered set of alters is below a threshold number (e.g., of size 5 or less), analytical estimation may be feasible and therefore performed. Noting that:

$$f(\mathcal{J}(e) | \mathcal{A}(e), \mathcal{Z}_{\tau(e)}, \theta) = \frac{f(\mathcal{J}(e), \mathcal{A}(e) | \mathcal{Z}_{\tau(e)}, \theta)}{f(\mathcal{A}(e) | \mathcal{Z}_{\tau(e)}, \theta)}$$

and $\mathcal{J}(e) \Rightarrow \mathcal{A}(e)$ $$f(\mathcal{J}(e), \mathcal{A}(e) | \mathcal{Z}_{\tau(e)}, \theta) = f(\mathcal{J}(e) | \mathcal{Z}_{\tau(e)}, \theta)$$

Since $$f(\mathcal{A}(e) | \mathcal{Z}_{\tau(e)}, \theta) = \sum_{\mathcal{J}(e) \in \mathfrak{J}(e)} f(\mathcal{J}(e) | \mathcal{Z}_{\tau(e)}, \theta)$$

It is possible to directly evaluate $$f(\mathcal{J}(e) | \mathcal{A}(e), \mathcal{Z}_{\tau(e)}, \theta) = \frac{f(\mathcal{J}(e) | \mathcal{Z}_{\tau(e)}, \theta)}{f(\mathcal{A}(e) | \mathcal{Z}_{\tau(e)}, \theta)}$$

However, when the number of actors in the unordered set of alters is above a threshold number, analytical evaluation may be practically infeasible. Instead, numerical techniques, such as Markov chain Monte Carlo (MCMC) simulation, may be used to approximate the expectation.

To conduct maximum likelihood estimation with EM, an initial parameter estimate $\hat{\theta}_O$ is made (401), and first and second derivatives are derived (403). Prior to performing the expectation step, a determination may be made as to whether the number of possible ordered alter sets, $|\mathfrak{J}(e)|$, is above a threshold (404). If $|\mathfrak{J}(e)|$ is below the threshold, EM may proceed with the expectation being evaluated analytically (404). If, on the other hand, $|\mathfrak{J}(e)|$, is above the threshold, MCMC is used to determine the expectation through simulation (406).

In the first case, in which $|\mathfrak{J}(e)|$ is below the threshold, expected first and second derivatives ($E_{\hat{\theta}_O}\{V(\theta|\mathcal{Z})\}$ and $E_{\hat{\theta}_O}\{\mathcal{I}(\theta|\mathcal{Z})\}$, respectively) are evaluated for all events (405). A single update of the Newton-Raphson algorithm is conducted by summing the expected first and second derivatives across all events (407), and new parameter estimates are formed based on the result of summing the first and second derivatives (409). The EM process may then be repeated until convergence of $\hat{\theta}_i$ is achieved (411).

In the second case, in which $|\mathfrak{J}(e)|$ is above the threshold, the expected first and second derivatives are determined for each event through simulation. For example, application of a numerical technique such as MCMC may be employed to conduct the simulation (406).

A Markov chain is a stochastic process involving transitions between states, where the conditional probability distribution of future states of the process depends only on the present state, and not on the preceding sequence of states. For example, given a process with a set of two possible states i and j, the process is a Markov chain if the probability that the process will transition from a present state i to a next state j depends only on the present state i, and not on the states that preceded the present state. Many Markov chains feature what is called an equilibrium distribution, such that, from the present state, the probability that, after a sufficient number of transitions, the process will be in a specific state no longer changes from one transition to the next. If, for example, the probability of the process being in state i after n transitions is p, and the probability of the process being in state i after any number of transitions after n is also p, then the Markov chain can be said to have an equilibrium distribution.

Monte Carlo methods are computational algorithms that randomly sample from a process, and Markov chain Monte Carlo methods involve sampling from a Markov chain constructed such that the target distribution is the Markov chain's equilibrium distribution. After a sufficient number of transitions, draws taken from the Markov chain will appear as if they resulted from the target distribution. By taking the sample average of draws, values for quantities of interest can be approximated.

MCMC may be used to approximate expectations of quantities that depend on a missing sequence of alter choices. In more detail, MCMC may be used to sample draws of possible ordered sets of alters, $\mathcal{J}(e)$, from the density $f(\mathcal{J}(e) | \mathcal{A}(e), \mathcal{Z}_{\tau(e)}, \theta)$, which is the probability of the alter selection sequence $\mathcal{J}(e)$ given that the set of undordered alters $\mathcal{A}(e)$ is chosen. Draws may be sampled in the following way:

Let $\mathcal{J}^{(1)}(e)$ be an arbitrary sequence containing the elements of $\mathcal{A}(e)$. For each desired (i-th) sample $\mathcal{J}^{(i)}(e)$, execute the following steps:

1. Draw a new sequence $\mathcal{J}^*(e) \in \mathfrak{J}(e)$ at uniform random. $\mathcal{J}^*(e)$ is called the proposal.
2. Evaluate the acceptance probability $$\pi_i = \max\left\{1, \frac{f(\mathcal{J}^*(e), \mathcal{A}(e) | \mathcal{Z}_{\tau(e)}, \theta)}{f(\mathcal{J}^{(i)}(e), \mathcal{A}(e) | \mathcal{Z}_{\tau(e)}, \theta)}\right\}$$

3. With probability $\pi_i$, set $\mathcal{J}^{(i)} = \mathcal{J}^*$, otherwise set $\mathcal{J}^{(i)} = \mathcal{J}^{(i-1)}$.

Because the sample sets $\mathcal{J}^{(i)}$ are approximately distributed $f(\mathcal{J}(e) | \mathcal{A}(e), \mathcal{Z}_{\tau(e)}, \theta)$, it is possible to calculate the expectation, using a sample size N, by the ergodic average:

$$E_\theta\{h(\mathcal{J}(e), \mathcal{Z}_{\tau(e)}, \theta)\} \approx \sum_{i=1}^{N} h(\mathcal{J}^{(i)}(e), \mathcal{Z}_{\tau(e)}, \theta)$$

Having calculated the expectation, expected first and second derivatives can be determined for all events (406). A single update of the Newton-Raphson algorithm is conducted by summing the expected first and second derivatives across all events (408), and new parameter estimates are formed based on the result of summing the first and second derivatives (410). The EM process may then be repeated until convergence of $\hat{\theta}_i$ is achieved (412).

Figure 5:
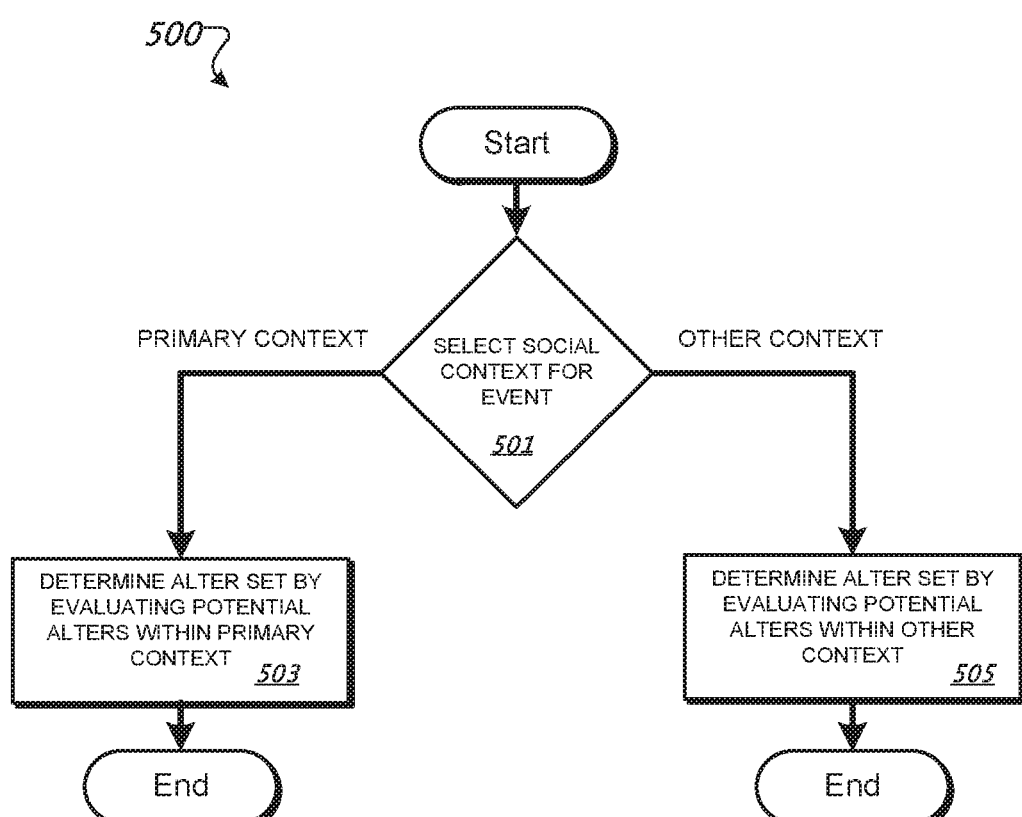
FIG. 5 is a flowchart of an example of a process for modeling a set of sequential decisions made by a sender of a communication in determining recipients of the communication.

FIG. 5 is a flowchart of an example of a process 500 for modeling a set of sequential decisions made by a sender of a communication in determining recipients of the communication. The process 500 may be implemented, for example, using system 100. In such an implementation, one or more parts of the process may be executed by inference engine 107, which may interface with other computers through a network. Inference engine 107 may, for example, send or receive data involved in the process to and from one or more local or remote computers.

As explained above, in some situations, the alter risk set introduced earlier, which defines the choices of alter available to an ego for the alter selection decision at hand, can become extremely large, leading to computational complexity. As such, in a situation in which a sender of a communication (i.e. ego) may select multiple recipients (i.e. alters) for the communication, the sender's choice of which recipients to include may be best modeled as a set of sequential decisions involving an order in which recipients are added by the sender to the communication, rather than as a single decision. The model may be further refined by considering the sender's choice of which recipients to include as involving a two-stage decision process, whereby the sender first considers a social context in which to communicate, and then chooses recipients of the communication from a set of actors belonging to the social context. For example, in a situation in which potential recipients of the sender's communication appear in multiple social contexts or settings, the set of sequential decisions described above may include, for at least some of the events, one or more social context selection decisions, and one or more additional decisions as to which recipients in a selected social context(s) to include.

In more detail, a sender of a communication may interact with other actors in a variety of contexts, and both the sender and the other actors with whom the sender interacts may be categorized as belonging to specific social contexts or settings. A primary setting, for example, may include actors who belong to an organization or who engage in related activities, while another setting may include actors who have interacted, or who have the potential to interact, at a specific time and/or place.

A sender of a communication may, for example, choose to communicate with actors in a primary setting or in a meeting setting, with one set of potential recipients (e.g., a set including the sender's coworkers and clients) corresponding to the primary setting, and another set of potential recipients (e.g., a set including meeting attendees) corresponding to the meeting setting. In some instances, social contexts or settings may be mutually exclusive, with each potential recipient being modeled as belonging to only one context or setting. In other instances, actors categorized as belonging to one social context or setting may be categorized as belonging to others as well (e.g., a potential recipient may be both a coworker of the sender and a meeting attendee, in which case the potential recipient could be categorized as belonging to both the primary and meeting settings).

As such, for each communication event, a sender of the communication corresponding to the event may select a social context in which to communicate, prior to determining which potential recipients to communicate with, and the model may be formulated such that the calculation of probabilities associated with the sender's decisions takes this selection into account (501).

In more detail, a primary alter risk set $\mathcal{R}_P$ consisting of potential recipients belonging to a primary social context, and a meeting alter risk set $\mathcal{R}_M$ consisting of potential recipients belonging to a meeting social context, may be defined differently, and the sender of the communication may select one of the primary or meeting social contexts prior to sending a communication. If, for example, the primary social context involves actors with whom the sender has recently been in contact, the primary alter risk set $\mathcal{R}_P$ may be defined using a sliding window $\lambda$.

More formally, the set of actors with whom an ego i has been involved in at least one event occurring on the interval $[t_0, t]$ may be written:

$$\mathcal{P}_{(i,t,t_0)} = \{j \in \mathcal{N}_i : |\{e \in \varepsilon_i : \{i,j\} \subseteq i(e) \cup \mathcal{J}_*(e), \tau(e) \geq t_0\}| > 0\}$$

In this case, the primary alter risk set $\mathcal{R}_P$ can be defined, given some sliding window $\lambda$, as:

$$\mathcal{R}_P(i, \mathcal{J}_*(a), t) = \begin{cases} \mathcal{P}(i, t, t-\lambda) & \mathcal{J}_*(a) = \phi \\ i \cup \mathcal{P}(i, t, t-\lambda) \setminus \mathcal{J}_*(a) & \text{else} \end{cases}$$

Given this definition of the primary alter risk set $\mathcal{R}_P$, the meeting alter risk set $\mathcal{R}_M$ may be defined such that the primary and meeting settings are mutually exclusive and collectively exhaustive:

$$\mathcal{R}_M(i, \mathcal{J}_*(a), t) = \mathcal{N}_i(t) \setminus \mathcal{R}_P(i, \mathcal{J}_*(a), t)$$

Other definitions of the primary alter risk set $\mathcal{R}_P$ and the meeting alter risk set $\mathcal{R}_M$ are, of course, possible.

Based on the selection of the social context, the sender may make one or more additional decisions as to which recipients within the selected social context with whom to communicate. After selecting a primary social context, for example, the sender may determine a set of recipients for the communication by selecting one or more potential recipients from the primary alter risk set $\mathcal{R}_P$, using a primary evaluation function (503). Alternately, after selecting another social context, the sender may determine a set of recipients for the communication by selecting one or more potential recipients from within the other social context, using another evaluation function (505).

The evaluation functions used to calculate probabilities associated with the sender's decisions as to recipients may differ depending on the selected social context, the differences reflecting the different ways in which the actor scrutinizes potential recipients in each setting. In the primary setting, for example, alter selection may occur in the same way described above with reference to FIG. 2, while a different evaluation function may be used for alter selection in the meeting setting. Alter selection in the meeting setting may involve, for example, choosing at uniform random a potential recipient who is in the meeting setting but who is not in the primary setting or the current alter set, and then evaluating whether to include the chosen potential recipient in the current alter set using an evaluation function that is specific to the meeting setting.

More formally, the probability density function for this example may be written:

$$f(\mathcal{J}(e) \mid \tau(e), \ldots) =$$

$$\prod_{j^* \in \mathcal{J}(e)} \begin{cases} \kappa \cdot f_P(j^* \mid \mathcal{J}_*(a), \tau(e), \ldots) & j^* \in \mathcal{R}_P(i, \mathcal{J}_*(a), \tau(e)) \\ (1-\kappa) \cdot f_M(j^* \mid \mathcal{J}_*(a), \tau(e), \ldots) & j^* \in \mathcal{R}_M(i, \mathcal{J}_*(a), \tau(e)) \end{cases}$$

where:
- κ is the probability that ego i chooses to communicate within her primary setting,
- $f_p$ is the probability density of adding j* to the alter set (given j* is in ego's primary setting),
- $\mathcal{R}_P$ is the primary alter risk set corresponding to ego's primary setting,
- $f_M$ is the probability density of adding j* to the alter set (given j* is in ego's meeting setting),
- and $\mathcal{R}_M$ is the meeting alter risk set corresponding to ego's meeting setting.

The primary alter selection distribution $f_P$ included in the probability density function may differ in only minor ways from the alter selection distribution presented above. Specifically, the primary alter evaluation function $\phi_{JP}$ may be used, and the alters available for selection may be limited to those belonging to the primary alter risk set $\mathcal{R}_P$, such that the primary alter selection distribution $f_P$ may be written:

$$f_P(j^* \mid \ldots) = \frac{\exp \phi_{JP}(j^*, \mathcal{J}_*(a), \ldots)}{\sum_{j \in \mathcal{R}_{JP}(i(e), \mathcal{J}_*(a), \tau(e))} \exp \phi_{JP}(j, \mathcal{J}_*(a), \ldots)}$$

The meeting alter selection distribution $f_M$ may differ from the primary alter selection distribution $f_P$. The meeting alter selection distribution may, for example, include two conditionally independent probabilities: a first probability that a member j* of the meeting setting is selected for evaluation, and a second probability that, conditioned on j* being selected for evaluation, j* added into the alter set.

A probability that a member j* of the meeting setting is selected for evaluation for inclusion in the alter risk set, where selection between members of the meeting setting is at uniform random, may take the form:

$$|\mathcal{R}_{JM}(i(e), \mathcal{J}_*(a), \tau(e))|^{-1}$$

The probability that a selected member j* is added into the alter set may take the form of a simple logit, where there are only two alternatives (to add j* to the alter set, or to not to add j* to the alter set):

$$\frac{\exp \phi_{JM}(j^*, \ldots)}{1 + \exp \phi_{JM}(j^*, \ldots)}$$

As such, the meeting alter selection distribution $f_M$ may be written:

$$f_M(j^* \mid \ldots) = |\mathcal{R}_{JM}(i(e), \mathcal{J}_*(a), \tau(e))|^{-1} \cdot \frac{\exp \phi_{JM}(j^*, \ldots)}{1 + \exp \phi_{JM}(j^*, \ldots)}$$

Employing, dependent on social context, different evaluation functions to calculate probabilities associated with a sender's decisions as to recipients of a communication, as described above, enables the social context(s) in which communications occur to be taken into account when modeling communications behavior.

Figure 6:
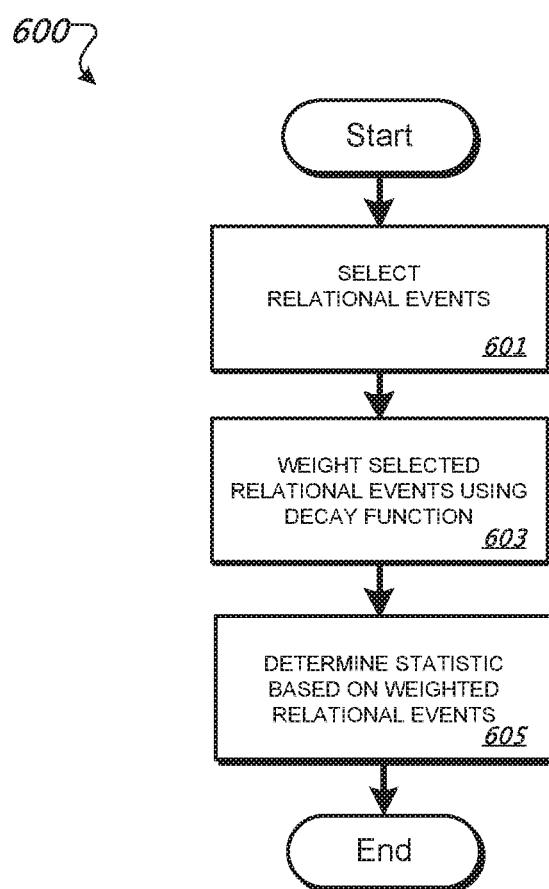
FIG. 6 is a flowchart of an example of a process for determining a statistic using a decay function.

FIG. 6 is a flowchart of an example of a process 600 for determining a statistic using a decay function. The process 600 may be implemented, for example, using system 100. In such an implementation, one or more parts of the process may be executed by inference engine 107, which may interface with other computers through a network. Inference engine 107 may, for example, send or receive data involved in the process to and from one or more local or remote computers.

The likelihood of an event's occurrence may depend on other events that have occurred in the past. The likelihood of a child calling her mother, for example, may increase if the mother recently attempted to call the child. The impact of past events on the likelihood of a future event may vary, however, depending on the relative distance of the events in terms of time. For example, a man may be more likely to respond to a voicemail left one day ago, than to a voicemail left one year ago.

When modeling social behavior, the impact of past relational events on the probability of a future relational event may be taken into account, and the reliability of the probability model may be enhanced by taking into account only those relational events that occurred within a certain time frame, and/or by discounting the impact of past relational events in proportion to their distance from the future relational event in terms of time. The concept of time may be considered in terms of, for example, clock time and/or social time. For example, when clock time is used, the amount of time since a previous event may be used to weight the relevance of the prior event. As another example, when social time is used, a number of relational events occurring between a past relational event and a future relational event may be used, for example, to weight the relevance of the past relational event.

In more detail, a decay function may be used within a model, or within a statistic included in a model, to incorporate the idea that relational events that occurred far in the past are less relevant for purposes of prediction than relational events that occurred recently.

As noted above, the incorporation of the passage of time into the impact of an event on future events may be modeled through a decay function using the following general form:

$$s(t, \ldots) = \sum_{\{e \in \mathcal{E}: \Psi_I(e, \ldots)\}} \delta(t, \tau(e))$$

where $\Psi_I(e, \ldots)$ is called a predicate, and describes criteria by which a subset of events is selected In words, a statistic s may be determined based on a selected subset of relational events, where the subset of relational events is selected according to a predicate Ψ (601). Each selected event may then be weighted using a decay function δ (603), and the statistic s may be determined based on the weighted events by, for example, summing the weighted events (605).

The predicate Ψ describing criteria by which the subset of events is selected may vary depending on the statistic s. The activity ego selection effect, for example, is a statistic that is defined through its predicate, where the predicate indicates that only those relational events e that have been sent by the ego i will be selected for inclusion in the subset. The predicate of another statistic, the popularity ego selection effect, instead specifies that only those relational events that have been sent to the ego i will be selected for inclusion in the subset.

the activity ego selection effect $$\Psi_I(e, i^*) = \{i^* = i(e)\}$$

the popularity ego selection effect $$\Psi_I(e, i^*) = \{i^* \in \mathcal{J}(e)\}$$

The form of the decay function δ used to determine a statistic s determines the manner in which the relational events contained within the selected subset of relational events are weighted, where the weight of a relational event indicates the impact of the relational event on the probability of a future relational event's occurrence. An exponential decay function may be used, for example, to model the relevance of a first relational event for purposes of predicting the occurrence of a second relational event when the relevance is inversely proportional to the time that has passed since the first relational event's occurrence. Given some increasing value $\Delta$, the value of an exponentially decaying quantity $\delta$ may be determined, for example, using the following exponential decay function:

$$\delta(x,\rho)=\exp\{-\rho\Delta\}$$

According to this function, the value of the quantity $\delta$ monotonically decreases in $\Delta$ when $\rho>0$. In nature, for example, values that decay in this way include masses of radioactive materials. The rate of decay is linear in the amount of quantity $\delta$ remaining:

$$\frac{\partial \delta(\Delta,\rho)}{\partial \Delta}=-\rho\,\delta(\Delta,\rho)$$

In other words, the more positive the decay parameter $\rho$ is, the more quickly the quantity $\delta$ decreases in $\Delta$.

When modeling the relevance of a relational event to the occurrence of a future relational event, $\Delta$ can be considered to be an abstract representation of the passage of time:

For $\Delta\in[0,\infty)$ and $\rho>0$, $\delta(\Delta,\rho)\in(0,1]$

Modeled in this way, when no time elapses, i.e. $\Delta=0$, the relevance of an event is 1, and as $\Delta\to\infty$, the relevance of an event approaches 0. When $\rho=0$, the relevance of an event is always 1, regardless of the amount of time $\Delta$ that has elapsed, and when $\rho$ increases, the relevance of the event will approach 0 as time passes.

$\Delta$ can be used in different ways to model the passage of time from one event occurring at time $t_0$ to another event occurring at time $t_1>t_0$. The simplest way to operationalize the passage of time through $\Delta$ is to use clock time, i.e. $t_1-t_0$, which yields a time decay function:

$$\delta(t_1-t_0,\rho)$$

A disadvantage of using clock time in modeling the relevance of relational events, however, is that relevance will decay at the same rate without regard for social context. The relevance of a relational event will decay, for example, at the same rate in the middle of the night as it will during the middle of the workday. The concept of social time that progresses only when communications occur, rather than based on the passage of clock time, can be incorporated into the model by focusing on events occurring after $t_0$ and at or before $t_1$, events in the set:

$$\varepsilon_{(t_0,t_1]}=\{e\in\varepsilon:\tau(e)>t_0,\tau_e\leq t_1\}$$

$|\varepsilon_{(t_0,t_1]}|$, i.e., the number of events occurring $\varepsilon_{(t_0,t_1]}$, may be used to operationalize the passage of social time, yielding an event-wise decay function:

$$\delta(|\varepsilon_{(t_0,t_1]}|,\rho).$$

When used to determine a statistic s based on a selected subset of relational events, the event-wise decay function renders the amount of clock time occurring between selected events irrelevant: instead of assigning weights to the selected events based on the passage of clock time, the event-wise decay function assigns weights to events based on the order in which they occurred. Specifically, the weights assigned by the event-wise decay function to a series of selected events vary such that each selected event has a higher weight than the event occurring after it in time, and a lower weight than the event occurring before it in time. Thus, when the event-wise decay function is used, it is the occurrence of events, rather than the passage of time, that matters for purposes of determining the relevance of a relational event.

The criteria for determining relevance may also be restricted to focus on the social time of a particular actor, i. A participating event-wise decay function, for example, may be formulated:

$$\delta(\#_p(i,t_0,t_1),\rho) \text{ where}$$

$$\#_p(i,t_0,t_1)=|\{e\in\varepsilon_{(t_0,t_1]}:i\in i(e)\cup \mathcal{J}(e)\}|$$

Like the event-wise decay function, the participating event-wise decay function renders the amount of clock time occurring between selected events irrelevant, because the weights assigned to events by the participating event-wise decay function vary based on the order in which events occurred. However, when the participating event-wise decay function is used, the weight assigned to a first selected event will match the weight assigned to a second selected event occurring after the first selected event in time, if the particular actor i did not participate in the second selected event. If, on the other hand, the actor i did participate in the second selected event (as, e.g., a sender or a receiver), the first selected event will have a higher weight than the second selected event. As such, when the participating event-wise decay function is used, it is the occurrence of events involving the actor i, rather than the passage of time, that matters for purposes of determining the relevance of a relational event.

The criteria for determining relevance may be further restricted so as to require, for example, that, for social time to elapse, the actor i must have been the sender of an event. A sending event-wise decay function may be formulated:

$$\delta(\#_s(i,t_0,t_1),\rho) \text{ where}$$

$$\#_s(i,t_0,t_1)=|\{e\in\varepsilon_{(t_0,t_1]}:i=i(e)\}|$$

When the sending event-wise decay function is used, the weights assigned to events vary based on the order in which events occurred. However, a weight assigned to a first selected event by the sending event-wise decay function will match the weight assigned to a second selected event occurring after the first selected event in time, if the actor i did not send the second selected event. Alternatively, if the actor i did send the second selected event, the first selected event will have a higher weight than the second selected event. Thus, when the sending event-wise decay function is used, it is the occurrence of events sent by the actor i, rather than the passage of time, that matters for purposes of determining the relevance of a relational event.

Any of the exemplary decay functions described above may be used to determine a statistic s that is included in a probability model. The statistic s may be determined, for example, based on a selected subset of relational events, where the subset of relational events is selected according to a predicate $\Psi$ that is specific to the statistic s (601). Each selected event may then be weighted using a decay function (603), and the statistic s may be determined based on the weighted events (605). The weighted events may be summed, for example, in order to produce a value for s.

Figure 7:
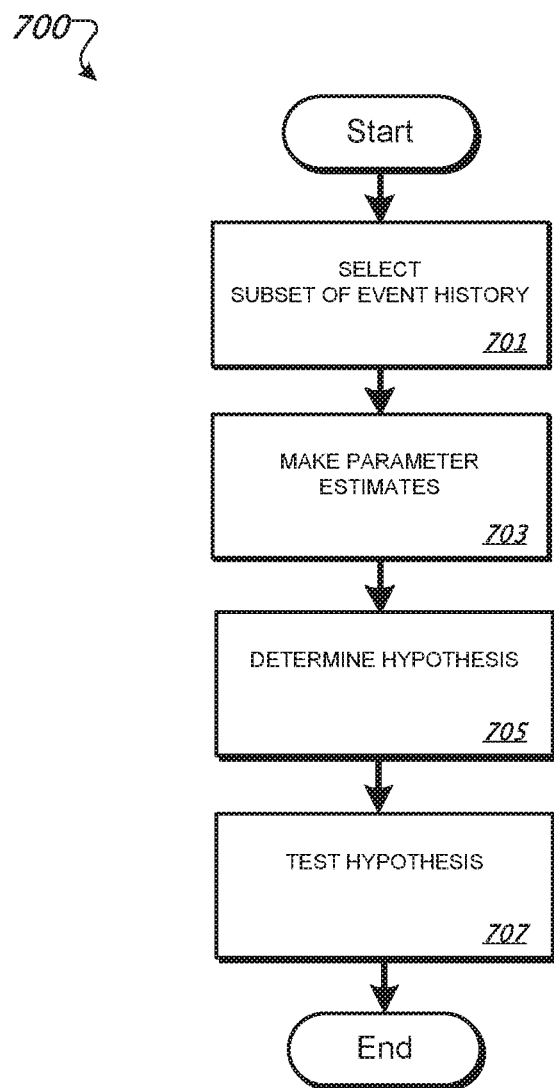
FIG. 7 is a flowchart of an example of a process for analyzing social behavior.

FIG. 7 is a flowchart of an example of a process for analyzing social behavior. The process 700 may be implemented, for example, using system 100. In such an implementation, one or more parts of the process may be executed by inference engine 107, which may interface with other computers through a network. Inference engine 107 may, for example, send or receive data involved in the process to and from one or more local or remote computers.

A probability model that is populated based on a relational event history may be used to identify patterns, changes, and anomalies within the relational event history, and to draw sophisticated inferences regarding a variety of communications behaviors. As explained above, a baselining process may be used with a model to determine communications behavior that is "normal" for a given relational event history. The resulting baseline includes a set of effect values (statistical parameters) that correspond to the statistics included in the model. Once determined, the baseline can be employed to detect departures from normal communications behavior.

In more detail, the statistical parameters obtained through the baselining process can form the basis for follow on analysis; in practical terms, pinning down normality during the baselining process makes it possible to detect abnormality, or anomalous behaviors, in the form of deviations from the baseline. Effect values for subsets of the relational event history ("pivots") may be compared to the baseline values in order to determine whether, when, and/or how behavior deviates from the norm. A pivot may, for example, include only relational events involving a specific actor during a specific time period, and effect values for a pivot ("fixed effects") may be used to create an alternative hypothesis that can be compared with a null hypothesis, the baseline, through a hypothesis-testing framework that, for example, employs a score test.

Hypothesis testing may allow for estimation of the degree to which the communications behavior described by a particular pivot departs from normality. Other, more involved inferences may also be drawn. For example, it is possible to determine whether a fixed effect has high or low values, is increasing or decreasing, or is accelerating or decelerating. Further, it is possible to determine whether or how these features hang together between multiple fixed effects.

Thus, and as is explained in more detail below, social behavior may be analyzed by selecting a subset of relational events, the subset containing pivots (701), estimating values for corresponding fixed effects (703), determining an alternative hypothesis (705), and testing the alternative hypothesis against the null hypothesis, the baseline (707).

Selection of subsets of relational events (701) may be arbitrary, or may instead be driven by the particular individuals and/or behaviors that are the subjects of analysis. Recalling the popularity ego selection effect described above, an analyst may wish to determine based on a relational event history, for example, whether a particular actor's popularity increased over a particular period of time, in which case the relational events selected for inclusion in the subset of relational events may include relational events that occurred during the particular period of time, and in which the particular actor was a participant.

In more detail, a set $\Xi = \{\xi_1, \xi_2, \ldots\}$ includes pivots $\xi_i \subseteq \varepsilon$ that are selected subsets of the relational event history, and hypothesis testing my be performed in order to determine whether statistical parameters corresponding to effects being evaluated over the pivots are homogenous over the entire relational event history $\varepsilon$, or if they are instead heterogeneous, differing for some elements of the subset $\Xi$.

As described above, a statistical parameter may be denoted $\theta = (\alpha, \beta, \gamma, \eta)$, where $\alpha$ denotes ego effects, $\beta$ denotes mode effects, $\gamma$ denotes topic effects, and $\eta$ denotes alter effects. In order to account for heterogeneity of effects between pivots, the model may be elaborated, to allow a set of statistical parameters $\Omega$ to vary across events. In the elaborated model, the set of statistical parameters may be denoted $\Omega = (\omega_1, \ldots, \omega_\Xi)$, where $\omega_i$ corresponds to a i-th level pivot $\xi_i$. An i-th level pivot may, for example, contain a subset of relational events in which a particular actor i was a participant. Parameters may depend on events, such that:

$$\theta_i(e) = \begin{cases} \omega_i & e \in \xi_i \\ \theta_0 & \text{else} \end{cases}$$

Notably, $\omega_i = \theta_0$ yields a pivot-homogenous specification. A model in which $\omega_i = \theta_0$ may be referred to as a restricted model, and a model in which $\omega_i$ is a free parameter may be referred to as an unrestricted model.

Having selected a subset of the relational event history for analysis, parameter estimation may be performed (703). Although it is possible to estimate effect values for a pivot using the same methods employed in determining the baseline, doing so may be computationally costly and ultimately unnecessary. As such, a single step of the Newton-Raphson algorithm may be employed, starting from the baseline values, and calculating the next, more likely effect values for the pivot. These pivot-specific next, most likely effect values are the fixed effects.

In more detail, fitting the restricted model results in a maximum likelihood estimate $\hat{\theta}_0$ for the restricted model, a score contribution for each event $V_{\hat{\theta}_0}(\theta|e)$, evaluated at $\hat{\theta}_0$, and a Fisher information contribution for each event, $\mathcal{I}_{\hat{\theta}_0}(\theta|e)$, evaluated at $\hat{\theta}_0$.

The maximum likelihood estimate, score contributions, and Fisher information contributions may be used to execute a single Newton-Raphson step, to estimate $\omega_i$.

Pivots may be indexed by i and, for each pivot, a score contribution $V_{\hat{\theta}_0}(\theta|\xi_i)$, and an information contribution $\mathcal{I}_{\hat{\theta}_0}(\theta|e)$, may be calculated, so as to produce a one-step estimator $\hat{\omega}_i$ that can be used to test hypotheses about the pivots, where:

$$V_{\hat{\theta}_0}(\theta|\xi_i) = \sum_{e \in \xi_i} V_{\hat{\theta}_0}(\theta|e)$$

$$\mathcal{I}_{\hat{\theta}_0}(\theta|\xi_i) = \sum_{e \in \xi_i} \mathcal{I}_{\hat{\theta}_0}(\theta|e)$$

$$\hat{\omega}_i = \hat{\theta}_0 + V_{\hat{\theta}_0}^T(\theta|\xi_i) \mathcal{I}_{\hat{\theta}_0}^{-1}(\theta|\xi_i)$$

Estimates for fixed effects can be used to infer departures from usual behavior by constructing hypotheses about them, and each fixed effect value may correspond to a particular relational event included in the subset of relational events. A hypothesis may include predictions regarding heterogeneity of fixed effects over pivots, as well as temporal differencing of fixed effects.

Temporal differencing of a fixed effect may be defined over three levels: $\Delta_{it}$, the value of the fixed effect over a particular time period, velocity, $\Delta'_{it}$, the first difference of the fixed effect with respect to time, and acceleration, $\Delta''_{it}$, the second difference of the fixed effect with respect to time. Predictions may be made regarding, for example, the popularity of a particular individual within a particular time period, a rate at which the popularity of the individual increased or decreased over the particular time period, and as to whether the rate of change in popularity increased or decreased over the particular time period.

As described above, $\Xi$ may be defined as a set of pivots $\xi_{it}$, where each $\xi_{it}$ is a subset of events pertaining to a particular actor i that occurred during a particular time period t. If $\omega_{it} \in \Omega$ is a fixed effect for the i-th pivot level over the t-th time interval, the levels of temporal differencing may be defined:

$$\Delta_{it} = \omega_{it}$$

$$\Delta'_{it} = \omega_{it} - \omega_{i(t-1)}$$

$$\Delta''_{it} = \Delta'_{it} - \Delta'_{i(t-1)}$$

Hypotheses involving the levels $D_{it} = (\Delta_{it}, \Delta'_{it}, \Delta''_{it})$ and a weight vector q, the weights in the vector reflecting predictions regarding temporal differencing, may be formed, where $D_{it}$ and q are both row vectors. Specifically, a one-side null hypothesis $H_0$, predicting homoegeneity of effects over the pivots, and an alternative hypothesis, $H_1$, predicting heterogeneity, may be formed:

$$H_0: qD_{it}^T = 0$$

$$H_1: qD_{it}^T > 0$$

The weighting vector q enables discretion over the kinds of behavioral anomalies that may be detected through hypothesis testing, where values in the vector q reflect predictions regarding temporal differencing. A negative value for the velocity of an effect that is included in the weighting vector q, for example, indicates a prediction that the effect decreased over the time interval, while a positive value indicates a prediction that the effect increased over the interval. A value of zero would indicate a prediction that no change in the effect occurred over the time interval. Thus, a prediction that a particular actor was popular over a particular time period, that the popularity of the actor increased over the time interval, and that the rate of increase of the popularity of the actor over the time interval increased, for example, would be reflected in the weighting vector q by positive values for each of value, velocity, and acceleration of the popularity ego effect.

Following the determination of hypotheses, the hypotheses may be tested in order to determine departures from baseline communications behavior using a scalar test statistic $\Theta$, which may be computed based on the fixed effect values (707):

$$\Theta = \frac{qD_{it}^T}{\sqrt{\text{Var}(qD_{it}^T)}}$$

Given $\text{Cov}\{D_{it}\}$, the covariance matrix of $D_{it}$, the variance of $qD_{it}^T$ has the form:

$$\text{Var}\{qD_{it}^T\} = q\text{Cov}\{D_{it}\}q^T$$

Thus, the test statistic $\Theta$ has an approximately standard normal null distribution, which permits easy testing of the null hypothesis $H_0$. Evaluations of expectations within the covariances are performed using the maximum likelihood estimate $\hat{\theta}$.

Given the fixed effect estimates that were determined via execution of a single step of the Newton Raphson algorithm, estimation of $D_{it}$ is straightforward. Given the fixed effect estimates, $\text{Cov}\{D_{it}\}$ may be estimated by partitioning $\text{Cov}\{D_{it}\}$ into blocks that may be derived separately and that are expressed in terms of covariances of the fixed effects estimates (i.e., $\text{Cov}\{\hat{\omega}_{it}\}$):

$$\text{Cov}(D_{it}) = \begin{bmatrix} \text{Cov}\{\Delta_{it}\} & \text{Cov}\{\Delta_{it}, \Delta'_{it}\}^T & \text{Cov}\{\Delta_{it}, \Delta''_{it}\}^T \\ \text{Cov}\{\Delta_{it}, \Delta'_{it}\} & \text{Cov}\{\Delta'_{it}\} & \text{Cov}\{\Delta'_{it}, \Delta''_{it}\}^T \\ \text{Cov}\{\Delta_{it}, \Delta''_{it}\} & \text{Cov}\{\Delta'_{it}, \Delta''_{it}\} & \text{Cov}\{\Delta''_{it}\} \end{bmatrix}$$

Estimation of the covariances may be accomplished through their relationship to the observed Fisher information matrix. For any two fixed effects estimates $\hat{\omega}_a$, $\hat{\omega}_b$, the intersection of their corresponding pivots $\xi_a, \xi_b$ may be denoted:

$$\xi_* = \xi_a \cap \xi_b$$

Computation of the observed Fisher information, which yields an estimator for $\text{Cov}\{\hat{\omega}_a, \hat{\omega}_b\}$ that may be used in evaluating $[\mathcal{I}_{\hat{\theta}_0}^{(*)}(\theta|\xi_i)]^{-1}$, may be performed:

$$\mathcal{I}_{\hat{\theta}_0}^{(*)}(\theta|\xi_i) = \sum_{e \in \xi_*} \mathcal{I}_{\hat{\theta}_0}(\theta|e)$$

Having estimated covariances of the fixed effect estimates, the scalar test statistic $\Theta$ may be calculated and used to test the null hypothesis $H_0$ through a simple score test, in which the value of the scalar test statistic is compared to the null hypothesis. If the result of the simple score test is equal to or less than zero, there is no confidence in the alternative hypothesis, indicating that the predictions with regard to the heterogeneity that are reflected in the weighting vector q may be wrong. Alternatively, if the result of the simple score test is positive, then there is some level of confidence that the predictions are correct, with a larger positive values indicating a greater degree of confidence. Thus, if the score test results in a positive value, the alternative hypothesis will have been confirmed with some degree of confidence, which in turn indicates that communications behavior varied from the baseline with regard to the selected pivots and effects, and that the predictions regarding the anomolous communication behavior that underlie the alternative hypothesis are correct.

FIGS. 8-23 provide examples of interfaces and data visualizations that may be output to a user, for example, using UI 108 of system 100. UI 108 may be used to receive inputs from a user of system 100, and may be used to output data to the user. A user of the system may, for example, specify data sources to be used by normalizer 103 in determining relational history 104 and covariate data 105. The user may also provide inputs indicating which actors, modes, topics, covariates, and/or effects to include in model 106, as well as which subsets of the relational event history should be analyzed in determining departures from the baseline. UI 108 may provide the user with outputs indicating a formulation of model 106, a determined baseline for the model 106, and one or more determinations as to whether and how the subsets of relational event history being analyzed differ from the baseline. UI 108 may also provide the user with additional views and analyses of data so as to allow the user to draw additional inferences from the model 106.

UI 108 may provide to the user, based on probability model 106, a determined baseline, and/or one or more determined departures from the baseline, textual and/or graphical analyses of data that uncover patterns, trends, anomalies, and change in the data.

FIG. 8, for example, includes an example interface 801 that enables a user to translate business questions into hypotheses for testing data in a relational event history. In more detail, a hypothesis dashboard 802 may enable a user to form a hypothesis regarding communications behavior by selecting one or more effects from a list of possible effects, and one or more covariates from a list of possible covariates. The selection may occur by dragging and dropping the effects and covariates from one or more windows or spaces listing possible effects and/or covariates into a window or space defining the hypothesis, and a user may be able to further select properties of a selected effect or covariate by interacting with buttons or text corresponding to the desired properties. Descriptions of the effects, covariates, and properties may be displayed for the user in response to detection of hovering, and a textual description 803 of the hypothesis may be dynamically formed and displayed to the user as effects, covariates, and properties are selected by the user. Alternatively, or in addition, the user may manually enter a textual description of the hypothesis being formed.

FIG. 9 includes example visualizations 901 and 902, which include, respectively, curves 903 and 904 that may be generated based on statistical analysis of data in a relational event history and then displayed to a user. The displayed curves may be formed, for example, based on the effects and covariates included in the user's hypothesis, and the effects included in the hypothesis may be used in a baselining process that results in a determination of normality. Following the determination of a baseline of communications behavior, anomalous (i.e. abnormal) behavior may be inferred in the form of deviations from the baseline over period of time.

The curves displayed to the user may correspond to an actor, to a pair of actors, and/or to all actors in a relational event history, and may indicate periods of time in which communications behavior is normal, and periods of time in which communications behavior is abnormal. The indication may be provided, for example, through color coding, in which periods of normal behavior are assigned one color, and in which periods of abnormal behavior are assigned another color. UI 108 may enable a user to select between varying levels of sensitivity through which normality and abnormality are determined, and the visualizations displayed to the user may dynamically update as selection of sensitivity occurs.

Multiple curves, each representing a different effect or covariate, may be displayed in an overlapping fashion, and the curves may be normalized and smoothed. The curves may be displayed in two dimensions, where the x axis is associated with time, and where the y axis is associated with properties of the effects.

UI 108 may display icons and/or labels to indicate effects, covariates, or actors to which a curve corresponds, as well as text identifying effects, covariates, or actors to which a curve corresponds. The user interface may further display labels within the two dimensional field in which the curves are plotted, the labels indicating exogenous events or providing other information.

A user may select an actor or actors, and the selection may result in curves corresponding to individual effects and/or covariates being displayed for the selected actor or actors, and lines corresponding to multiple effects and/or covariates being displayed for unselected actors. A user may also be able to "zoom in" to the displayed curves in order to view a display of events at a more granular level, with information pertaining to the displayed events being presented through icons that are color-coded according to mode, and that are sized to indicate, for example, a word count or length of a conversation. UI 108 may also provide access to individual communications related to events. UI 108 may, for example, display an individual email in response to a user selection or zoom.

Figure 10:
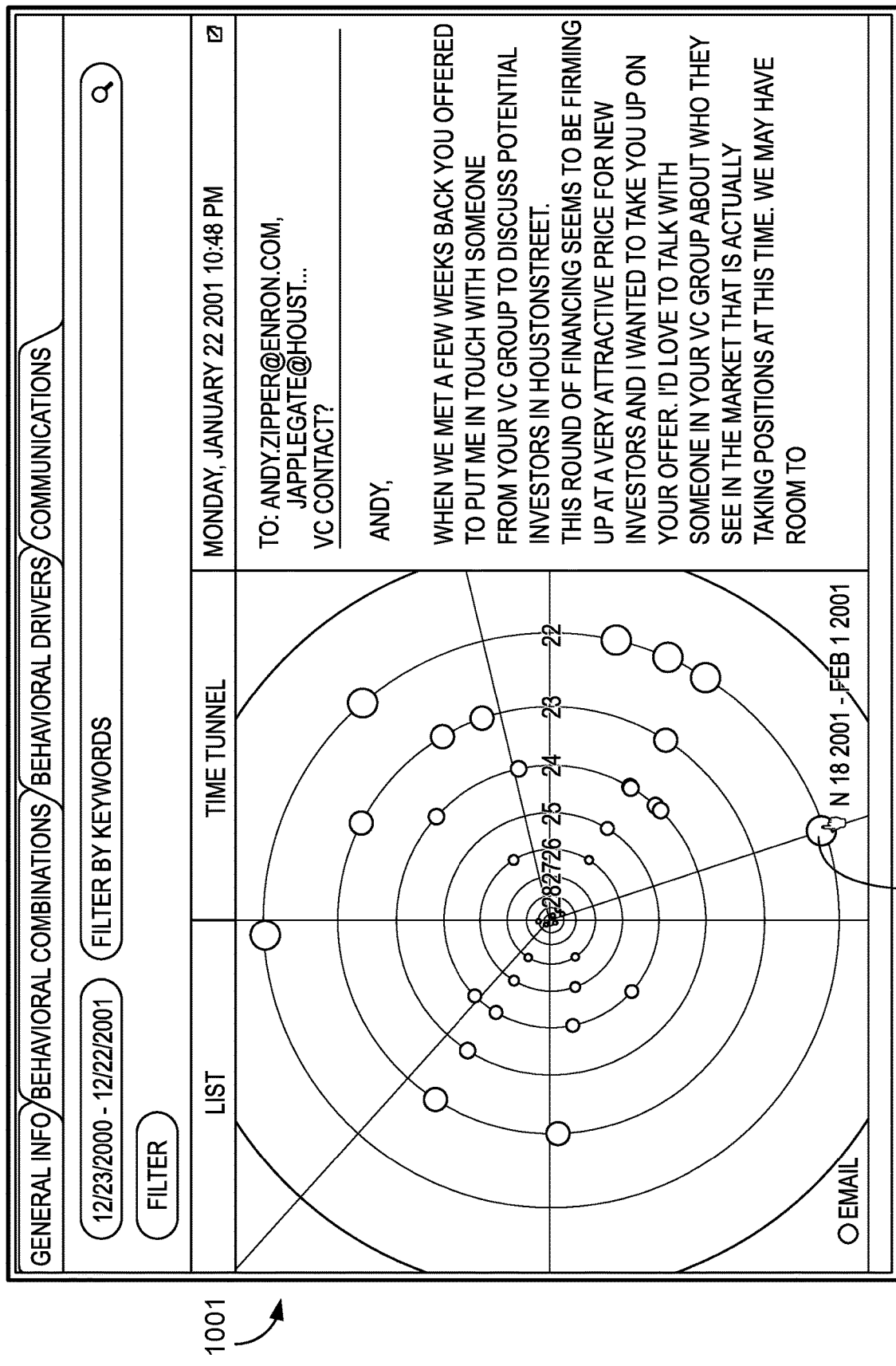

FIG. 10 includes an example visualization in which, in response to a user selection, UI 108 displays, for a particular actor, behavioral activity over time. The behavioral activity may be displayed, for example, in a polar coordinate system, where the radial coordinates of points in the plane correspond to days, and where angular coordinates correspond to time slices within a particular day.

In more detail, each point plotted in the plane, for example, point 1002, may correspond to a particular communications event, and may be color coded to indicate a mode of communication or other information. Points plotted in the plane may be located on one of several concentric circles displayed on the graph, and the circle on which a point is located may indicate a day on which the communication took place, while the position of the point on the circle may indicate a time slice (e.g., the hour) in which the communication took place. A user may be able to select a communication event that is plotted on the graph to obtain content. For example, a user may click or hover over a point that, like 1002, indicates an email message in order to retrieve the text of the email message.

In some implementations of UI 108, a polar graph indicating behavioral activity over time may be animated, enabling a user to "fly through" a visual representation of behavioral activity over particular periods of time, where the circles and events presented for a particular period of time correspond to the days within that period, and where the period displayed dynamically shifts in response to user input.

Figure 11:
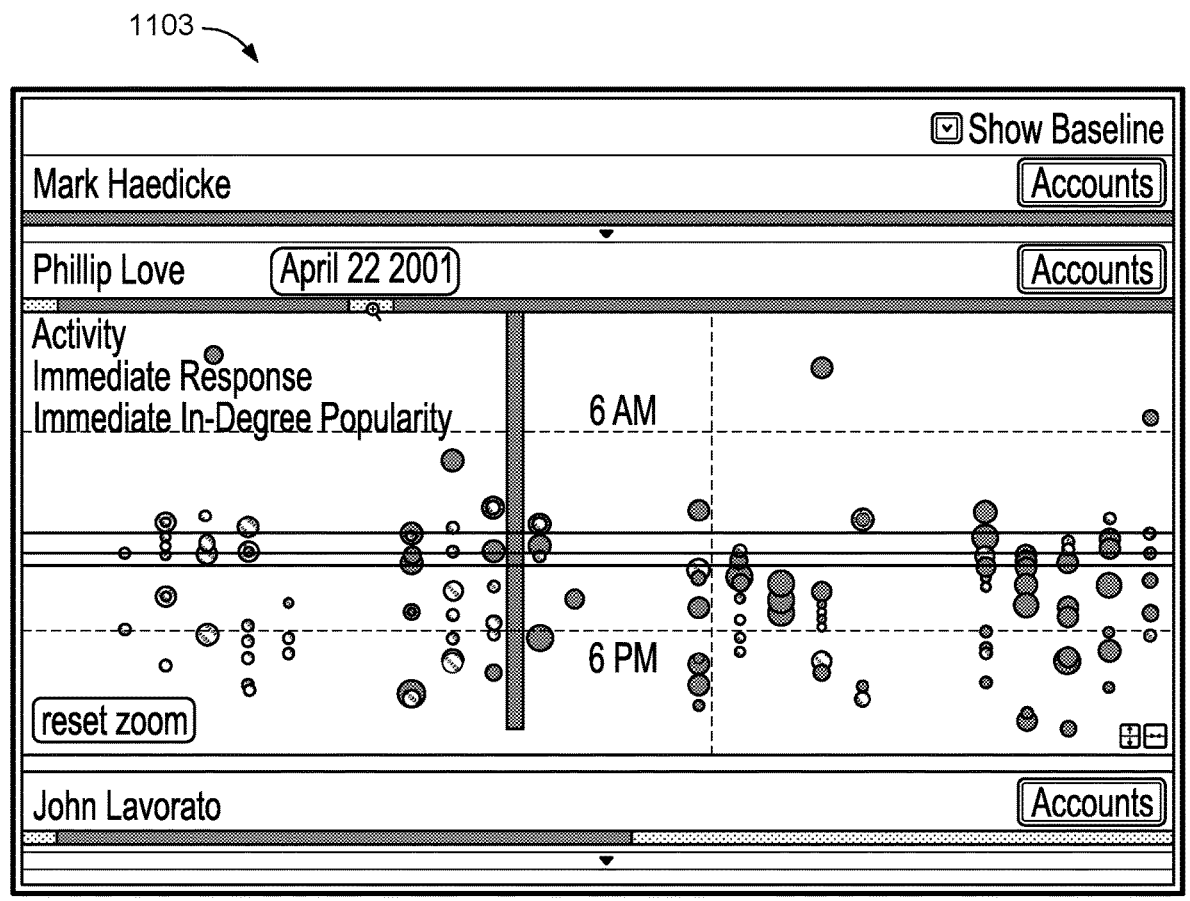

FIG. 11 includes example visualizations 1101, 1102, and 1103 in which UI 108 displays, for a plurality of actors, behavioral activity over time. For example, as shown in visualizations 1101, 1102, and 1103, UI 108 may display, for a particular actor or for a combination of actors, communications information in a matrix. For each day and time slice, an icon may represent the communication or communications that took place, with the size of the icon indicating communications volume. Icon 1104, for example, is larger than icon 1105, and therefore indicates a greater volume of communications.

Multiple modes of communication may be displayed at a particular point in the matrix. This may be accomplished through the use of a color coding system in which each mode of communication is assigned a color, and in which icons of varying size and color are generated based on the number of communications of each mode that occurred during a given period of time. When color coding is used, the generated icons may be displayed in overlapping fashion, providing the user with a visual representation of the number and type of communications that occurred at a particular data and period of time.

UI 108 may enable a user to select a communication event that is shown in the matrix to obtain content, and the matrix may be animated to show different days and time periods in response to user input. A user may, for example, "scroll through" the matrix.

Figure 12:
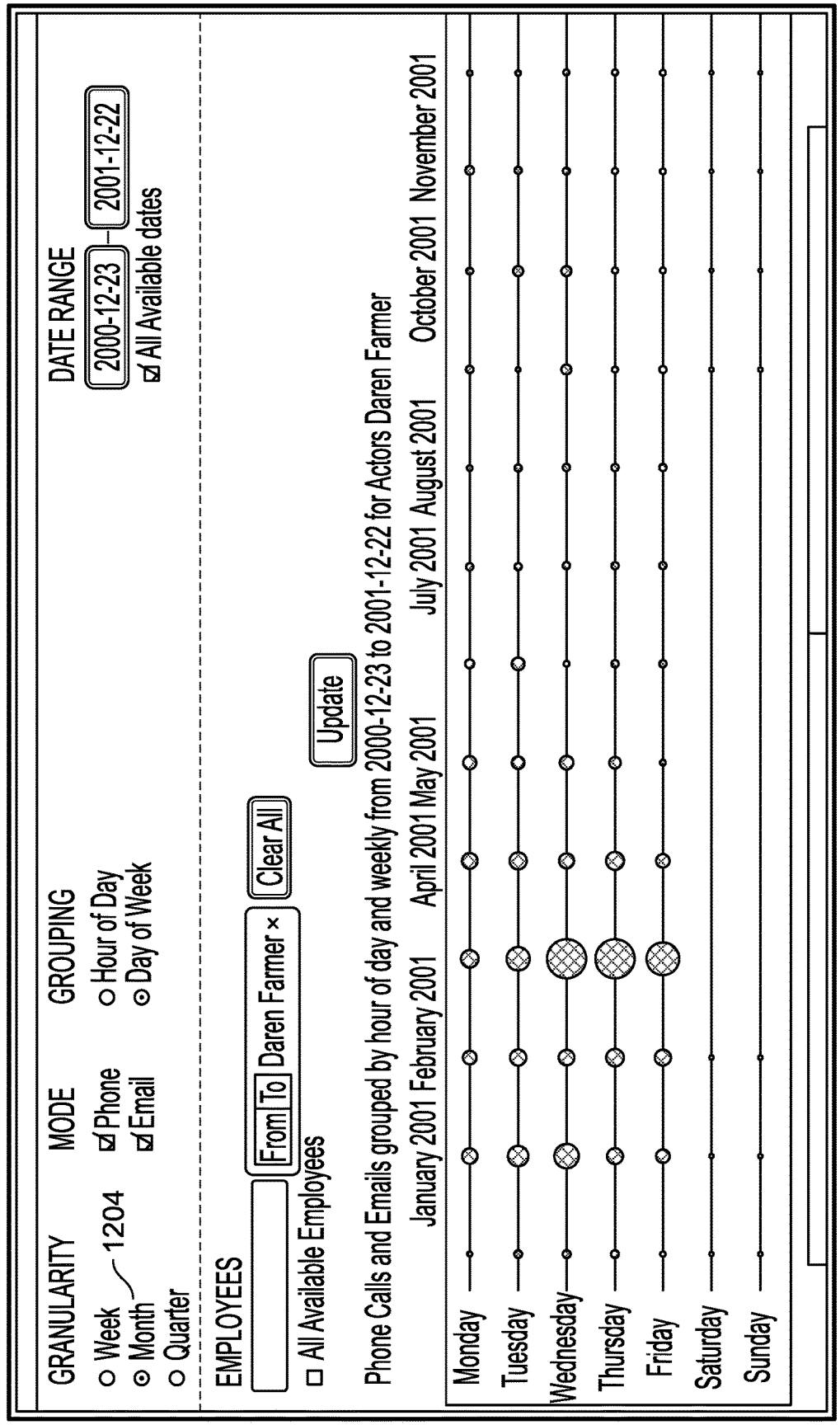
Figure 12:
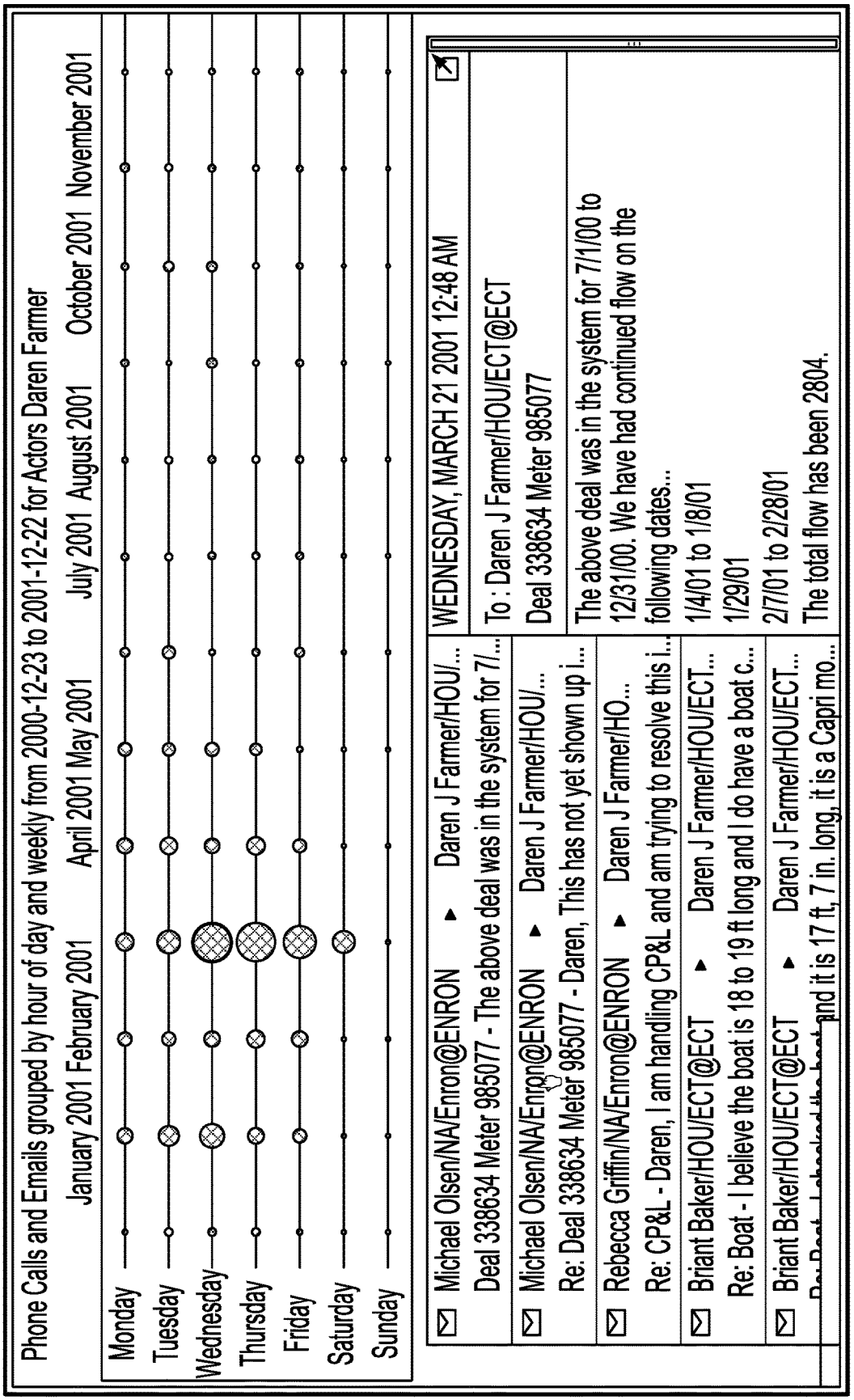
Figure 12:
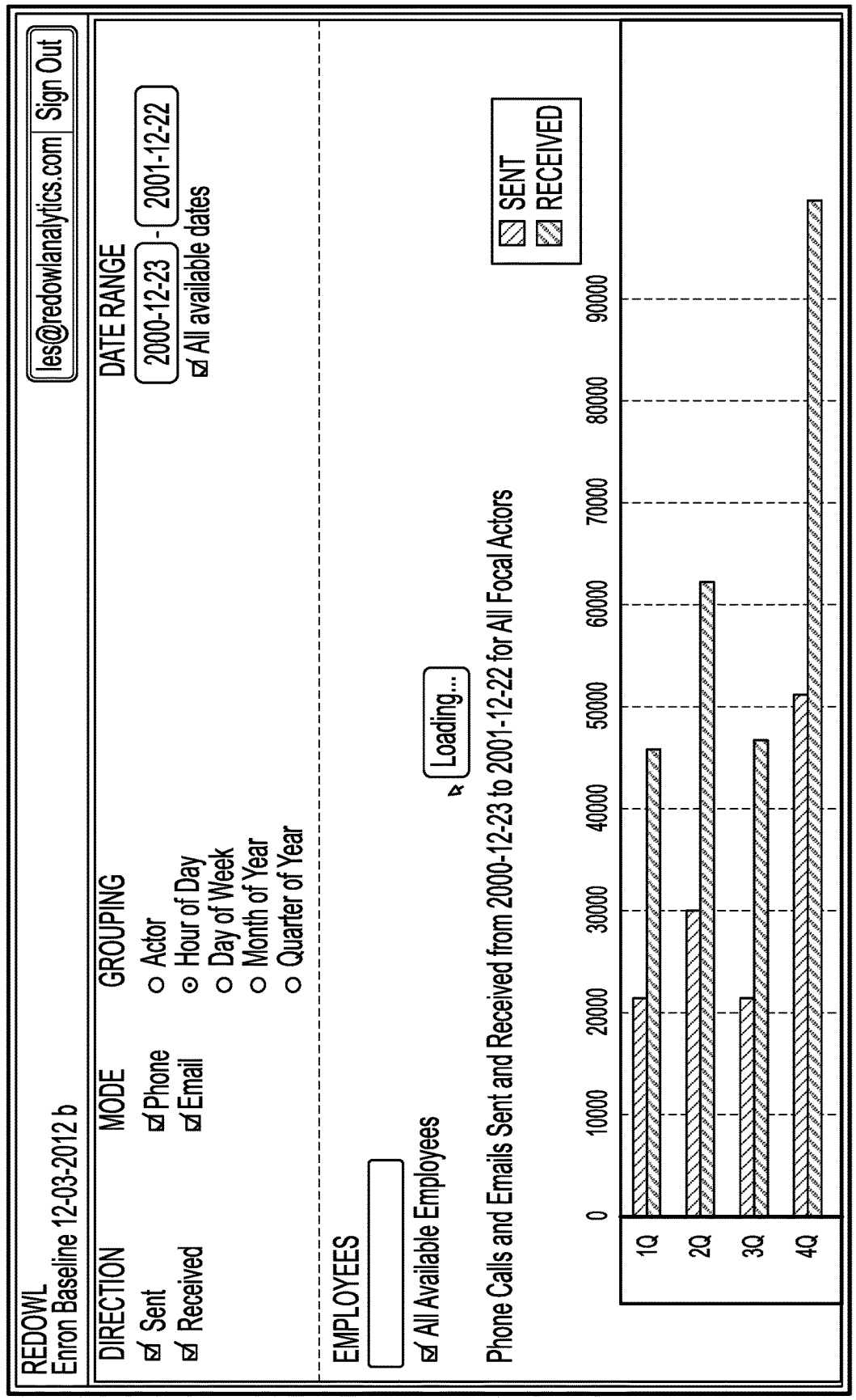

FIG. 12 includes example visualizations 1201, 1202, and 1203 in which UI 108 displays, for a particular actor or for a combination of actors, data corresponding to multiple modes of communication, where icons of varying size or bars of varying length are generated based on the number of communications of each mode that occurred during a given period of time. The particular modes that are displayed and the granularity of the display may be determined by a user, as shown at 1204.

UI 108 may enable a user to interact with an icon to obtain additional information regarding communications events that occurred during a given period of time, and the user may interact with a displayed communication event in order to obtain content. Selection of a particular email, for example, may result in display of the email's text, as depicted in visualization 1202.

Figure 13:
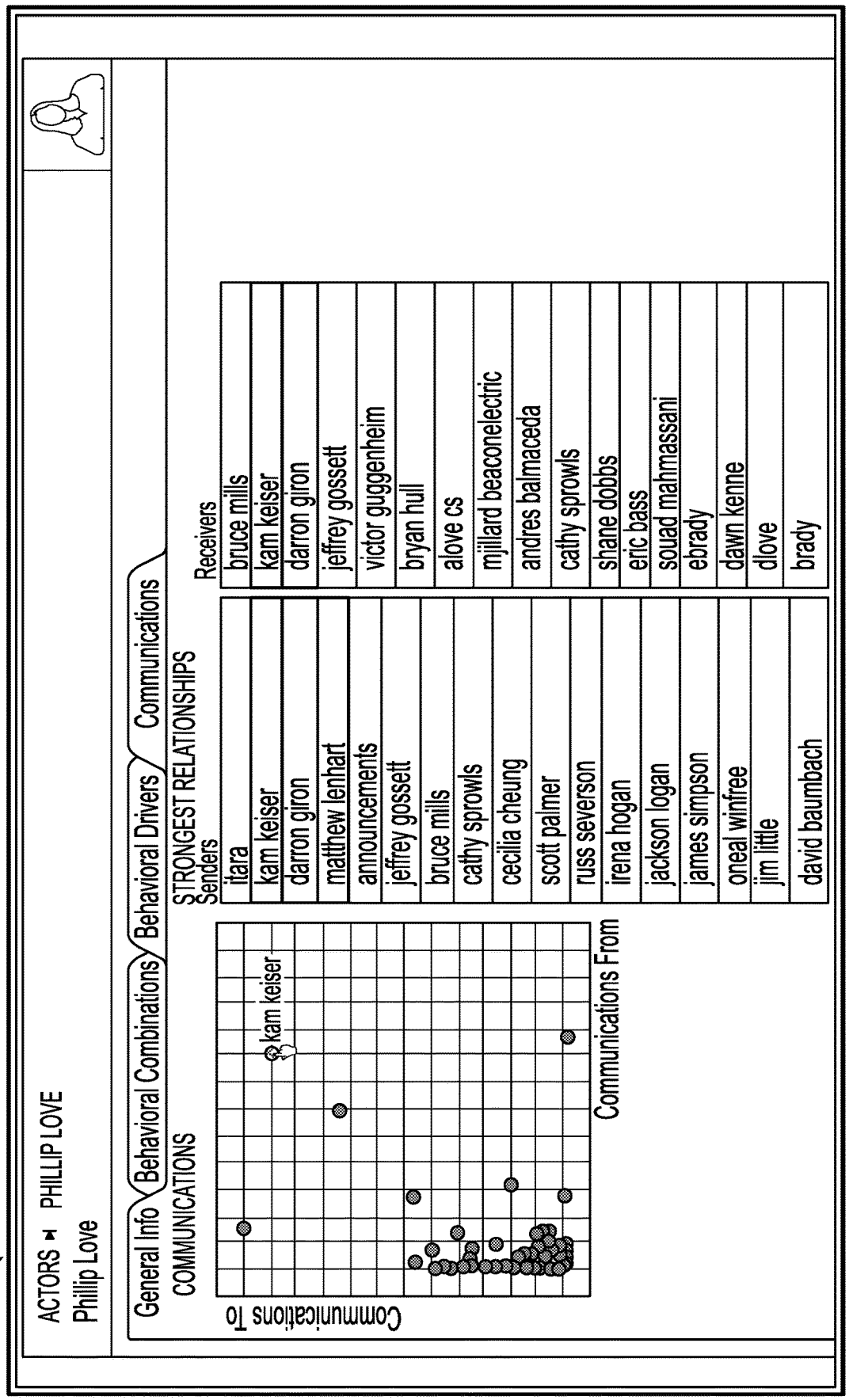

FIG. 13 depicts example visualizations 1301, 1302, and 1303, in which UI 108 displays, for a particular actor, a summary of communications of various modes over a period time, as well bibliographic information and information pertaining the actor's relationships with other actors in the relational event history.

The summary of communications may be provided as in visualization 1301, for example, in which multiple two-dimensional curves that correspond to different modes of communication are plotted in graph 1304, in which the x axis is associated with time, and in which the y axis is associated with a number of communications events.

UI 108 may display information pertaining to the actor's relationships in the form of a quad chart, such as chart 1305, where points that represent individual relationship dyads including the actor are plotted on the chart, and where one axis of the chart is associated with numbers of communications sent to the actor by the other actors in each dyad, and where the other axis of the chart is associated with numbers of communications sent by the actor to the other actors in each dyad. A listing of strong relationships (e.g., relationships involving the highest amount of communications activity) may also be included.

Figure 14:
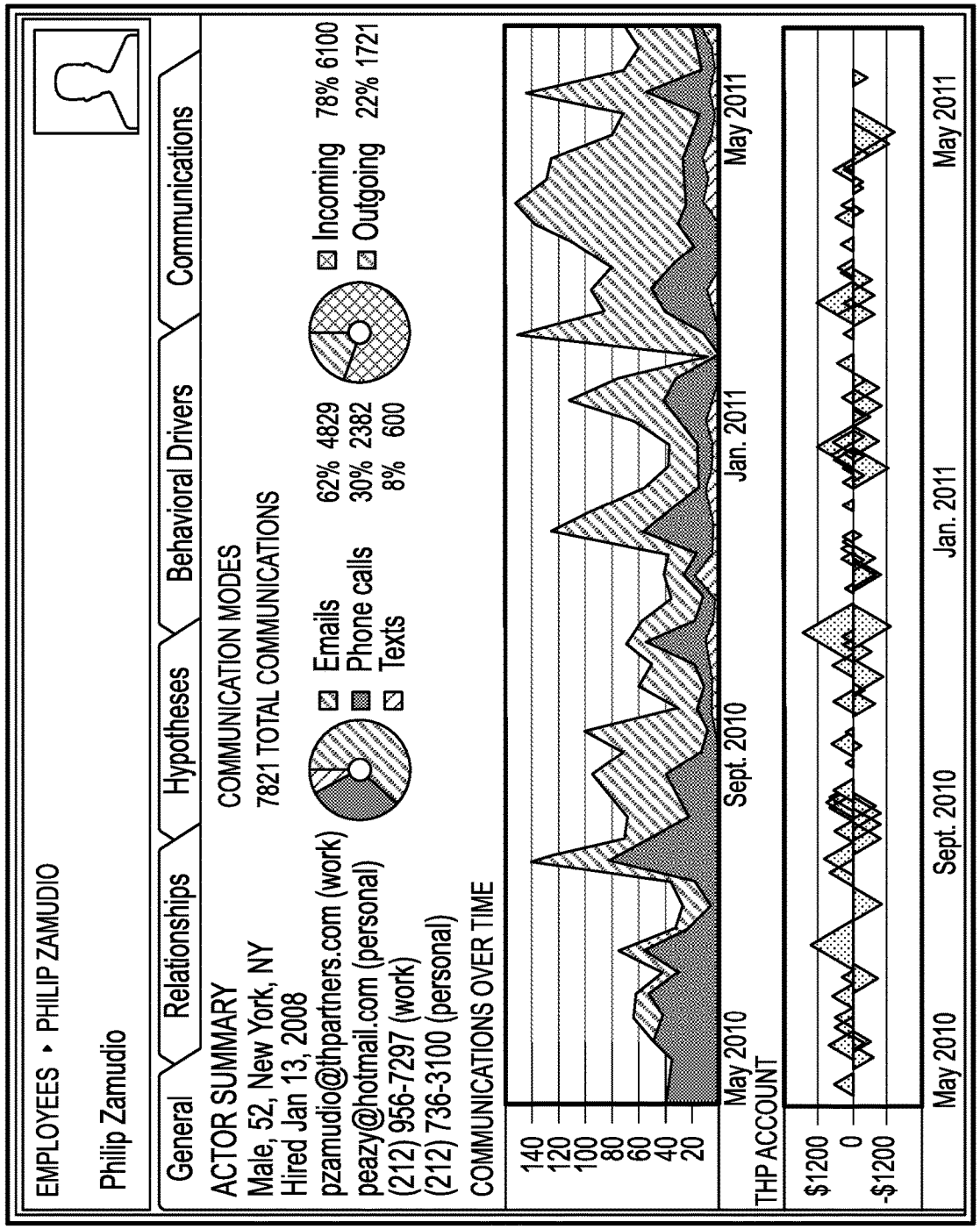

FIG. 14 includes example visualizations 1401 and 1402, in which UI 108 displays, for a particular actor, a comprehensive view of the actor's communications and other behavior over a particular period of time. UI 108 may display, as in 1401, a view of communications and transactions over a period of time, provided with context and with user-specified filters.

UI 108 may include, as in 1402, a "crosshair" 1403 that provides context with regard to a relational event's position within a relational event history, and with regard to trends and other factors. The user may interact with the crosshair 1403 through, for example, side-to-side and up-and-down swiping. Content may be updated as the crosshair is moved, the content including key and calendar events, trends, and geospatial locations.

Figure 15:
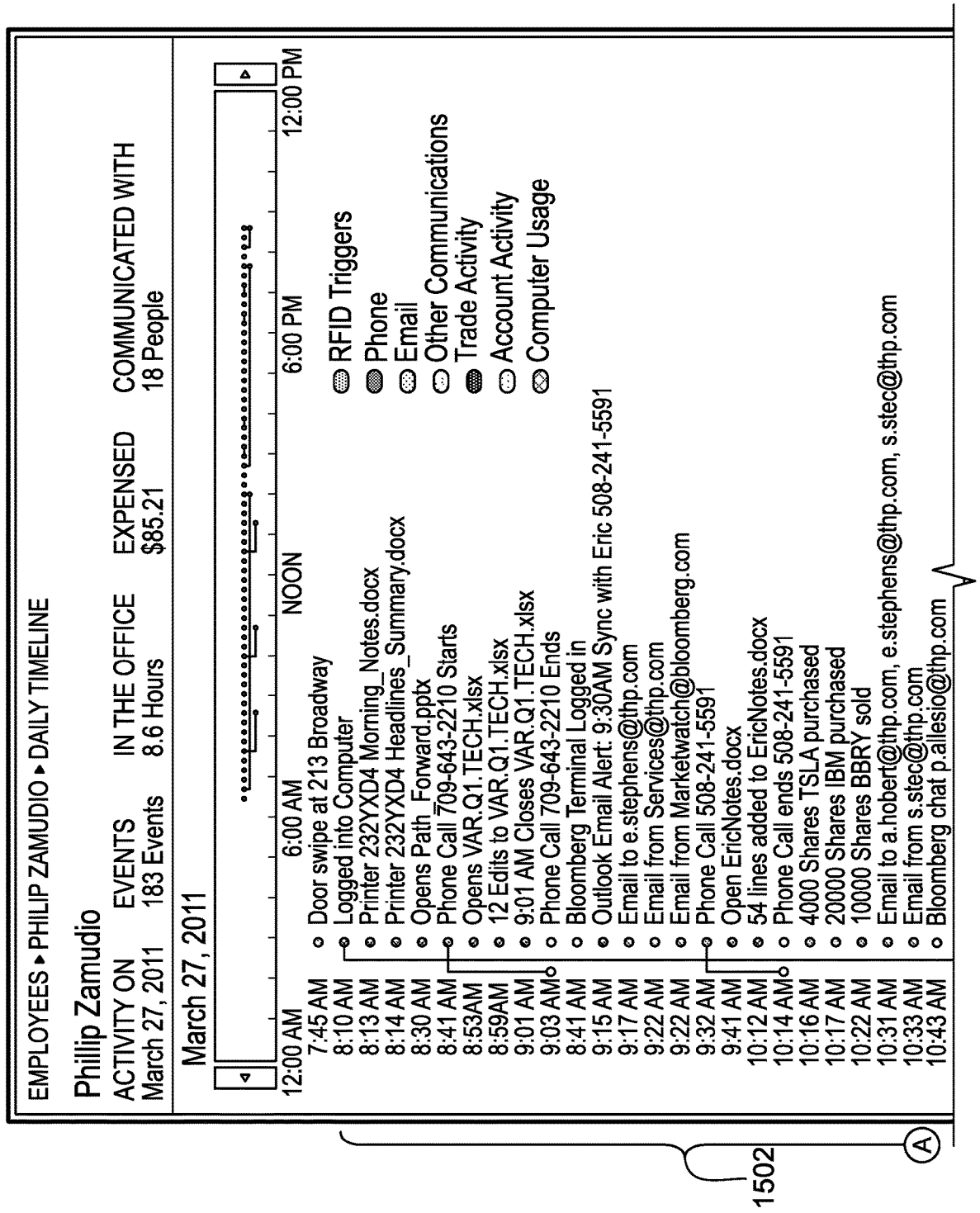

FIG. 15 provides example visualization 1501, in which UI 108 displays, for a corpus of communications data corresponding to a relational event history, a multimodal synthesis of relational and other events involving a particular actor. UI 108 may present information pertaining to communications and to other events, and may chart the occurrence of the events over time. UI 108 may provide, for example, a detailed "replay" 1502 of information pertaining to events that involved the actor and that took place on a particular day.

Figure 16:
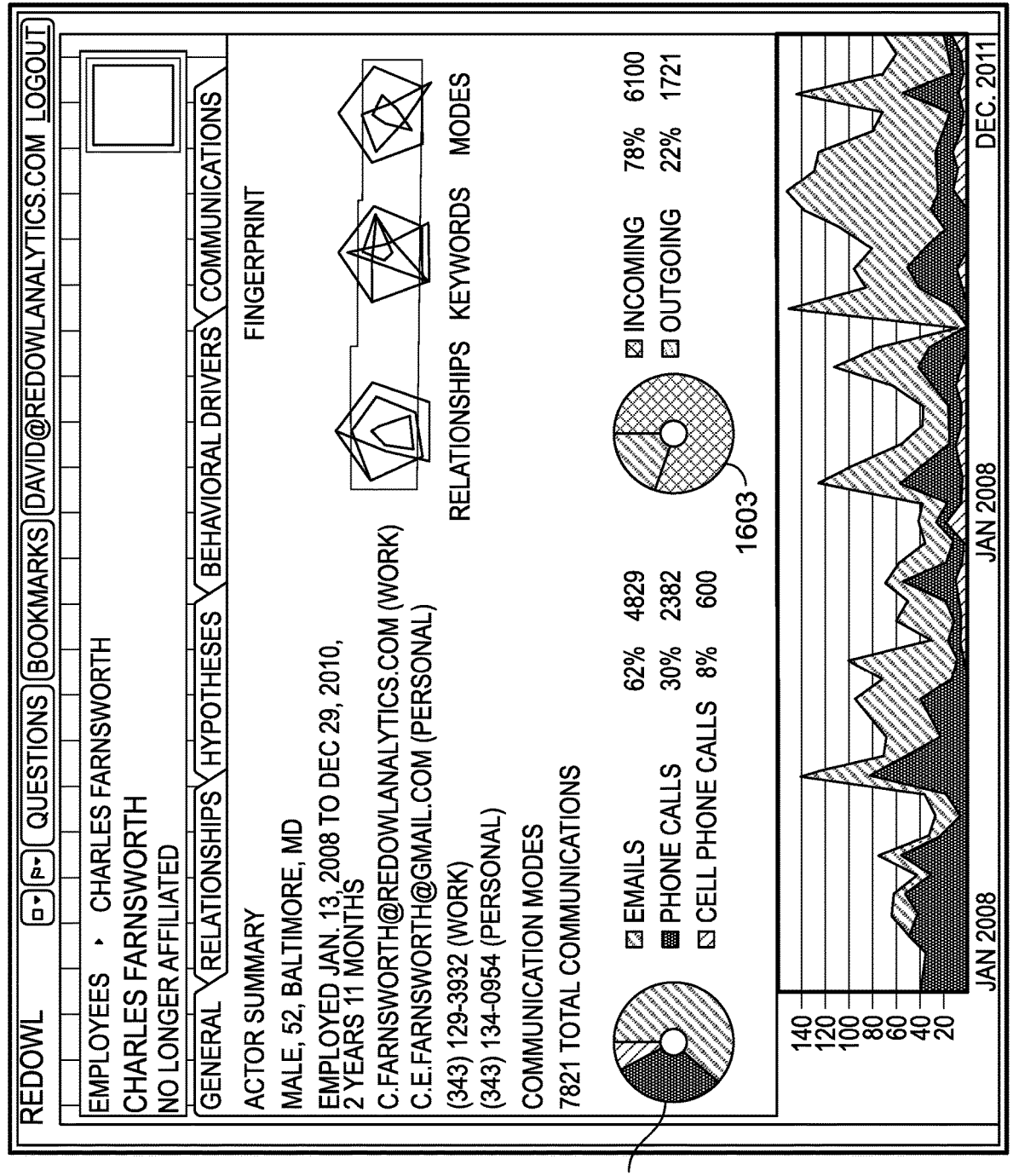

FIG. 16 provides example visualization 1601, in which UI 108 displays radial graphs of behavioral characteristics pertaining to an actor. Characteristics that may be graphed include, for example, relationships, key words used, and modes of communication. Graph 1602, for example, displays percentages of communications that occurred through each of three modes, while graph 1603 displays percentages of communications that are characterized as either incoming or outgoing. Radial graphs may also measure and compare elements relating to an actor's position in a network and/or to overall communication tendencies.

Figure 17:
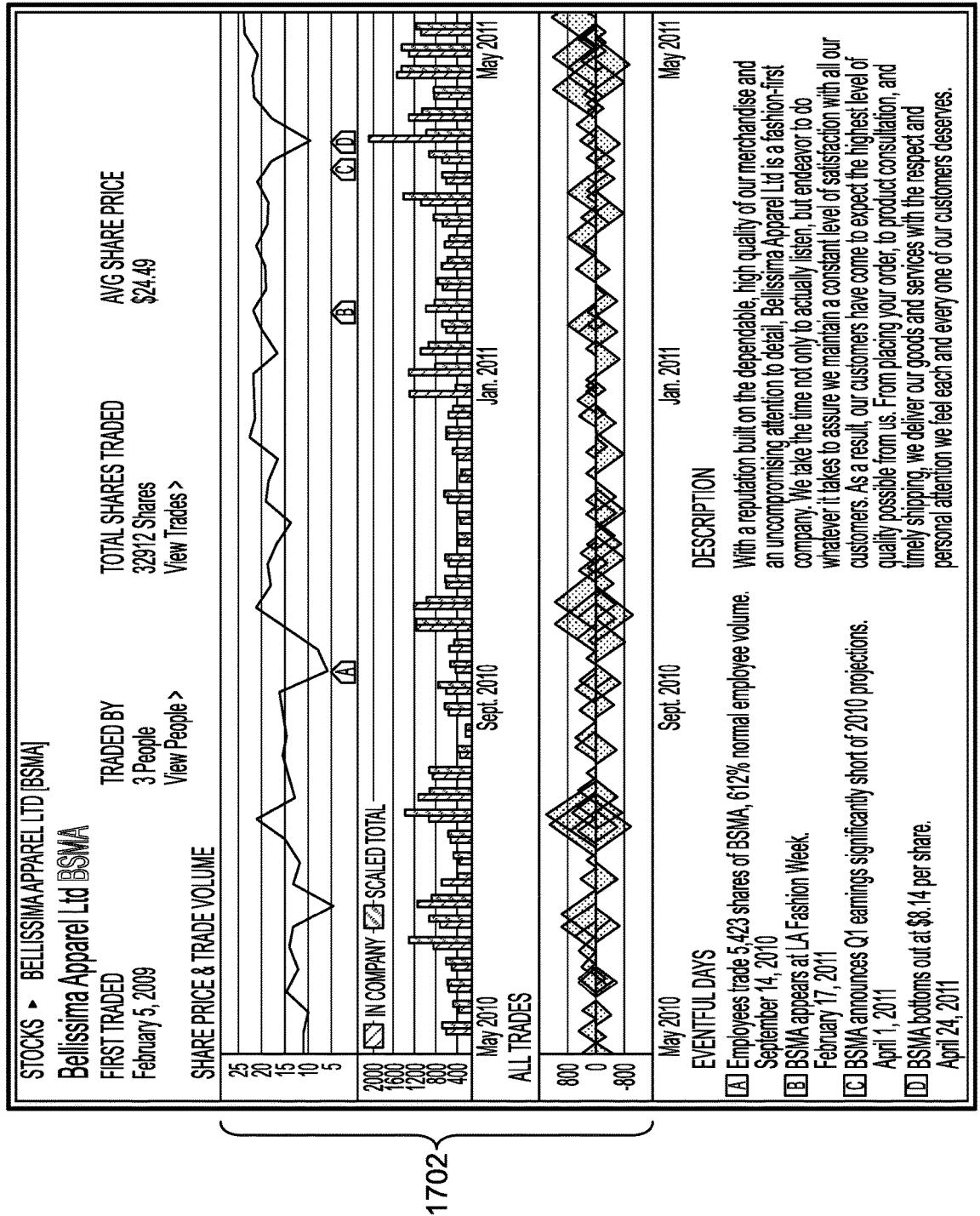

FIG. 17 includes example visualization 1701, in which UI 108 displays a comprehensive view 1702 of the history and attributes of stock data and performance, for comparison with an actor's activity. Like stock data, other external data may be compared to relational events or to the relational history of a particular actor, for purposes of correlation and investigation.

Figure 18:
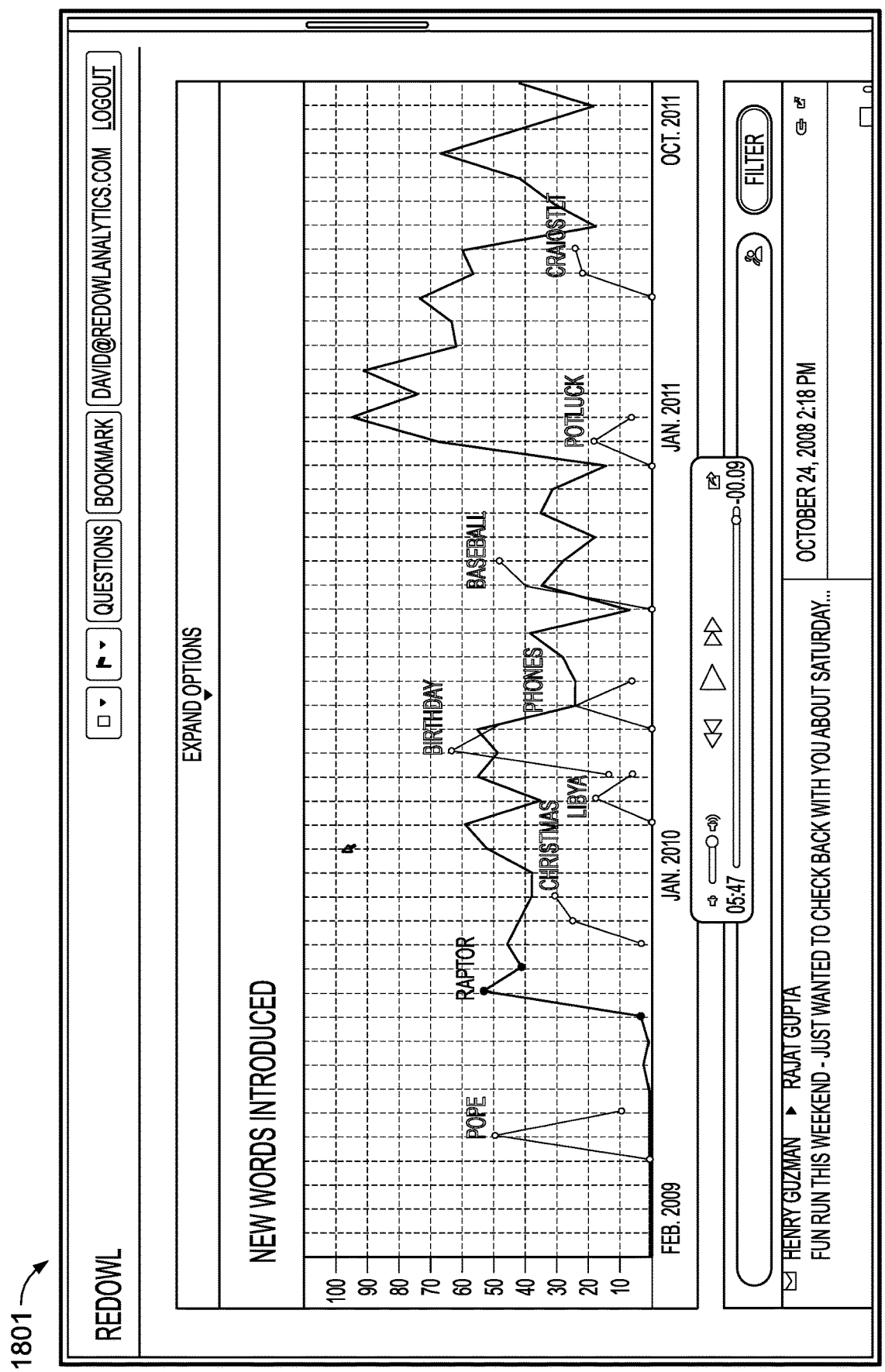
Figure 18:
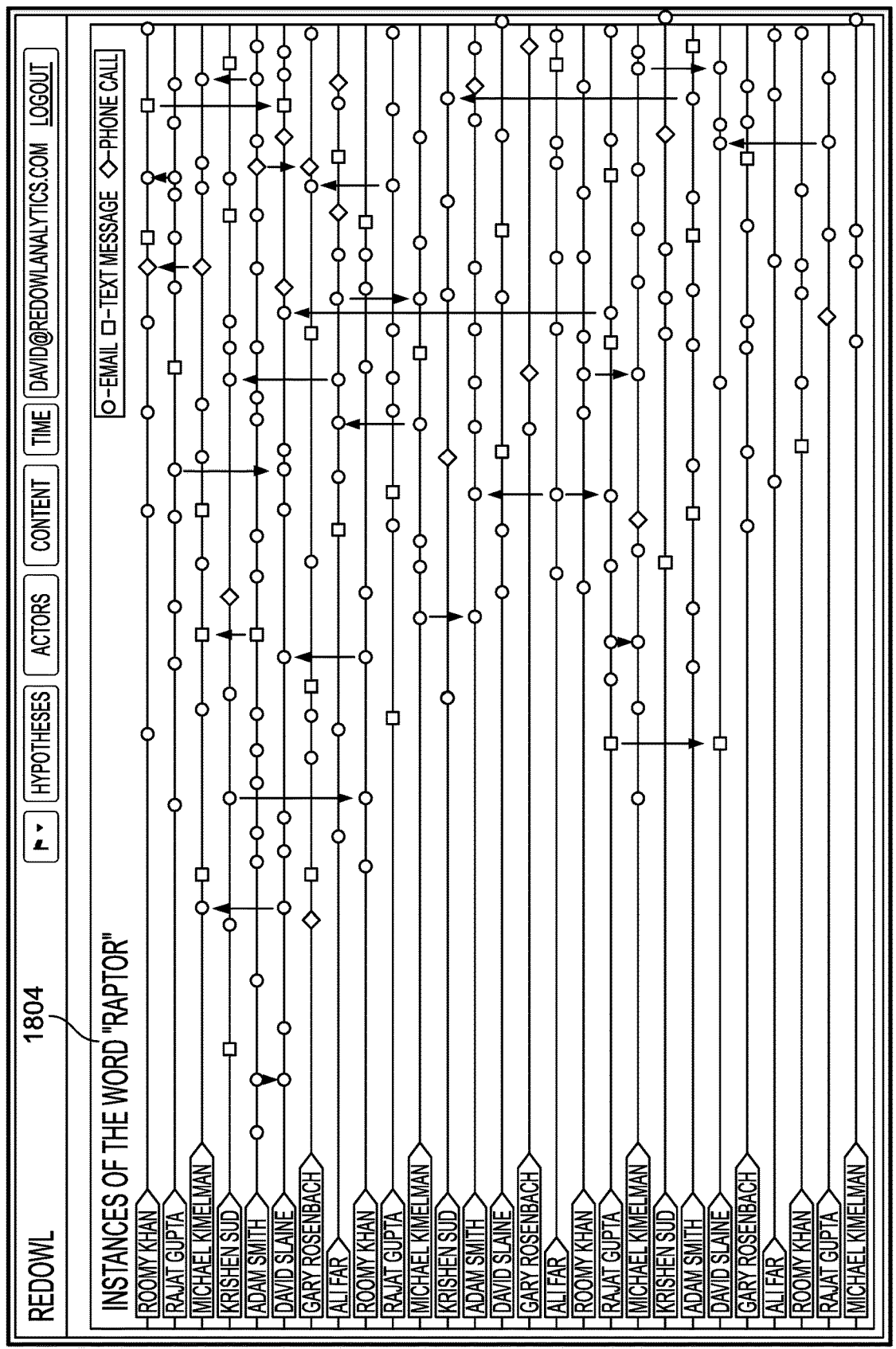
Figure 18:
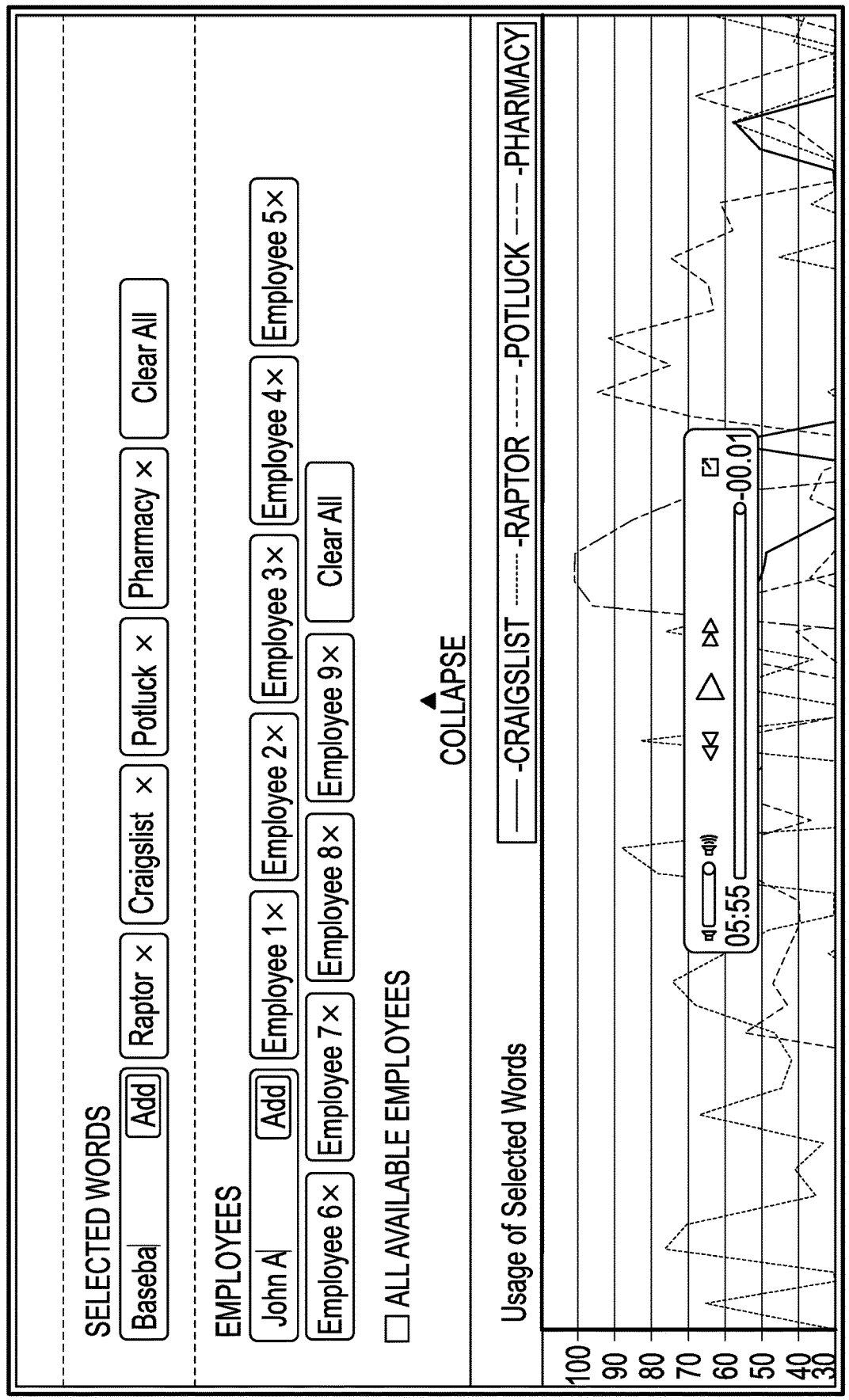

FIG. 18 includes example visualizations 1801, 1802, and 1803, in which UI 108 displays, for a corpus of communications data corresponding to a relational event history, a frequency of usage of a particular word or phrase. UI 108 may, for example, plot word usage with respect to time, and may indicate individual communications in which the word was used. The interface may further identify actors who used the word, and through what mode, as indicated at 1804.

Figure 19:
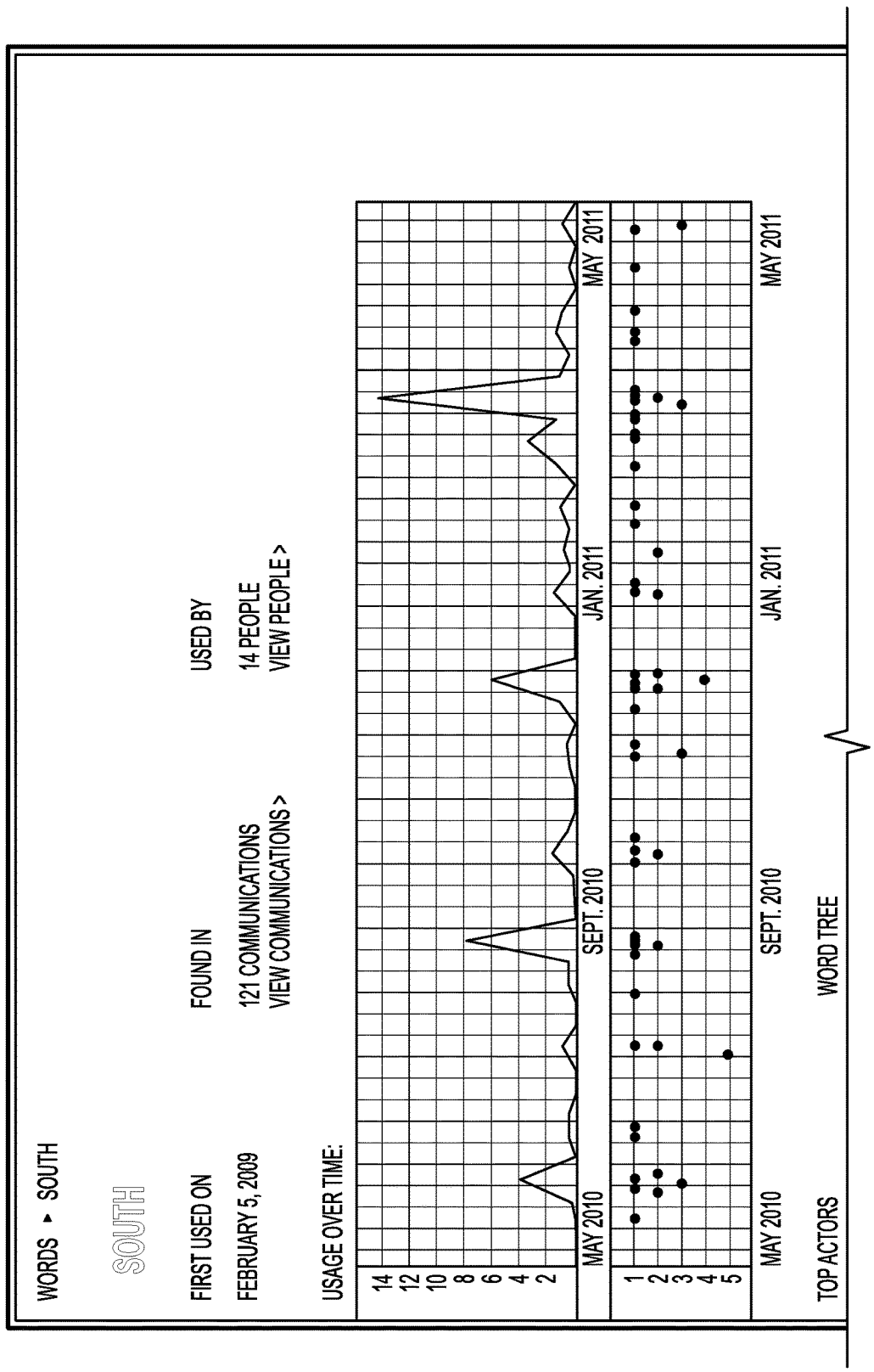

FIG. 19 provides example visualization 1901, in which UI 108 combines graphics with an interactive word-tree 1902 that acts as a search filter. The interactive word-tree may be used, for example, to sift through a corpus of communications data for instances of the use of a particular word or phrase.

Figure 20:
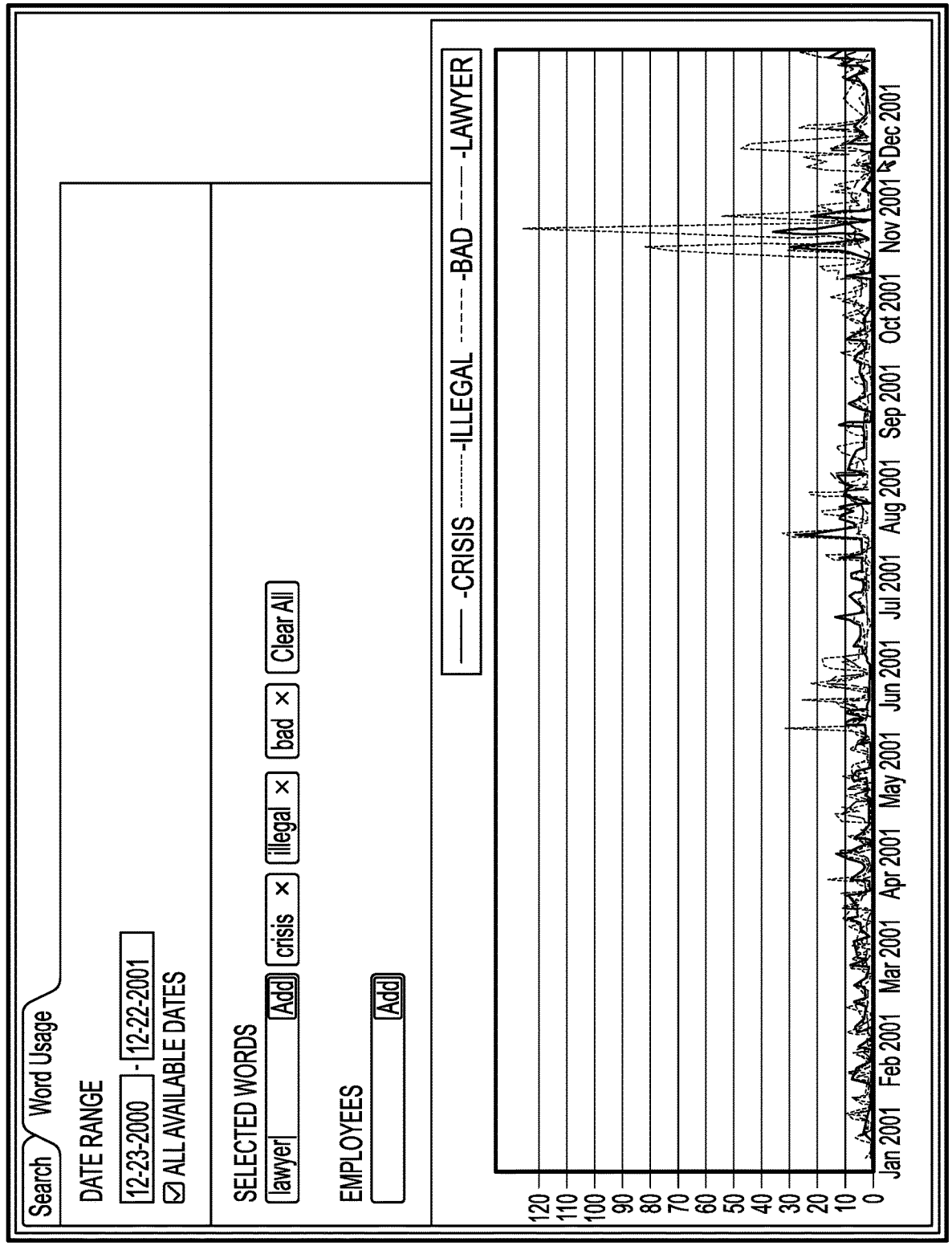
Figure 20:
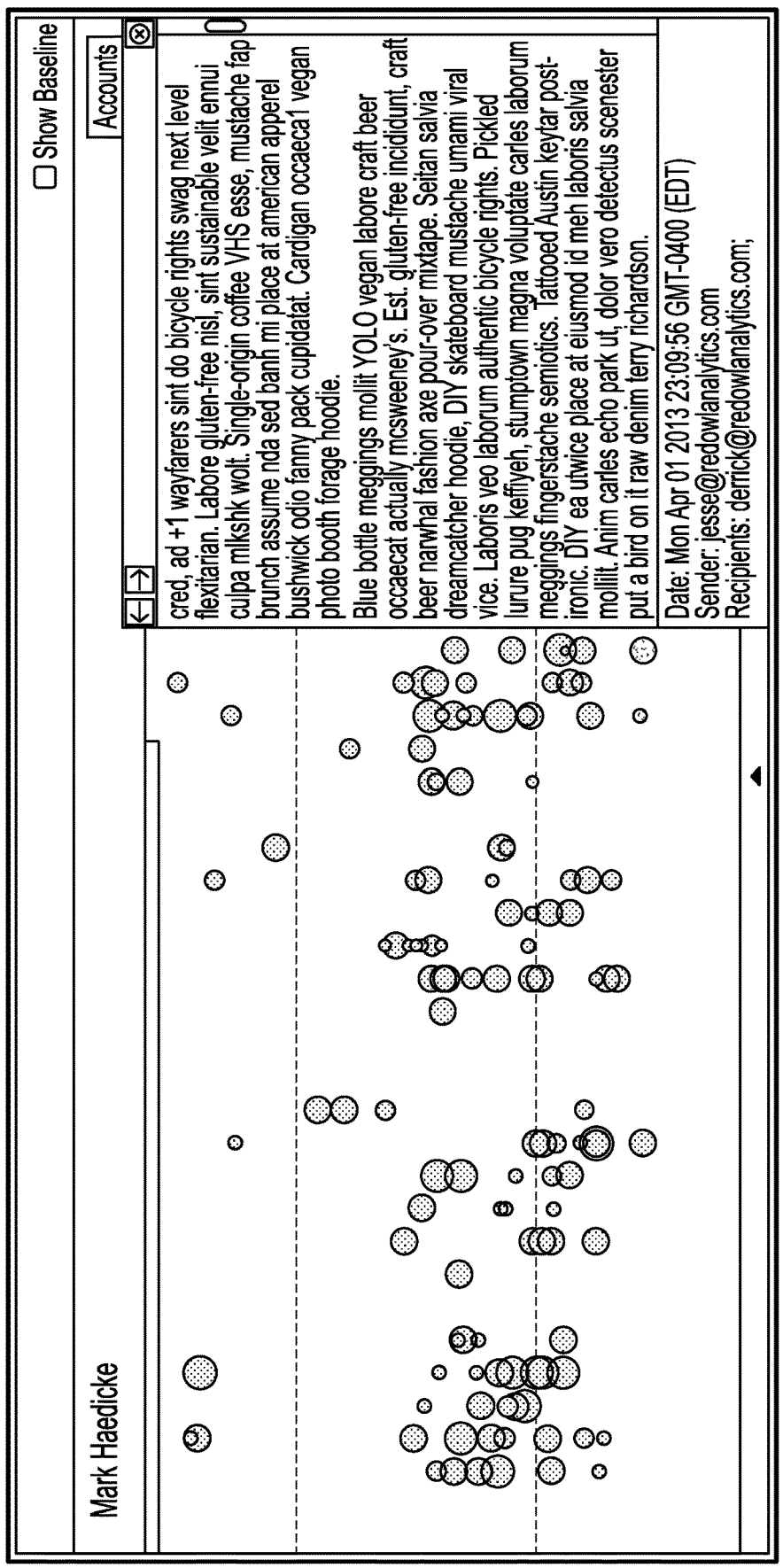

FIG. 20 includes example visualizations 2001 and 2002. 2001 depicts a particular interface of UI 108 in which line graphs are displayed overlaid with word trending based on frequency counts of numbers of documents containing a user-specified word. The frequency counts may be taken over a period of time (e.g., daily). 2002 depicts a particular interface of UI 108 in which each relational event appears in a plot that enables a user to scroll through email or other relational event content. Distinct coloration may be used to indicate the particular event to which presently-viewed content corresponds, and colors of events may change as the user scrolls from event to event.

Figure 21:
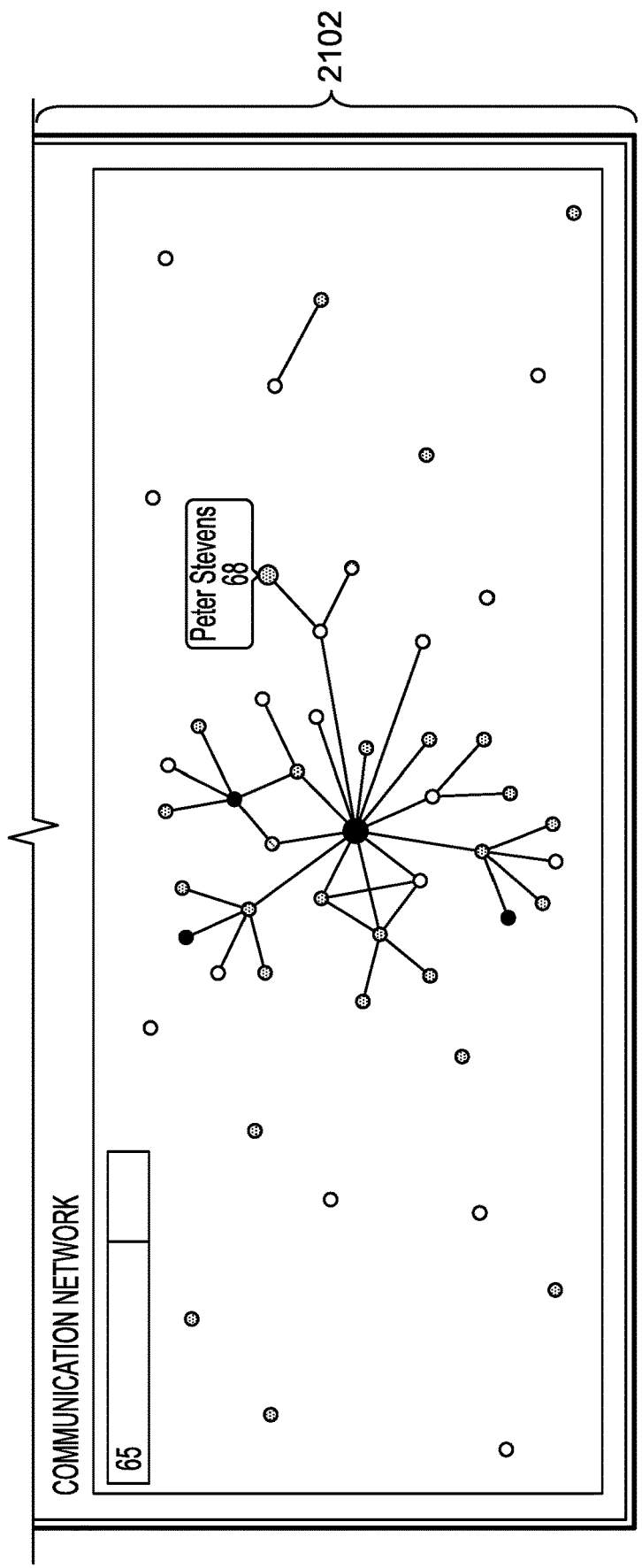

FIG. 21 provides example visualization 2101, in which UI 108 pairs a display of a network diagram 2102, the diagram being produced based on communication thresholds, with a communications quad chart 2103 and with corresponding measures of strengths of relationships that include directionality of communication.

Figure 22:
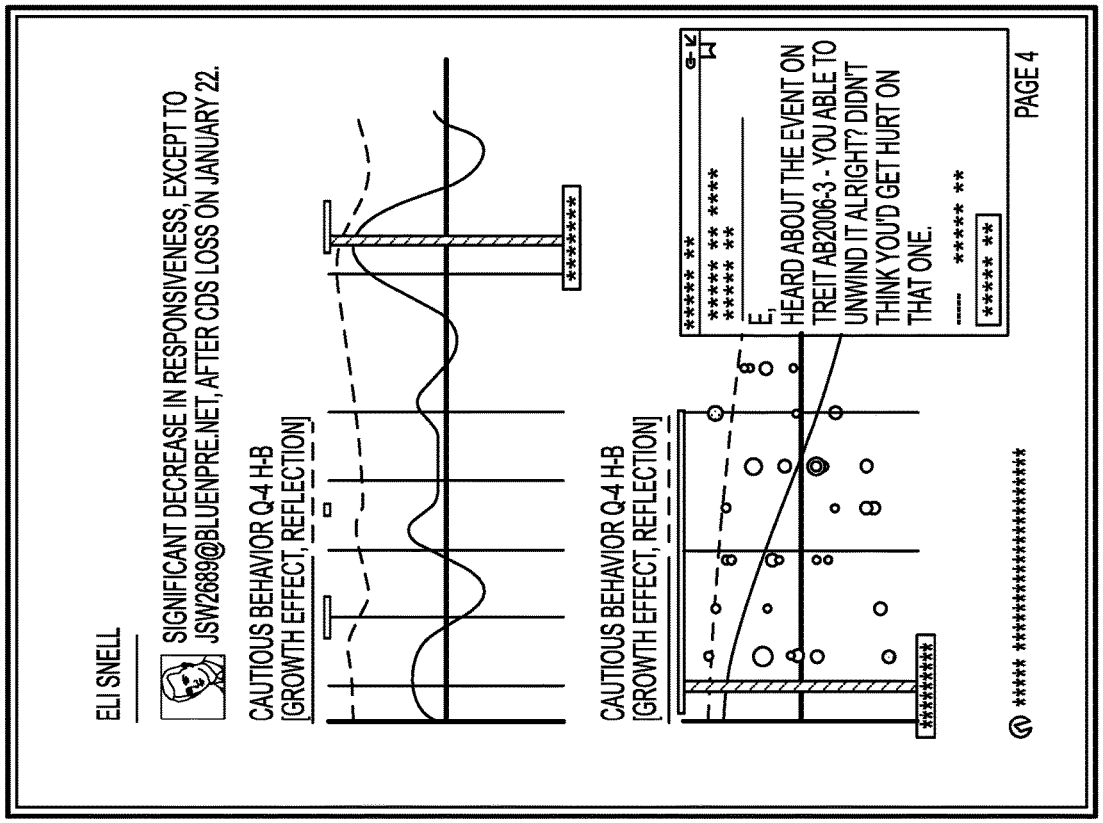

FIG. 22 includes example visualizations 2201, 2202, and 2203, which indicate analyses of a corpus of communications data that may be performed using system 100. As explained in detail above, system 100 may be used to pose a question, and to create a hypothesis that might indicate an answer to that question. The hypothesis may be expressed in terms of a language of behavioral effects, and hypothesis testing may identify individuals who have exhibited behavior that relates to the hypothesis. As shown at 2204, for example, UI 108 has employed shading to illustrate a degree to which each the behavior of each identified individual deviates from the norm.

Similarly, in 2202, graphs are used to illustrate variance in an individual's behavior, in contrast to the norm, over time. Events may be represented in a graph by a vertical line, such as line 2205, providing context for behavioral changes. Quarterly earnings for a company, for example, may be indicated in a graph.

Communications content may be overlaid in a graph, as in 2203, with each communication event represented as icon. Each email sent or received by an individual in question may be represented, for example, by a blue or brown dot, the color indicating whether the email was sent or received. A user may be able to click on or otherwise interact with a dot to view additional information relating to the corresponding communication. For example, a user may be able to view the textual content of an email that was sent by a particular actor.

Figure 23:
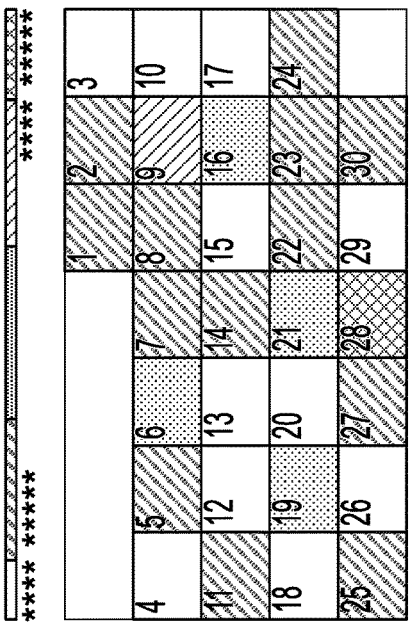
Figure 23:
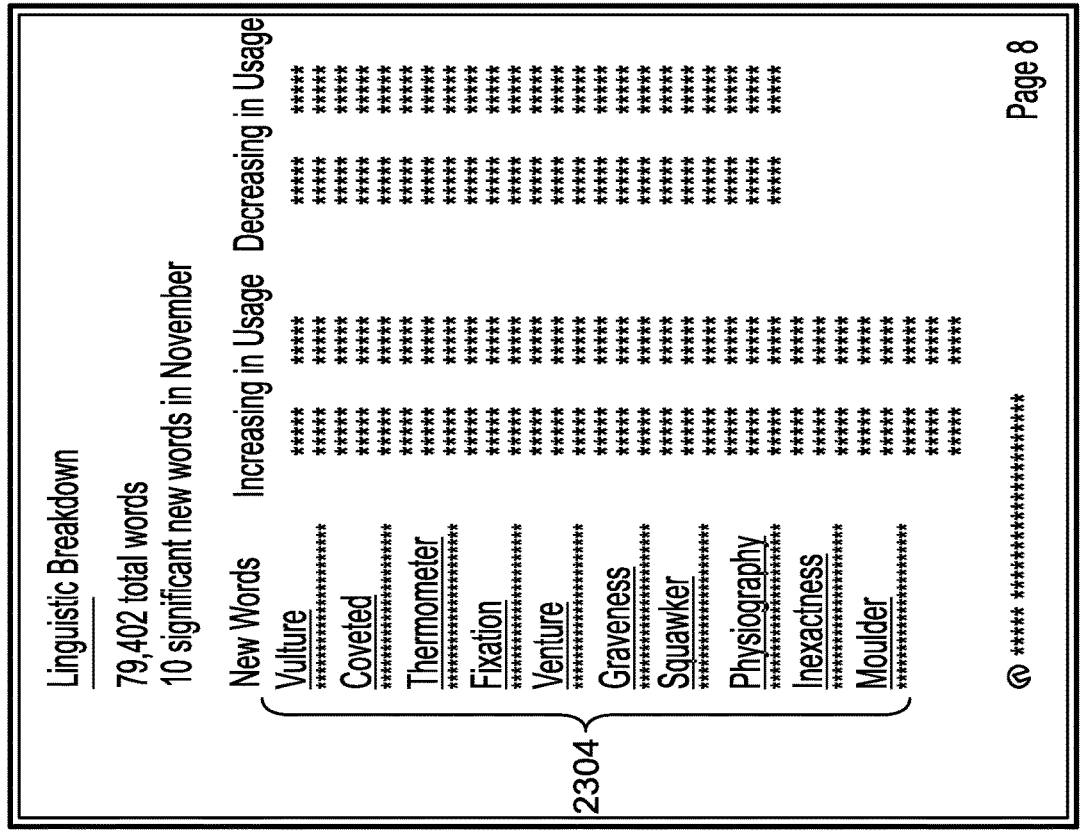

FIG. 23 includes example visualizations 2301, 2302, and 2303, which indicate further analyses of a corpus of communications data that may be performed using system 100. Irregularity Heat Map-Abnormal content and communications activity, aggregated by day, may be visualized, and shading may be used to indicate a degree or an amount of abnormal or irregular activity that occurred on a given day. As 2301 indicates, abnormal content and communications activity, aggregated by day, may be visualized by UI 108, and shading may be used to indicate a degree or an amount of abnormal or irregular activity that occurred on a given day.

Tendencies of individual actors to contact other actors may also be visualized, as in 2302. A tendency of internal actors to email external individuals, for example, may be visualized for a given time period, with actors ranked in order of number of emails sent to the actor, or received by the actor, involving external contacts. A count of external emails for each actor may be expressed in the graph, and an event may be overlaid to provide context.

The popularity of terms in a corpus of communications, and their frequency of use over time, may also be presented by UI 108, as shown in 2303. A table 2304 identifying the first times at which words were used in a collection of emails may be paired, for example, with an illustration of usage trends for the words.

A number of implementations have been described. Nevertheless, it will be understood that various modifications may be made without departing from the spirit and scope of the disclosure.

For example, elements of different implementations described herein may be combined to form other implementations not specifically set forth above. Elements may be left out of the systems, processes, computer programs, etc. described herein without adversely affecting their operation. Furthermore, various separate elements may be combined into one or more individual elements to perform the functions described herein.

In addition, the logic flows depicted in the FIGS. do not require the particular order shown, or sequential order, to achieve desirable results. In addition, other steps may be provided, or steps may be eliminated, from the described flows, and other components may be added to, or removed from, the described systems. Accordingly, other implementations not specifically described herein are within the scope of the following claims.

What is claimed is:

1. A method comprising
    determining, based on a data set, a relational event history, the relational event history comprising a set of relational events that occurred in time among a set of actors;
    populating, based on the relational event history, data in a probability model, wherein the probability model is formulated as a series of conditional probabilities that correspond to a set of sequential decisions by an actor for each relational event, and wherein the probability model includes one or more statistical parameters and one or more corresponding statistics;
    determining, by one or more processing devices and based on the populated probability model, a baseline communications behavior for the relational event history, wherein the baseline comprises a first set of values for the one or more statistical parameters; and
    determining departures from the baseline communications behavior within the relational event history; and
    wherein:
    determining departures from the baseline communications behavior within the relational event history comprises:
    determining, based on one or more subsets of the relational events included in the relational event history, a second set of values for the statistical parameters; and
    comparing the second set of values for the statistical parameters to the first set of values: and
    comparing the second set of values for the statistical parameters to the first set of values comprises:
    determining a hypothesis regarding communications behavior within the relational event history; and
    testing the hypothesis using the second set of values.

2. The method of claim 1, wherein testing the hypothesis using the second set of values comprises:
    computing, based on the second set of values, a value of a test statistic; and
    using the test statistic to determine the departures from the baseline communications behavior.

3. The method of claim 1, wherein determining the hypothesis regarding communications behavior within the relational event history comprises selecting a set of predictions regarding differences in communications behavior with respect to one or more of the statistical parameters over a period of time.

4. A method comprising
    determining, based on a data set, a relational event history, the relational event history comprising a set of relational events that occurred in time among a set of actors;
    populating, based on the relational event history, data in a probability model, wherein the probability model is formulated as a series of conditional probabilities that correspond to a set of sequential decisions by an actor for each relational event, and wherein the probability model includes one or more statistical parameters and one or more corresponding statistics;
    determining, by one or more processing devices and based on the populated probability model, a baseline communications behavior for the relational event history, wherein the baseline comprises a first set of values for the one or more statistical parameters: and
    determining departures from the baseline communications behavior within the relational event history; and
    wherein:
    determining the relational event history comprises: extracting data from the data set; transforming the extracted data; loading the transformed data; and enriching the loaded data.

5. The method of claim 4, wherein the one or more corresponding statistics relate to one or more of senders of relational events, modes of relational events, topics of relational events, or recipients of relational events.

6. A method comprising
    determining, based on a data set, a relational event history, the relational event history comprising a set of relational events that occurred in time among a set of actors;
    populating, based on the relational event history, data in a probability model, wherein the probability model is formulated as a series of conditional probabilities that correspond to a set of sequential decisions by an actor for each relational event, and wherein the probability model includes one or more statistical parameters and one or more corresponding statistics;

determining, by one or more processing devices and based on the populated probability model, a baseline communications behavior for the relational event history, wherein the baseline comprises a first set of values for the one or more statistical parameters; and determining departures from the baseline communications behavior within the relational event history; and determining a subset of actors included in the set of actors, wherein at least one decision included in the set of sequential decisions comprises selecting a recipient of the relational event from the subset of actors.

7. The method of claim 6, further comprising:

receiving one or more user inputs;

outputting, based on the one or more user inputs, a graphical analysis of the baseline communications behavior; and outputting, based on the one or more user inputs, one or more graphical analyses of the departures from the baseline communications behavior.

8. A system comprising:

one or more processing devices; and one or more non-transitory computer-readable media coupled to the one or more processing devices having instructions stored thereon which, when executed by the one or more processing devices, cause the one or more processing devices to perform operations comprising:

determining, based on a data set, a relational event history, the relational event history comprising a set of relational events that occurred in time among a set of actors;

populating, based on the relational event history, data in a probability model, wherein the probability model is formulated as a series of conditional probabilities that correspond to a set of sequential decisions by an actor for each relational event, and wherein the probability model includes one or more statistical parameters and one or more corresponding statistics;

determining, by one or more processing devices and based on the populated probability model, a baseline communications behavior for the relational event history, wherein the baseline comprises a first set of values for the one or more statistical parameters; and determining departures from the baseline communications behavior within the relational event history.

9. A system comprising:

one or more processing devices; and one or more non-transitory computer-readable media coupled to the one or more processing devices having instructions stored thereon which, when executed by the one or more processing devices, cause the one or more processing devices to perform operations comprising:

determining, based on a data set, a relational event history, the relational event history comprising a set of relational events that occurred in time among a set of actors;

populating, based on the relational event history, data in a probability model wherein the probability model is formulated as a series of conditional probabilities that correspond to a set of sequential decisions by an actor for each relational event, and wherein the probability model includes one or more statistical parameters and one or more corresponding statistics;

determining, by one or more processing devices and based on the populated probability model, a baseline communications behavior for the relational event history, wherein the baseline comprises a first set of values for the one or more statistical parameters; and determining departures from the baseline communications behavior within the relational event history; and wherein determining departures from the baseline communications behavior within the relational event history comprises:

determining, based on one or more subsets of the relational events included in the relational event history, a second set of values for the statistical parameters; and comparing the second set of values for the statistical parameters to the first set of values; and comparing the second set of values for the statistical parameters to the first set of values comprises:

determining a hypothesis regarding communications behavior within the relational event history; and testing the hypothesis using the second set of values.

10. The system of claim 9, wherein testing the hypothesis using the second set of values comprises:

computing, based on the second set of values, a value of a test statistic; and using the test statistic to determine the departures from the baseline communications behavior.

11. The system of claim 9, wherein determining the hypothesis regarding communications behavior within the relational event history comprises selecting a set of predictions regarding differences in communications behavior with respect to one or more of the statistical parameters over a period of time.

12. A system comprising:

one or more processing devices; and one or more non-transitory computer-readable media coupled to the one or more processing devices having instructions stored thereon which, when executed by the one or more processing devices, cause the one or more processing devices to perform operations comprising:

determining, based on a data set, a relational event history, the relational event history comprising a set of relational events that occurred in time among a set of actors;

populating, based on the relational event history, data in a probability model, wherein the probability model is formulated as a series of conditional probabilities that correspond to a set of sequential decisions by an actor for each relational event, and wherein the probability model includes one or more statistical parameters and one or more corresponding statistics;

determining, by one or more processing devices and based on the populated probability model, a baseline communications behavior for the relational event history, wherein the baseline comprises a first set of values for the one or more statistical parameters; and determining departures from the baseline communications behavior within the relational event history; and wherein determining the relational event history comprises: extracting data from the data set; transforming the extracted data; loading the transformed data; and enriching the loaded data.

13. The system of claim 12, wherein the one or more corresponding statistics relate to one or more of senders of relational events, modes of relational events, topics of relational events, or recipients of relational events.

14. A system comprising:
   one or more processing devices: and
   one or more non-transitory computer-readable media coupled to the one or more processing devices having instructions stored thereon which, when executed by the one or more processing devices, cause the one or more processing devices to perform operations comprising:
   determining, based on a data set, a relational event history, the relational event history comprising a set of relational events that occurred in time among a set of actors;
   populating, based on the relational event history, data in a probability model, wherein the probability model is formulated as a series of conditional probabilities that correspond to a set of sequential decisions by an actor for each relational event, and wherein the probability model includes one or more statistical parameters and one or more corresponding statistics;
   determining, by one or more processing devices and based on the populated probability model, a baseline communications behavior for the relational event history, wherein the baseline comprises a first set of values for the one or more statistical parameters; and
   determining departures from the baseline communications behavior within the relational event history; and
   determining a subset of actors included in the set of actors, wherein at least one decision included in the set of sequential decisions comprises selecting a recipient of the relational event from the subset of actors.

15. The system of claim 14, the operations further comprising:
   receiving one or more user inputs;
   outputting, based on the one or more user inputs, a graphical analysis of the baseline communications behavior; and
   outputting, based on the one or more user inputs, one or more graphical analyses of the departures from the baseline communications behavior.

* * * * *